US012665818B2

(12) United States Patent
Kumar et al.

(10) Patent No.: US 12,665,818 B2
(45) Date of Patent: Jun. 23, 2026

(54) MANAGEMENT OF CROSS-NODE MACHINE LEARNING OPERATIONS IN A RADIO ACCESS NETWORK

(71) Applicant: QUALCOMM Incorporated, San Diego, CA (US)

(72) Inventors: Rajeev Kumar, San Diego, CA (US); Aziz Gholmieh, Del Mar, CA (US); Gavin Bernard Horn, La Jolla, CA (US); Geetha Priya Rajendran, Bangalore (IN)

(73) Assignee: QUALCOMM Incorporated, San Diego, CA (US)

( * ) Notice: Subject to any disclaimer, the term of this patent is extended or adjusted under 35 U.S.C. 154(b) by 323 days.

(21) Appl. No.: 18/379,469

(22) Filed: Oct. 12, 2023

(65) Prior Publication Data

US 2025/0126025 A1    Apr. 17, 2025

(51) Int. Cl.
| | |
|---|---|
| *H04L 41/16* | (2022.01) |
| *H04W 24/02* | (2009.01) |
| *H04W 68/00* | (2009.01) |

(52) U.S. Cl.
CPC ............. *H04L 41/16* (2013.01); *H04W 24/02* (2013.01); *H04W 68/005* (2013.01)

(58) Field of Classification Search
CPC ........ H04L 41/16; H04L 24/02; H04L 68/005
See application file for complete search history.

(56) References Cited

U.S. PATENT DOCUMENTS

| | | | |
|---|---|---|---|
| 8,570,981 | B2 | 10/2013 | Aziz et al. |
| 11,388,054 | B2 | 7/2022 | Guim Bernat et al. |
| 2021/0184989 | A1 | 6/2021 | Wu et al. |
| 2022/0014942 | A1 | 1/2022 | Ying et al. |
| 2022/0124543 | A1 | 4/2022 | Orhan et al. |
| 2022/0407664 | A1 | 12/2022 | Wang et al. |
| 2023/0055590 | A1* | 2/2023 | Sivaraj ............. H04W 28/0967 |

(Continued)

FOREIGN PATENT DOCUMENTS

| | | |
|---|---|---|
| JP | 2023042318 A | 3/2023 |
| WO | 2022060777 A1 | 3/2022 |

(Continued)

OTHER PUBLICATIONS

International Search Report and Written Opinion—PCT/US2024/048673—ISA/EPO—Dec. 20, 2024.

(Continued)

*Primary Examiner* — Erika A Washington
(74) *Attorney, Agent, or Firm* — Dinsmore & Shohl LLP

(57) ABSTRACT

Certain aspects of the present disclosure provide techniques for managing cross-node artificial intelligence (AI) and/or machine learning (ML) operations in a radio access network (RAN). An example method of wireless communication by a first network entity includes obtaining machine learning input data associated with a user equipment (UE); providing, to a second network entity, an indication of machine learning output data generated using the machine learning input data; and providing, to the second network entity, control signaling for a cross-node machine learning session between the UE and the first network entity based at least in part on one or more performance indicators associated with the cross-node machine learning session.

22 Claims, 23 Drawing Sheets

(56) References Cited

U.S. PATENT DOCUMENTS

| | | | |
|---|---|---|---|
| 2023/0100253 A1 | 3/2023 | Zhu et al. | |
| 2023/0136354 A1 | 5/2023 | Namgoong et al. | |
| 2023/0297882 A1 | 9/2023 | Pantelidou et al. | |
| 2025/0008345 A1* | 1/2025 | Singh | H04W 24/02 |

FOREIGN PATENT DOCUMENTS

| | | | |
|---|---|---|---|
| WO | 2022089725 A1 | 5/2022 | |
| WO | 2022221260 A1 | 10/2022 | |
| WO | 2022264150 A1 | 12/2022 | |
| WO | 2023012074 A1 | 2/2023 | |
| WO | 2023030365 A1 | 3/2023 | |
| WO | 2023066287 A1 | 4/2023 | |
| WO | 2023111158 A2 | 6/2023 | |

OTHER PUBLICATIONS

Mediatek Inc: "Discussion on General Aspects of AI/ML Framework", R1-2209505, 3GPP TSG RAN WG1 #110-bis-e, e-Meeting, Oct. 10-19, 2022, 10 Pages.

* cited by examiner

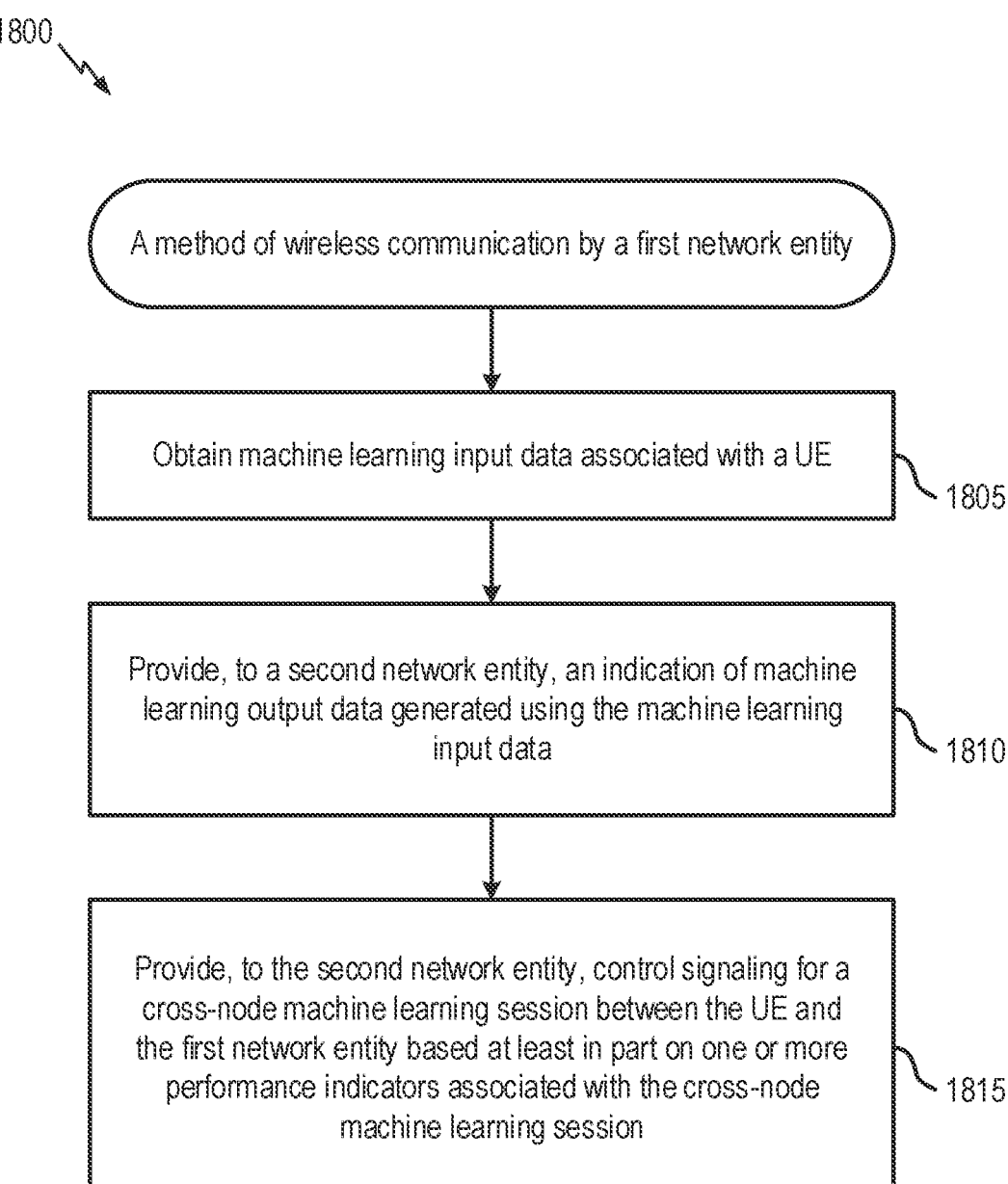

1800

A method of wireless communication by a first network entity

Obtain machine learning input data associated with a UE ⌐ 1805

Provide, to a second network entity, an indication of machine learning output data generated using the machine learning input data ⌐ 1810

Provide, to the second network entity, control signaling for a cross-node machine learning session between the UE and the first network entity based at least in part on one or more performance indicators associated with the cross-node machine learning session ⌐ 1815

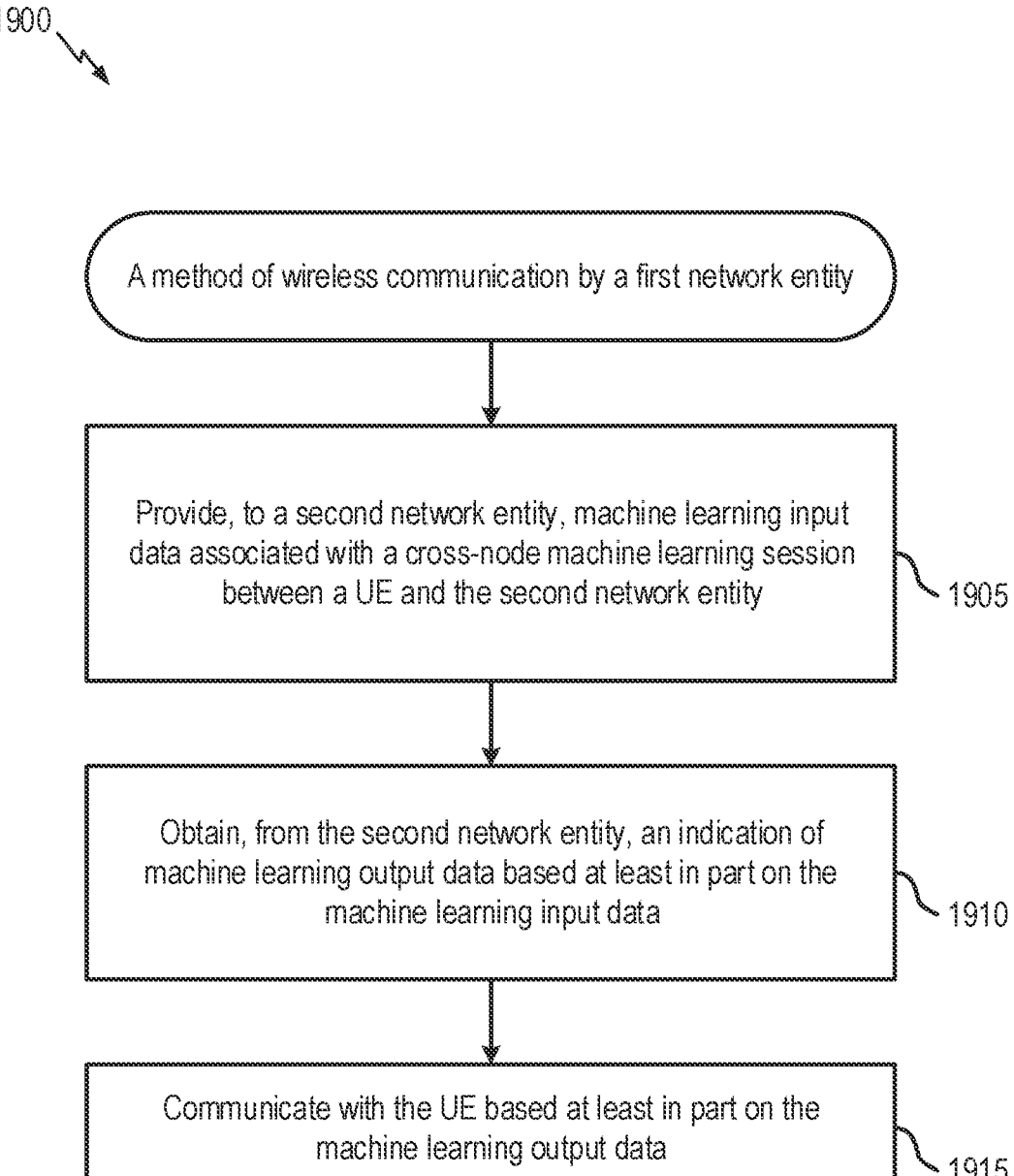

A method of wireless communication by a first network entity

Provide, to a second network entity, machine learning input data associated with a cross-node machine learning session between a UE and the second network entity        1905

Obtain, from the second network entity, an indication of machine learning output data based at least in part on the machine learning input data        1910

Communicate with the UE based at least in part on the machine learning output data        1915

*FIG. 19*

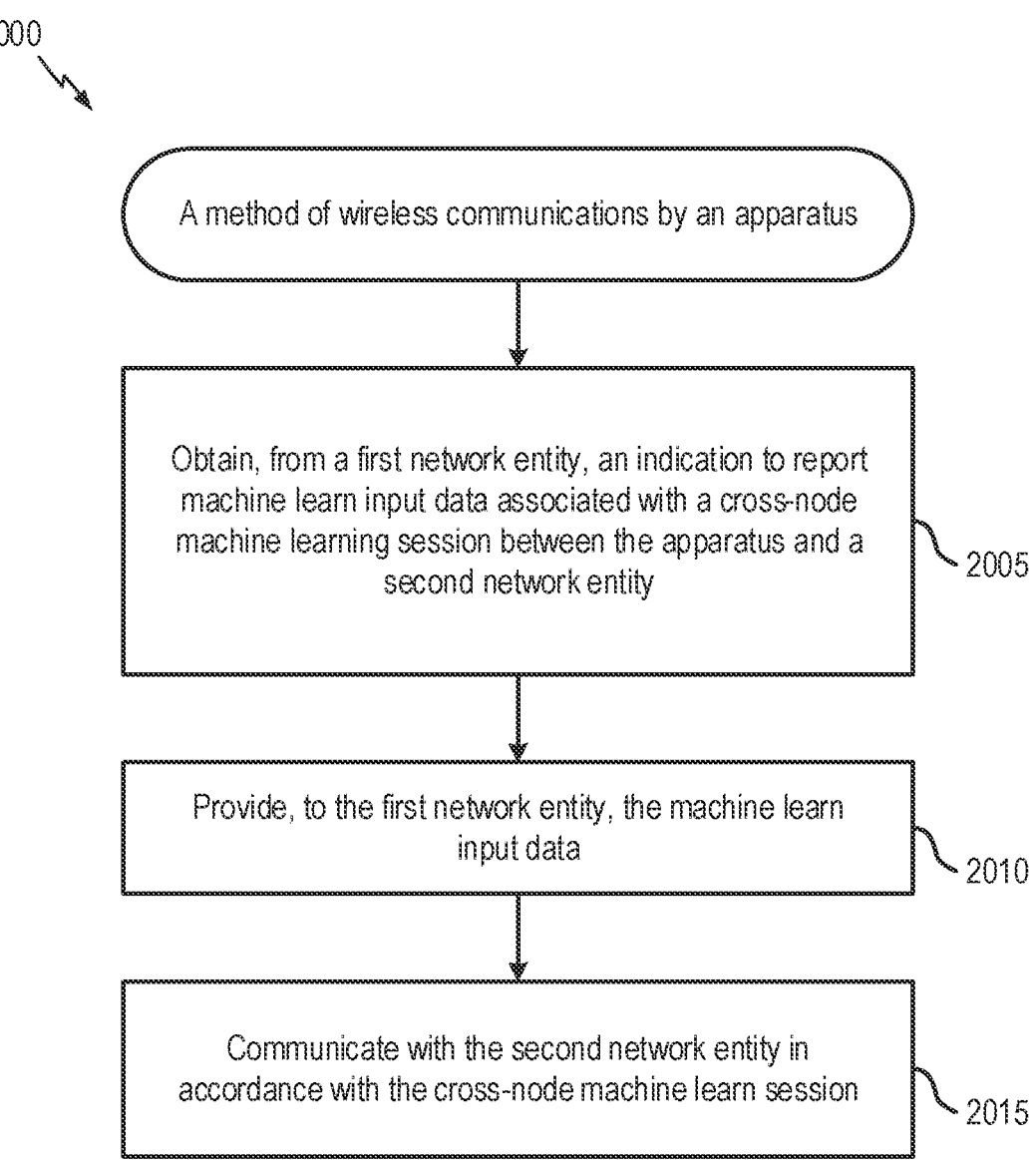

2000

A method of wireless communications by an apparatus

Obtain, from a first network entity, an indication to report machine learn input data associated with a cross-node machine learning session between the apparatus and a second network entity

2005

Provide, to the first network entity, the machine learn input data

2010

Communicate with the second network entity in accordance with the cross-node machine learn session

MANAGEMENT OF CROSS-NODE MACHINE LEARNING OPERATIONS IN A RADIO ACCESS NETWORK

INTRODUCTION

Field of the Disclosure

Aspects of the present disclosure relate to wireless communications, and more particularly, to techniques for implementing machine learning in a radio access network (RAN).

DESCRIPTION OF RELATED ART

Wireless communications systems are widely deployed to provide various telecommunication services such as telephony, video, data, messaging, broadcasts, or other similar types of services. These wireless communications systems may employ multiple-access technologies capable of supporting communications with multiple users by sharing available wireless communications system resources with those users.

Although wireless communications systems have made great technological advancements over many years, challenges still exist. For example, complex and dynamic environments can still attenuate or block signals between wireless transmitters and wireless receivers. Accordingly, there is a continuous desire to improve the technical performance of wireless communications systems, including, for example: improving speed and data carrying capacity of communications, improving efficiency of the use of shared communications mediums, reducing power used by transmitters and receivers while performing communications, improving reliability of wireless communications, avoiding redundant transmissions and/or receptions and related processing, improving the coverage area of wireless communications, increasing the number and types of devices that can access wireless communications systems, increasing the ability for different types of devices to intercommunicate, increasing the number and type of wireless communications mediums available for use, and the like. Consequently, there exists a need for further improvements in wireless communications systems to overcome the aforementioned technical challenges and others.

SUMMARY

One aspect provides a method for wireless communications by an apparatus. The method includes obtaining machine learning input data associated with a user equipment (UE); providing, to a network entity, an indication of machine learning output data generated using the machine learning input data; and providing, to the network entity, control signaling for a cross-node machine learning session between the UE and the apparatus based at least in part on one or more performance indicators associated with the cross-node machine learning session.

Another aspect provides a method for wireless communications by an apparatus. The method includes providing, to a network entity, machine learning input data associated with a cross-node machine learning session between a UE and the network entity; obtaining, from the network entity, an indication of machine learning output data based at least in part on the machine learning input data; and communicating with the UE based at least in part on the machine learning output data.

Another aspect provides a method of wireless communications by an apparatus. The method includes obtaining, from a first network entity, an indication to report machine learning input data associated with a cross-node machine learning session between the apparatus and a second network entity; providing, to the first network entity, the machine learning input data; and communicating with the second network entity in accordance with the cross-node machine learning session.

Other aspects provide: one or more apparatuses operable, configured, or otherwise adapted to perform any portion of any method described herein (e.g., such that performance may be by only one apparatus or in a distributed fashion across multiple apparatuses); one or more non-transitory, computer-readable media comprising instructions that, when executed by one or more processors of one or more apparatuses, cause the one or more apparatuses to perform any portion of any method described herein (e.g., such that instructions may be included in only one computer-readable medium or in a distributed fashion across multiple computer-readable media, such that instructions may be executed by only one processor or by multiple processors in a distributed fashion, such that each apparatus of the one or more apparatuses may include one processor or multiple processors, and/or such that performance may be by only one apparatus or in a distributed fashion across multiple apparatuses); one or more computer program products embodied on one or more computer-readable storage media comprising code for performing any portion of any method described herein (e.g., such that code may be stored in only one computer-readable medium or across computer-readable media in a distributed fashion); and/or one or more apparatuses comprising one or more means for performing any portion of any method described herein (e.g., such that performance would be by only one apparatus or by multiple apparatuses in a distributed fashion). By way of example, an apparatus may comprise a processing system, a device with a processing system, or processing systems cooperating over one or more networks.

The following description and the appended figures set forth certain features for purposes of illustration.

BRIEF DESCRIPTION OF DRAWINGS

The appended figures depict certain features of the various aspects described herein and are not to be considered limiting of the scope of this disclosure.

FIG. 18 depicts a method for wireless communications.

FIG. 19 depicts another method for wireless communications.

FIG. 20 depicts another method for wireless communications.

DETAILED DESCRIPTION

Figure 1:
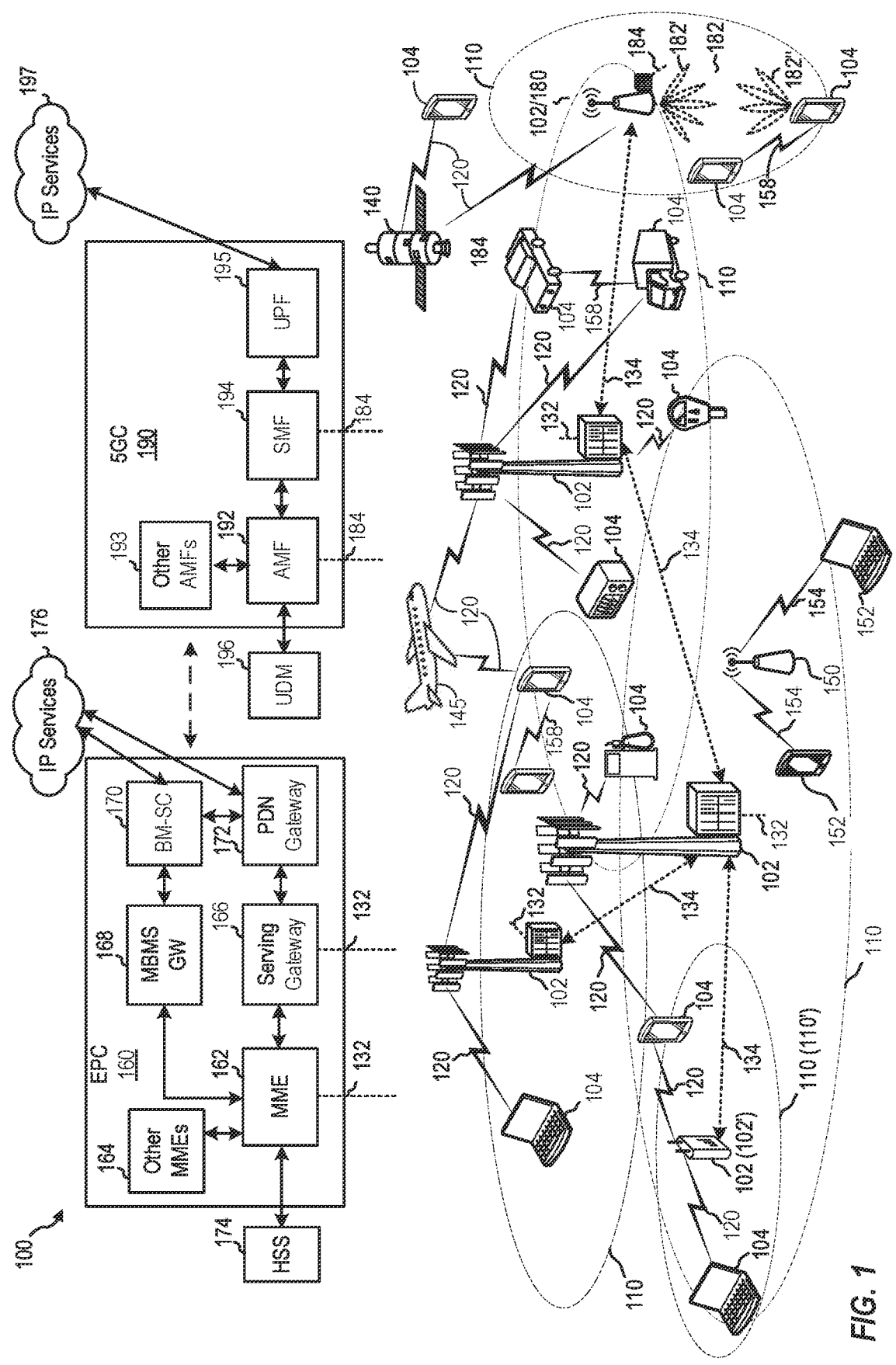
FIG. 1 depicts an example wireless communications network.

Aspects of the present disclosure provide apparatuses, methods, processing systems, and computer-readable mediums for managing cross-node artificial intelligence (AI) and/or machine learning (ML) operations in a radio access network (RAN).

In certain cases, a wireless communications system (e.g., a wireless wide area network (WWAN) including, for example, 5G New Radio and/or future WWAN systems) may employ AI/ML to perform any of various wireless communication operations, such as channel state information estimation, beam management, device positioning, etc. As an example, a radio access network entity (e.g., a base station including a disaggregated base station as further described herein) and a user equipment (UE) may apply paired or distributed AI/ML model(s) over which a joint inference may be used among the network entity and the UE. A joint inference may use an AI/ML model that is shared among certain entities in a wireless communication system, such as a UE and a base station. In some cases, a network entity (e.g., a base station) may perform certain AI/ML computations based at least in part on AI/ML input obtained from the UE (e.g., decoding or decompression of AI/ML-based feedback or input from the UE). However, the AI/ML processing performed at the network entity, such as a base station and/or disaggregated entities thereof, may be computationally intensive.

As example technical problems, the AI/ML processing may use computational resources (e.g., processing and/or storage) that could be used for other operations (e.g., scheduling and/or managing wireless communications), especially when a base station is tasked with managing the communication links for multiple UEs and/or multiple ML functions or models for one or more UEs. In some cases, the AI/ML processing may consume the processing capabilities of the base station to perform certain network functions, such as scheduling and/or wireless communications management, within a particular performance specification (e.g., a specified latency), or vice versa. In certain cases, deploying additional computational resources to base stations for AI/ML processing may be a costly endeavor for radio access network (RAN) operators.

As one or more technical solutions, certain aspects of the present disclosure provide signaling to manage a cross-node AI/ML session between a UE and a RAN controller in a cloud-based RAN architecture, such as a virtual RAN (V-RAN) or open RAN (O-RAN). In certain aspects, a base station (and/or certain disaggregated entities thereof) and a RAN controller may exchange AI/ML information to facilitate a cross-node AI/ML session between a UE and the RAN controller (e.g., cross-node AI/ML inference operations at the RAN controller). For example, to enable cross-node AI/ML inference operations at the RAN controller (independent of a base station and/or certain disaggregated entities thereof), a base station in the cloud-based RAN may be configured to report AI/ML information (e.g., AI/ML input for a RAN-side inference) to the RAN controller via certain messages, such as a cross-node specific requests, responses, or generic messages, as further described herein. For certain aspects, certain entities in the cloud-based RAN system may monitor the performance of cross-node AI/ML sessions and perform life-cycle management tasks associated with the cross-node AI/ML sessions.

As beneficial effects, a cross-node AI/ML operation or session between a UE and a RAN controller in a cloud-based RAN for joint inference implementations may allow the RAN-side AI/ML processing to be performed efficiently (e.g., reduced processing latencies, dynamic load balancing, resource sharing, etc.) and/or distributed across a cloud platform (which may facilitate the reduced processing latencies, dynamic load balancing, resource sharing, etc.), such as an RIC. In some cases, the cross-node AI/ML session may allow RAN-side AI/ML processing to be performed at a specialized AI/ML computing device, such as a cloud server having one or more neural network processors, one or more graphical processing units, or any suitable AI/ML specific processor. The specialized AI/ML computing device may have the capability to perform AI/ML computations more efficiently compared to a general purpose processor, such as a microprocessor, which may be employed at a base station or an entity associated with a disaggregated base station. Thus, the management of cross-node AI/ML sessions described herein may facilitate improved wireless communication performance, including, for example, increased throughput, decreased latency, increased network capacity, spectral efficiencies, etc., due to the efficient RAN-side AI/ML processing enabled by the cross-node AI/ML session and/or offloading of RAN-side AI/ML processing to a RAN controller from a base station and/or entity associated with a disaggregated base station.

Introduction to Wireless Communications Networks

The techniques and methods described herein may be used for various wireless communications networks. While aspects may be described herein using terminology commonly associated with 3G, 4G, 5G, 6G, and/or other generations of wireless technologies, aspects of the present disclosure may likewise be applicable to other communications systems and standards not explicitly mentioned herein.

FIG. 1 depicts an example of a wireless communications network 100, in which aspects described herein may be implemented.

Generally, wireless communications network 100 includes various network entities (alternatively, network elements or network nodes). A network entity is generally a communications device and/or a communications function performed by a communications device (e.g., a user equipment (UE), a base station (BS), a component of a BS, a server, etc.). As such communications devices are part of wireless communications network 100, and facilitate wireless communications, such communications devices may be referred to as wireless communications devices. For example, various functions of a network as well as various devices associated with and interacting with a network may be considered network entities. Further, wireless communications network 100 includes terrestrial aspects, such as ground-based network entities (e.g., BSs 102), and non-terrestrial aspects (also referred to herein as non-terrestrial network entities), such as satellite 140 and aircraft 145, which may include network entities on-board (e.g., one or more BSs) capable of communicating with other network elements (e.g., terrestrial BSs) and UEs.

In the depicted example, wireless communications network 100 includes BSs 102, UEs 104, and one or more core networks, such as an Evolved Packet Core (EPC) 160 and 5G Core (5GC) network 190, which interoperate to provide communications services over various communications links, including wired and wireless links.

FIG. 1 depicts various example UEs 104, which may more generally include: a cellular phone, smart phone, session initiation protocol (SIP) phone, laptop, personal digital assistant (PDA), satellite radio, global positioning system, multimedia device, video device, digital audio player, camera, game console, tablet, smart device, wearable device, vehicle, electric meter, gas pump, large or small kitchen appliance, healthcare device, implant, sensor/actuator, display, internet of things (IoT) devices, always on (AON) devices, edge processing devices, data centers, or other similar devices. UEs 104 may also be referred to more generally as a mobile device, a wireless device, a station, a mobile station, a subscriber station, a mobile subscriber station, a mobile unit, a subscriber unit, a wireless unit, a remote unit, a remote device, an access terminal, a mobile terminal, a wireless terminal, a remote terminal, a handset, and others.

BSs 102 wirelessly communicate with (e.g., transmit signals to or receive signals from) UEs 104 via communications links 120. The communications links 120 between BSs 102 and UEs 104 may include uplink (UL) (also referred to as reverse link) transmissions from a UE 104 to a BS 102 and/or downlink (DL) (also referred to as forward link) transmissions from a BS 102 to a UE 104. The communications links 120 may use multiple-input and multiple-output (MIMO) antenna technology, including spatial multiplexing, beamforming, and/or transmit diversity in various aspects.

BSs 102 may generally include: a NodeB, enhanced NodeB (eNB), next generation enhanced NodeB (ng-eNB), next generation NodeB (gNB or gNodeB), access point, base transceiver station, radio base station, radio transceiver, transceiver function, transmission reception point, and/or others. Each of BSs 102 may provide communications coverage for a respective coverage area 110, which may sometimes be referred to as a cell, and which may overlap in some cases (e.g., small cell 102' may have a coverage area 110' that overlaps the coverage area 110 of a macro cell). A BS may, for example, provide communications coverage for a macro cell (covering relatively large geographic area), a pico cell (covering relatively smaller geographic area, such as a sports stadium), a femto cell (relatively smaller geographic area (e.g., a home)), and/or other types of cells.

Generally, a cell may refer to a portion, partition, or segment of wireless communication coverage served by a network entity within a wireless communication network. A cell may have geographic characteristics, such as a geographic coverage area, as well as radio frequency characteristics, such as time and/or frequency resources dedicated to the cell. For example, a specific geographic coverage area may be covered by multiple cells employing different frequency resources (e.g., bandwidth parts) and/or different time resources. As another example, a specific geographic coverage area may be covered by a single cell. In some contexts (e.g., a carrier aggregation scenario and/or multi-connectivity scenario), the terms "cell" or "serving cell" may refer to or correspond to a specific carrier frequency (e.g., a component carrier) used for wireless communications, and a "cell group" may refer to or correspond to multiple carriers used for wireless communications. As examples, in a carrier aggregation scenario, a UE may communicate on multiple component carriers corresponding to multiple (serving) cells in the same cell group, and in a multi-connectivity (e.g., dual connectivity) scenario, a UE may communicate on multiple component carriers corresponding to multiple cell groups.

Figure 2:
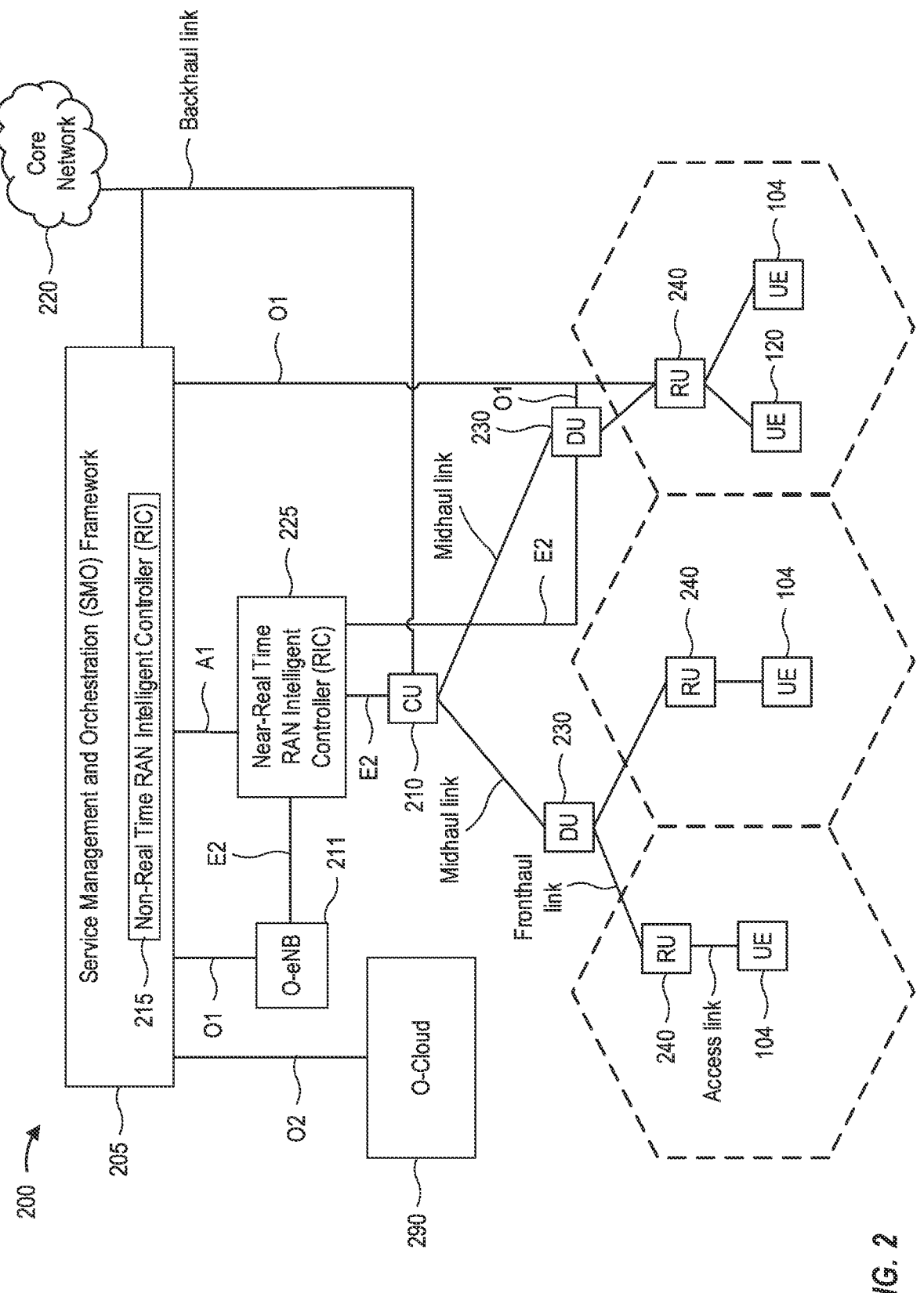
FIG. 2 depicts an example disaggregated base station architecture.

While BSs 102 are depicted in various aspects as unitary communications devices, BSs 102 may be implemented in various configurations. For example, one or more components of a base station may be disaggregated, including a central unit (CU), one or more distributed units (DUs), one or more radio units (RUS), a Near-Real Time (Near-RT) RAN Intelligent Controller (RIC), or a Non-Real Time (Non-RT) RIC, to name a few examples. In another example, various aspects of a base station may be virtualized. More generally, a base station (e.g., BS 102) may include components that are located at a single physical location or components located at various physical locations. In examples in which a base station includes components that are located at various physical locations, the various components may each perform functions such that, collectively, the various components achieve functionality that is similar to a base station that is located at a single physical location. In some aspects, a base station including components that are located at various physical locations may be referred to as a disaggregated radio access network architecture, such as an Open RAN (O-RAN) or Virtualized RAN (VRAN) architecture. FIG. 2 depicts and describes an example disaggregated base station architecture.

Different BSs 102 within wireless communications network 100 may also be configured to support different radio access technologies, such as 3G, 4G, and/or 5G. For example, BSs 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., an S1 interface). BSs 102 configured for 5G (e.g., 5G NR or Next Generation RAN (NG-RAN)) may interface with 5GC 190 through second backhaul links 184. BSs 102 may communicate directly or indirectly (e.g., through the EPC 160 or 5GC 190) with each other over third backhaul links 134 (e.g., X2 interface), which may be wired or wireless.

Wireless communications network 100 may subdivide the electromagnetic spectrum into various classes, bands, channels, or other features. In some aspects, the subdivision is provided based on wavelength and frequency, where frequency may also be referred to as a carrier, a subcarrier, a frequency channel, a tone, or a subband. For example, 3GPP currently defines Frequency Range 1 (FR1) as including 410 MHz-7125 MHz, which is often referred to (interchangeably) as "Sub-6 GHz". Similarly, 3GPP currently defines Frequency Range 2 (FR2) as including 24,250 MHZ-71,000 MHZ, which is sometimes referred to (interchangeably) as a "millimeter wave" ("mmW" or "mmWave"). In some cases, FR2 may be further defined in terms of sub-ranges, such as a first sub-range FR2-1 including 24,250 MHz-52, 600 MHz and a second sub-range FR2-2 including 52,600 MHz-71,000 MHz. A base station configured to communicate using mm Wave/near mm Wave radio frequency bands (e.g., a mmWave base station such as BS 180) may utilize beamforming (e.g., 182) with a UE (e.g., 104) to improve path loss and range.

The communications links 120 between BSs 102 and, for example, UEs 104, may be through one or more carriers, which may have different bandwidths (e.g., 5, 10, 15, 20, 100, 400, and/or other MHz), and which may be aggregated in various aspects. Carriers may or may not be adjacent to each other. Allocation of carriers may be asymmetric with respect to DL and UL (e.g., more or fewer carriers may be allocated for DL than for UL).

Communications using higher frequency bands may have higher path loss and a shorter range compared to lower frequency communications. Accordingly, certain base stations (e.g., 180 in FIG. 1) may utilize beamforming 182 with a UE 104 to improve path loss and range. For example, BS 180 and the UE 104 may each include a plurality of antennas, such as antenna elements, antenna panels, and/or antenna arrays to facilitate the beamforming. In some cases, BS 180 may transmit a beamformed signal to UE 104 in one or more transmit directions 182'. UE 104 may receive the beamformed signal from the BS 180 in one or more receive directions 182". UE 104 may also transmit a beamformed signal to the BS 180 in one or more transmit directions 182". BS 180 may also receive the beamformed signal from UE 104 in one or more receive directions 182'. BS 180 and UE 104 may then perform beam training to determine the best receive and transmit directions for each of BS 180 and UE 104. Notably, the transmit and receive directions for BS 180 may or may not be the same. Similarly, the transmit and receive directions for UE 104 may or may not be the same.

Wireless communications network 100 further includes a Wi-Fi AP 150 in communication with Wi-Fi stations (STAs) 152 via communications links 154 in, for example, a 2.4 GHz and/or 5 GHz unlicensed frequency spectrum.

Certain UEs 104 may communicate with each other using device-to-device (D2D) communications link 158. D2D communications link 158 may use one or more sidelink channels, such as a physical sidelink broadcast channel (PSBCH), a physical sidelink discovery channel (PSDCH), a physical sidelink shared channel (PSSCH), a physical sidelink control channel (PSCCH), and/or a physical sidelink feedback channel (PSFCH).

EPC 160 may include various functional components, including: a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and/or a Packet Data Network (PDN) Gateway 172, such as in the depicted example. MME 162 may be in communication with a Home Subscriber Server (HSS) 174. MME 162 is the control node that processes the signaling between the UEs 104 and the EPC 160. Generally, MME 162 provides bearer and connection management.

Generally, user Internet protocol (IP) packets are transferred through Serving Gateway 166, which itself is connected to PDN Gateway 172. PDN Gateway 172 provides UE IP address allocation as well as other functions. PDN Gateway 172 and the BM-SC 170 are connected to IP Services 176, which may include, for example, the Internet, an intranet, an IP Multimedia Subsystem (IMS), a Packet Switched (PS) streaming service, and/or other IP services.

BM-SC 170 may provide functions for MBMS user service provisioning and delivery. BM-SC 170 may serve as an entry point for content provider MBMS transmission, may be used to authorize and initiate MBMS Bearer Services within a public land mobile network (PLMN), and/or may be used to schedule MBMS transmissions. MBMS Gateway 168 may be used to distribute MBMS traffic to the BSs 102 belonging to a Multicast Broadcast Single Frequency Network (MBSFN) area broadcasting a particular service, and/or may be responsible for session management (start/stop) and for collecting eMBMS related charging information.

5GC 190 may include various functional components, including: an Access and Mobility Management Function (AMF) 192, other AMFs 193, a Session Management Function (SMF) 194, and a User Plane Function (UPF) 195. AMF 192 may be in communication with Unified Data Management (UDM) 196.

AMF 192 is a control node that processes signaling between UEs 104 and 5GC 190. AMF 192 provides, for example, quality of service (QOS) flow and session management.

Internet protocol (IP) packets are transferred through UPF 195, which is connected to the IP Services 197, and which provides UE IP address allocation as well as other functions for 5GC 190. IP Services 197 may include, for example, the Internet, an intranet, an IMS, a PS streaming service, and/or other IP services.

In various aspects, a network entity or network node can be implemented as an aggregated base station, as a disaggregated base station, a component of a base station, an integrated access and backhaul (IAB) node, a relay node, a sidelink node, to name a few examples.

FIG. 2 depicts an example disaggregated base station 200 architecture. The disaggregated base station 200 architecture may include one or more central units (CUs) 210 that can communicate directly with a core network 220 via a backhaul link, or indirectly with the core network 220 through one or more disaggregated base station units (such as a Near-Real Time (Near-RT) RAN Intelligent Controller (RIC) 225 via an E2 link, or a Non-Real Time (Non-RT) RIC 215 associated with a Service Management and Orchestration (SMO) Framework 205, or both). A CU 210 may communicate with one or more distributed units (DUs) 230 via respective midhaul links, such as an F1 interface. The DUs 230 may communicate with one or more radio units (RUS) 240 via respective fronthaul links. The RUs 240 may communicate with respective UEs 104 via one or more radio frequency (RF) access links. In some implementations, the UE 104 may be simultaneously served by multiple RUs 240.

Each of the units, e.g., the CUS 210, the DUs 230, the RUs 240, as well as the Near-RT RICs 225, the Non-RT RICs 215 and the SMO Framework 205, may include one or more interfaces or be coupled to one or more interfaces configured to receive or transmit signals, data, or information (collectively, signals) via a wired or wireless transmission medium. Each of the units, or an associated processor or controller providing instructions to the communications interfaces of the units, can be configured to communicate with one or more of the other units via the transmission medium. For example, the units can include a wired interface configured to receive or transmit signals over a wired transmission medium to one or more of the other units. Additionally or alternatively, the units can include a wireless interface, which may include a receiver, a transmitter or transceiver (such as a radio frequency (RF) transceiver), configured to receive or transmit signals, or both, over a wireless transmission medium to one or more of the other units.

In some aspects, the CU 210 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 210. The CU 210 may be configured to handle user plane functionality (e.g., Central Unit-User Plane (CU-UP)), control plane functionality (e.g., Central Unit-Control Plane (CU-CP)), or a combination thereof. In some implementations, the CU 210 can be logically split into one or more CU-UP units and one or more CU-CP units. The CU-UP unit can communicate bidirectionally with the CU-CP unit via an interface, such as the E1 interface when implemented in an O-RAN configuration. The CU 210 can be implemented to communicate with the DU 230, as necessary, for network control and signaling.

The DU 230 may correspond to a logical unit that includes one or more base station functions to control the operation of one or more RUs 240. In some aspects, the DU 230 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the 3$^{rd}$ Generation Partnership Project (3GPP). In some aspects, the DU 230 may further host one or more low PHY layers. Each layer (or module) can be implemented with an interface configured to communicate signals with other layers (and modules) hosted by the DU 230, or with the control functions hosted by the CU 210.

Lower-layer functionality can be implemented by one or more RUs 240. In some deployments, an RU 240, controlled by a DU 230, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 240 can be implemented to handle over the air (OTA) communications with one or more UEs 104. In some implementations, real-time and non-real-time aspects of control and user plane communications with the RU(s) 240 can be controlled by the corresponding DU 230. In some scenarios, this configuration can enable the DU(s) 230 and the CU 210 to be implemented in a cloud-based RAN architecture, such as a vRAN architecture.

The SMO Framework 205 may be configured to support RAN deployment and provisioning of non-virtualized and virtualized network elements. For non-virtualized network elements, the SMO Framework 205 may be configured to support the deployment of dedicated physical resources for RAN coverage requirements which may be managed via an operations and maintenance interface (such as an O1 interface). For virtualized network elements, the SMO Framework 205 may be configured to interact with a cloud computing platform (such as an open cloud (O-Cloud) 290) to perform network element life cycle management (such as to instantiate virtualized network elements) via a cloud computing platform interface (such as an O2 interface). Such virtualized network elements can include, but are not limited to, CUs 210, DUs 230, RUS 240 and Near-RT RICs 225. In some implementations, the SMO Framework 205 can communicate with a hardware aspect of a 4G RAN, such as an open eNB (O-eNB) 211, via an O1 interface. Additionally, in some implementations, the SMO Framework 205 can communicate directly with one or more DUs 230 and/or one or more RUs 240 via an O1 interface. The SMO Framework 205 also may include a Non-RT RIC 215 configured to support functionality of the SMO Framework 205.

The Non-RT RIC 215 may be configured to include a logical function that enables non-real-time (e.g., greater than 1 s) control and optimization of RAN elements and resources, Artificial Intelligence/Machine Learning (AI/ML) workflows including model training and updates, or policy-based guidance of applications/features in the Near-RT RIC 225. The Non-RT RIC 215 may be coupled to or communicate with (such as via an A1 interface) the Near-RT RIC 225. The Near-RT RIC 225 may be configured to include a logical function that enables near-real-time (e.g., in the order of 10 ms-1s) control and optimization of RAN elements and resources via data collection and actions over an interface (such as via an E2 interface) connecting one or more CUs 210, one or more DUs 230, or both, as well as an O-eNB, with the Near-RT RIC 225.

In some implementations, to generate AI/ML models to be deployed in the Near-RT RIC 225, the Non-RT RIC 215 may receive parameters or external enrichment information from external servers. Such information may be utilized by the Near-RT RIC 225 and may be received at the SMO Framework 205 or the Non-RT RIC 215 from non-network data sources or from network functions. In some examples, the Non-RT RIC 215 or the Near-RT RIC 225 may be configured to tune RAN behavior or performance. For example, the Non-RT RIC 215 may monitor long-term trends and patterns for performance and employ AI/ML models to perform corrective actions through the SMO Framework 205 (such as reconfiguration via O1) or via creation of RAN management policies (such as A1 policies).

Figure 3:
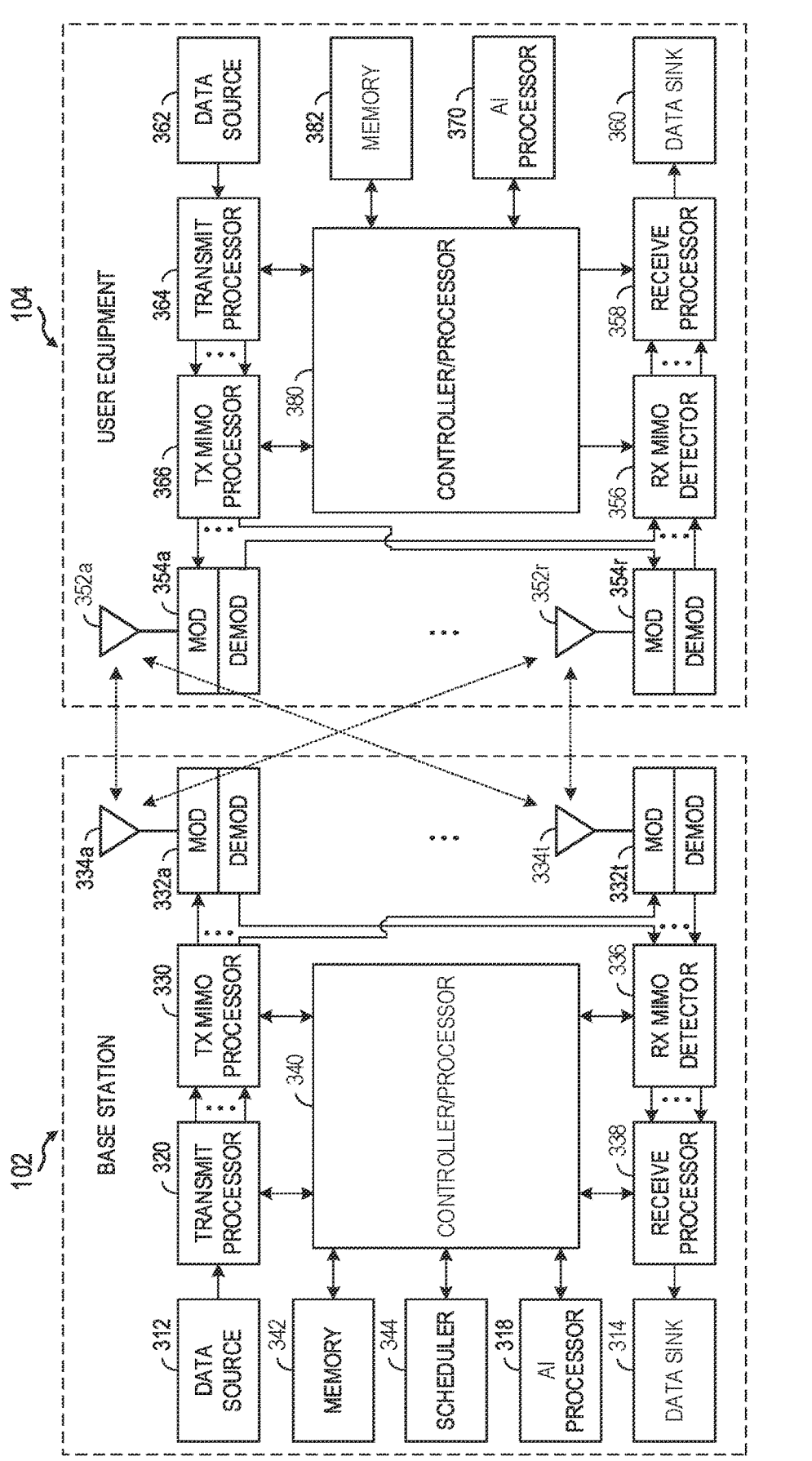
FIG. 3 depicts aspects of an example base station and an example user equipment (UE).

FIG. 3 depicts aspects of an example BS 102 and a UE 104.

Generally, BS 102 includes various processors (e.g., 318, 320, 330, 338, and 340), antennas 334a-t (collectively 334), transceivers 332a-t (collectively 332), which include modulators and demodulators, and other aspects, which enable wireless transmission of data (e.g., data source 312) and wireless reception of data (e.g., data sink 314). For example, BS 102 may send and receive data between BS 102 and UE 104. BS 102 includes controller/processor 340, which may be configured to implement various functions described herein related to wireless communications.

Generally, UE 104 includes various processors (e.g., 358, 364, 366, 370, and 380), antennas 352a-r (collectively 352), transceivers 354a-r (collectively 354), which include modulators and demodulators, and other aspects, which enable wireless transmission of data (e.g., retrieved from data source 362) and wireless reception of data (e.g., provided to data sink 360). UE 104 includes controller/processor 380, which may be configured to implement various functions described herein related to wireless communications.

In regards to an example downlink transmission, BS 102 includes a transmit processor 320 that may receive data from a data source 312 and control information from a controller/processor 340. The control information may be for the physical broadcast channel (PBCH), physical control format indicator channel (PCFICH), physical hybrid automatic repeat request (HARQ) indicator channel (PHICH), physical downlink control channel (PDCCH), group common PDCCH (GC PDCCH), and/or others. The data may be for the physical downlink shared channel (PDSCH), in some examples.

Transmit processor 320 may process (e.g., encode and symbol map) the data and control information to obtain data symbols and control symbols, respectively. Transmit processor 320 may also generate reference symbols, such as for the primary synchronization signal (PSS), secondary synchronization signal (SSS), PBCH demodulation reference signal (DMRS), and channel state information reference signal (CSI-RS).

Transmit (TX) multiple-input multiple-output (MIMO) processor 330 may perform spatial processing (e.g., precoding) on the data symbols, the control symbols, and/or the reference symbols, if applicable, and may provide output symbol streams to the modulators (MODs) in transceivers 332a-332t. Each modulator in transceivers 332a-332t may process a respective output symbol stream to obtain an output sample stream. Each modulator may further process (e.g., convert to analog, amplify, filter, and upconvert) the output sample stream to obtain a downlink signal. Downlink signals from the modulators in transceivers 332a-332t may be transmitted via the antennas 334a-334t, respectively.

In order to receive the downlink transmission, UE 104 includes antennas 352a-352r that may receive the downlink signals from the BS 102 and may provide received signals to the demodulators (DEMODs) in transceivers 354a-354r, respectively. Each demodulator in transceivers 354a-354r may condition (e.g., filter, amplify, downconvert, and digitize) a respective received signal to obtain input samples. Each demodulator may further process the input samples to obtain received symbols.

RX MIMO detector 356 may obtain received symbols from all the demodulators in transceivers 354a-354r, perform MIMO detection on the received symbols if applicable, and provide detected symbols. Receive processor 358 may process (e.g., demodulate, deinterleave, and decode) the detected symbols, provide decoded data for the UE 104 to a data sink 360, and provide decoded control information to a controller/processor 380.

In regards to an example uplink transmission, UE 104 further includes a transmit processor 364 that may receive and process data (e.g., for the PUSCH) from a data source 362 and control information (e.g., for the physical uplink control channel (PUCCH)) from the controller/processor 380. Transmit processor 364 may also generate reference symbols for a reference signal (e.g., for the sounding reference signal (SRS)). The symbols from the transmit processor 364 may be precoded by a TX MIMO processor 366 if applicable, further processed by the modulators in transceivers 354a-354r (e.g., for SC-FDM), and transmitted to BS 102.

At BS 102, the uplink signals from UE 104 may be received by antennas 334a-t, processed by the demodulators in transceivers 332a-332t, detected by a RX MIMO detector 336 if applicable, and further processed by a receive processor 338 to obtain decoded data and control information sent by UE 104. Receive processor 338 may provide the decoded data to a data sink 314 and the decoded control information to the controller/processor 340.

Memories 342 and 382 may store data and program codes for BS 102 and UE 104, respectively.

Scheduler 344 may schedule UEs for data transmission on the downlink and/or uplink.

In various aspects, BS 102 may be described as transmitting and receiving various types of data associated with the methods described herein. In these contexts, "transmitting" may refer to various mechanisms of outputting data, such as outputting data from data source 312, scheduler 344, memory 342, transmit processor 320, controller/processor 340, TX MIMO processor 330, transceivers 332a-t, antenna 334a-t, and/or other aspects described herein. Similarly, "receiving" may refer to various mechanisms of obtaining data, such as obtaining data from antennas 334a-t, transceivers 332a-t, RX MIMO detector 336, controller/processor 340, receive processor 338, scheduler 344, memory 342, and/or other aspects described herein.

In various aspects, UE 104 may likewise be described as transmitting and receiving various types of data associated with the methods described herein. In these contexts, "transmitting" may refer to various mechanisms of outputting data, such as outputting data from data source 362, memory 382, transmit processor 364, controller/processor 380, TX MIMO processor 366, transceivers 354a-t, antenna 352a-t, and/or other aspects described herein. Similarly, "receiving" may refer to various mechanisms of obtaining data, such as obtaining data from antennas 352a-t, transceivers 354a-t, RX MIMO detector 356, controller/processor 380, receive processor 358, memory 382, and/or other aspects described herein.

In some aspects, a processor may be configured to perform various operations, such as those associated with the methods described herein, and transmit (output) to or receive (obtain) data from another interface that is configured to transmit or receive, respectively, the data.

In various aspects, artificial intelligence (AI) processors 318 and 370 may perform AI processing for BS 102 and/or UE 104, respectively, such as neural network processing, deep learning, tensor processing, etc. The AI processor 318 may include AI accelerator hardware or circuitry such as one or more neural processing units (NPUs), one or more neural network processors, one or more tensor processors, one or more deep learning processors, etc. The AI processor 370 may likewise include AI accelerator hardware or circuitry. As an example, the AI processor 370 may perform AI-based beam management, AI-based channel state feedback (CSF), AI-based antenna tuning, and/or AI-based positioning (e.g., non-line of sight positioning). In some cases, the AI processor 318 may process feedback from the UE 104 (e.g., CSF) using hardware accelerated AI inferences and/or AI training. The AI processor 318 may decode compressed CSF from the UE 104, for example, using a hardware accelerated AI inference associated with the CSF. In certain cases, the AI processor 318 may perform certain RAN-based functions including, for example, network planning, network performance management, energy-efficient network operations, etc.

FIGS. 4A, 4B, 4C, and 4D depict aspects of data structures for a wireless communications network, such as wireless communications network 100 of FIG. 1.

Figures 4A, 4B, 4C, 4D:
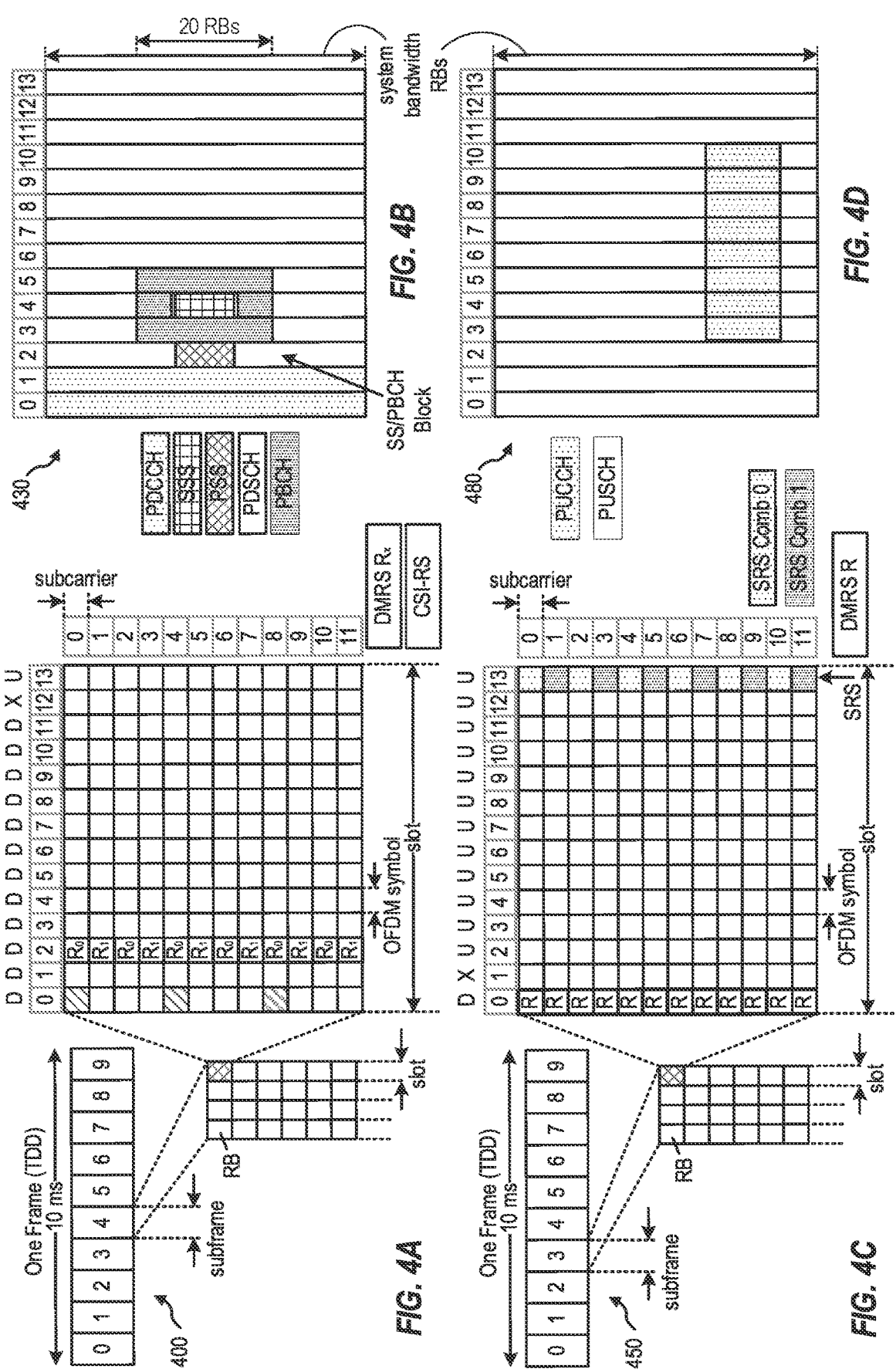
FIGS. 4A, 4B, 4C, and 4D depict various example aspects of data structures for a wireless communications network.

In particular, FIG. 4A is a diagram 400 illustrating an example of a first subframe within a 5G (e.g., 5G NR) frame structure, FIG. 4B is a diagram 430 illustrating an example of DL channels within a 5G subframe, FIG. 4C is a diagram 450 illustrating an example of a second subframe within a 5G frame structure, and FIG. 4D is a diagram 480 illustrating an example of UL channels within a 5G subframe.

Wireless communications systems may utilize orthogonal frequency division multiplexing (OFDM) with a cyclic prefix (CP) on the uplink and downlink. Such systems may also support half-duplex operation using time division duplexing (TDD). OFDM and single-carrier frequency division multiplexing (SC-FDM) partition the system bandwidth (e.g., as depicted in FIGS. 4B and 4D) into multiple orthogonal subcarriers. Each subcarrier may be modulated with data. Modulation symbols may be sent in the frequency domain with OFDM and/or in the time domain with SC-FDM.

A wireless communications frame structure may be frequency division duplex (FDD), in which, for a particular set of subcarriers, subframes within the set of subcarriers are dedicated for either DL or UL. Wireless communications frame structures may also be time division duplex (TDD), in which, for a particular set of subcarriers, subframes within the set of subcarriers are dedicated for both DL and UL.

In FIGS. 4A and 4C, the wireless communications frame structure is TDD where D is DL, U is UL, and X is flexible for use between DL/UL. UEs may be configured with a slot format through a received slot format indicator (SFI) (dynamically through DL control information (DCI), or semi-statically/statically through radio resource control (RRC) signaling). In the depicted examples, a 10 ms frame is divided into 10 equally sized 1 ms subframes. Each subframe may include one or more time slots. In some examples, each slot may include 12 or 14 symbols, depending on the cyclic prefix (CP) type (e.g., 12 symbols per slot for an extended CP or 14 symbols per slot for a normal CP). Subframes may also include mini-slots, which generally have fewer symbols than an entire slot. Other wireless communications technologies may have a different frame structure and/or different channels.

In certain aspects, the number of slots within a subframe (e.g., a slot duration in a subframe) is based on a numerology, which may define a frequency domain subcarrier spacing and symbol duration as further described herein. In certain aspects, given a numerology u, there are $2^\mu$ slots per subframe. Thus, numerologies ($\mu$) 0 to 6 may allow for 1, 2, 4, 8, 16, 32, and 64 slots, respectively, per subframe. In some cases, the extended CP (e.g., 12 symbols per slot) may be used with a specific numerology, e.g., numerology 2 allowing for 4 slots per subframe. The subcarrier spacing and symbol length/duration are a function of the numerology. The subcarrier spacing may be equal to $2^\mu \times 15$ kHz, where u is the numerology 0 to 6. As an example, the numerology $\mu=0$ corresponds to a subcarrier spacing of 15 kHz, and the numerology $\mu=6$ corresponds to a subcarrier spacing of 960 kHz. The symbol length/duration is inversely related to the subcarrier spacing. FIGS. 4A, 4B, 4C, and 4D provide an example of a slot format having 14 symbols per slot (e.g., a normal CP) and a numerology $\mu=2$ with 4 slots per subframe. In such a case, the slot duration is 0.25 ms, the subcarrier spacing is 60 kHz, and the symbol duration is approximately 16.67 μs.

As depicted in FIGS. 4A, 4B, 4C, and 4D, a resource grid may be used to represent the frame structure. Each time slot includes a resource block (RB) (also referred to as physical RBs (PRBs)) that extends, for example, 12 consecutive subcarriers. The resource grid is divided into multiple resource elements (REs). The number of bits carried by each RE depends on the modulation scheme including, for example, quadrature phase shift keying (QPSK) or quadrature amplitude modulation (QAM).

As illustrated in FIG. 4A, some of the REs carry reference (pilot) signals (RS) for a UE (e.g., UE 104 of FIGS. 1 and 3). The RS may include demodulation RS (DMRS) and/or channel state information reference signals (CSI-RS) for channel estimation at the UE. The RS may also include beam measurement RS (BRS), beam refinement RS (BRRS), and/or phase tracking RS (PT-RS).

FIG. 4B illustrates an example of various DL channels within a subframe of a frame. The physical downlink control channel (PDCCH) carries DCI within one or more control channel elements (CCEs), each CCE including, for example, nine RE groups (REGs), each REG including, for example, four consecutive REs in an OFDM symbol.

A primary synchronization signal (PSS) may be within symbol 2 of particular subframes of a frame. The PSS is used by a UE (e.g., 104 of FIGS. 1 and 3) to determine subframe/symbol timing and a physical layer identity.

A secondary synchronization signal (SSS) may be within symbol 4 of particular subframes of a frame. The SSS is used by a UE to determine a physical layer cell identity group number and radio frame timing.

Based on the physical layer identity and the physical layer cell identity group number, the UE can determine a physical cell identifier (PCI). Based on the PCI, the UE can determine the locations of the aforementioned DMRS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and/or paging messages.

As illustrated in FIG. 4C, some of the REs carry DMRS (indicated as R for one particular configuration, but other DMRS configurations are possible) for channel estimation at the base station. The UE may transmit DMRS for the PUCCH and DMRS for the PUSCH. The PUSCH DMRS may be transmitted, for example, in the first one or two symbols of the PUSCH. The PUCCH DMRS may be transmitted in different configurations depending on whether short or long PUCCHs are transmitted and depending on the particular PUCCH format used. UE 104 may transmit sounding reference signals (SRS). The SRS may be transmitted, for example, in the last symbol of a subframe. The SRS may have a comb structure, and a UE may transmit SRS on one of the combs. The SRS may be used by a base station for channel quality estimation to enable frequency-dependent scheduling on the UL.

FIG. 4D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

In certain cases, a wireless communications system (e.g., a WWAN including, for example, a 5G New Radio system and/or any future wireless communications system) may employ AI/ML to perform any of various wireless communication operations, such as channel state information estimation, beam management, device positioning, etc. As an example, an AI/ML model (e.g., a joint inference model used at the UE) may allow the UE to estimate the channel conditions of a particular communication link (e.g., one or more beams and/or frequency bands) based on measurements associated with a different communication link (e.g., different beams and/or frequency bands). As an example, the AI/ML model may allow a UE to predict the channel conditions associated with one or more narrow beams based on channel measurements associated with one or more wide beams. In certain aspects, a joint inference may be used at a UE and a network entity in a RAN. In such cases, the network entity (e.g., a base station) may perform certain AI/ML computations based at least in part on AI/ML input obtained from the UE (e.g., decoding or decompression of AI/ML-based feedback or input from the UE).

As an example, an AI/ML-based channel state information feedback (CSF) encoder may be deployed at the UE to provide compressed CSI (which may be readable by an AI/ML model) to the RAN, and an AI/ML-based CSF decoder may be deployed at the network entity to decompress the CSF and use the CSF for channel scheduling and/or configuration of a communication link with the UE and/or other UEs. In some cases, the AI/ML model may be used to predict or infer the channel conditions associated with the communication link between the UE and the network entity. The AI/ML-based channel conditions may be used to determine any of various wireless communication parameters associated with the communication link, such as a frequency band, subcarrier spacing, channel bandwidth, bandwidth part, time division duplex pattern, modulation and coding scheme (MCS), code rate, carrier aggregation, etc. In some cases, a partial inference may be performed at the UE, and then the remaining inference may be performed at the RAN, and/or vice versa. The UE may receive AI/ML specific control or input from the RAN, and/or vice versa. However, the AI/ML processing performed at the network entity, such as a base station and/or certain disaggregated entities thereof (e.g., a CU and/or DU), may be computationally intensive.

The AI/ML processing may use computational resources (e.g., processing and/or storage) that could be used for other operations (e.g., scheduling and/or managing wireless communications), especially when a base station is tasked with managing the communication links for multiple UEs and/or multiple ML models for one or more UEs. In some cases, the AI/ML processing may consume the processing capabilities of the base station to perform certain network functions, such as scheduling and/or wireless communications management, within a particular performance specification (e.g., a specified latency), or vice versa. In certain cases, deploying additional computational resources to base stations for AI/ML processing may be a costly endeavor for radio access network (RAN) operators.

Aspects Related to Management of Cross-Node Machine Learning Operations in a RAN Certain aspects of the present disclosure provide signaling to manage a cross-node AI/ML session between a UE and a RAN controller in a cloud-based RAN architecture, such as a V-RAN or O-RAN.

Generally, a cross-node AI/ML session between a UE and a network entity may refer to a scenario where a UE and a network entity perform AI/ML operations, for example, using a shared AI/ML function or model for predicting, inferring, encoding, and/or decoding certain information associated with a wireless communication link, such as channel characteristics, device positioning, and/or beam management. In certain cases, a cross-node AI/ML session may include a UE using an AI/ML model to predict, infer, encode, and/or decode the information associated with the wireless communication link, and the cross-node AI/ML session may further include the network entity monitoring the performance of the AI/ML model deployed at the UE and performing certain lifecycle management tasks associated with the AI/ML model. In some cases, the UE may send, to the network entity, AI/ML input(s) (e.g., measurements associated with channel conditions) and/or AI/ML output(s) (e.g., channel state feedback) for processing or monitoring at the network entity, or vice versa. As further described herein, the AI/ML processing at the RAN for a joint inference associated with a UE-network entity pair (e.g., a cross-node) may be offloaded to a separate computing device, such as a RIC in a cloud-based RAN architecture (e.g., V-RAN and/or O-RAN), independent from a base station and/or certain disaggregated network entities associated with a base station, such as an E2 node.

An E2 node may include any physical or logical node having a terminating E2 interface including, for example, a CU (for control plane and/or user plane traffic) and/or a DU. A cloud-based RAN may use a cloud computing environment to facilitate interoperable interfaces, RAN virtualization, and/or AI/ML operations. A cloud-based RAN may use a shared pool of configurable computing resources (e.g., networks, network bandwidth, servers, processing, memory, storage, applications, virtual machines, and services) to perform certain network functions, for example, as described herein with respect to FIG. 2. In some cases, the cloud-based RAN may use off-the-shelf hardware for the cloud computing environment, such as the SMO framework 205, Non-RT RIC 215, Near-RT RIC 225, CU 210, DU 230, etc.

In certain aspects, a base station (and/or certain disaggregated entities thereof) and a RAN controller (e.g., a near-RT RIC) may exchange certain AI/ML information to facilitate a cross-node AI/ML session between a UE and the RAN controller (e.g., a cross-node AI/ML inference session). For example, to enable cross-node AI/ML inference operations at the RAN controller (independent of a base station and/or certain disaggregated entities thereof), a base station in the cloud-based RAN may be configured to report AI/ML information (e.g., AI/ML input for an RAN-side inference and/or performance information for performance monitoring and life-cycle management) to the RAN controller via certain messages. The base station and the RAN controller may use a cross-node specific request, response, and/or generic message used in a cloud-based RAN system. The generic messages may include, for example, a RIC Indication message for sending information from the base station to the RIC and/or RIC control request for sending information from the RIC to the base station, as further described herein with respect to FIGS. 12 and 13.

For certain aspects, certain entities (e.g., a UE, base station, and/or a near-RT RIC) in the cloud-based RAN system may monitor the performance of a cross-node AI/ML session and/or perform life-cycle management tasks associated with the cross-node AI/ML session. For example, suppose AI/ML is used to estimate the channel state associated with a wireless communication link with a UE, a base station may monitor the performance of the communication link. The base station may compare the monitored performance of the communication link to the estimated channel state and/or and notify the near-RT RIC in response to the communication link failing to satisfy certain performance specifications (e.g., one or more quality-of-service (QOS) specifications). The near-RT RIC may adjust the cross-node AI/ML session (e.g., deactivating AI/ML operations and/or switching to a different model (or model structure)) in response to the notification from the base station. In certain aspects, certain life cycle management tasks may be performed by a base station and/or an xApp as further described herein with respect to FIGS. 14-16.

Figure 5A:
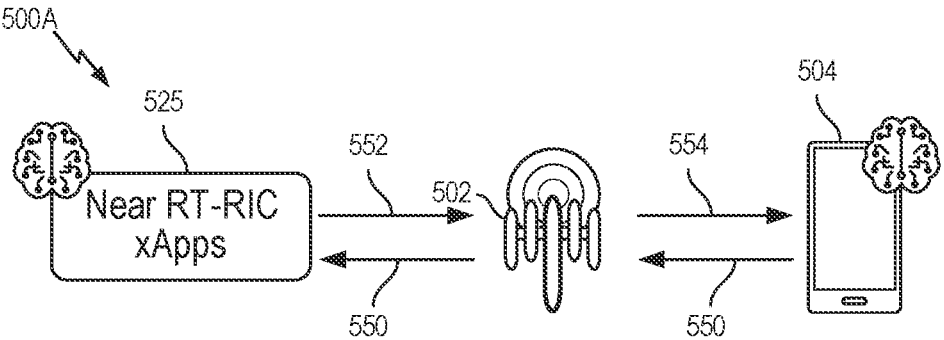
FIGS. 5A and 5B depict example communications flow associated with a cross-node artificial intelligence and/or machine learning (AI/ML) session between a UE and a radio access network (RAN) controller in example wireless communications networks, respectively.
Figure 5B:
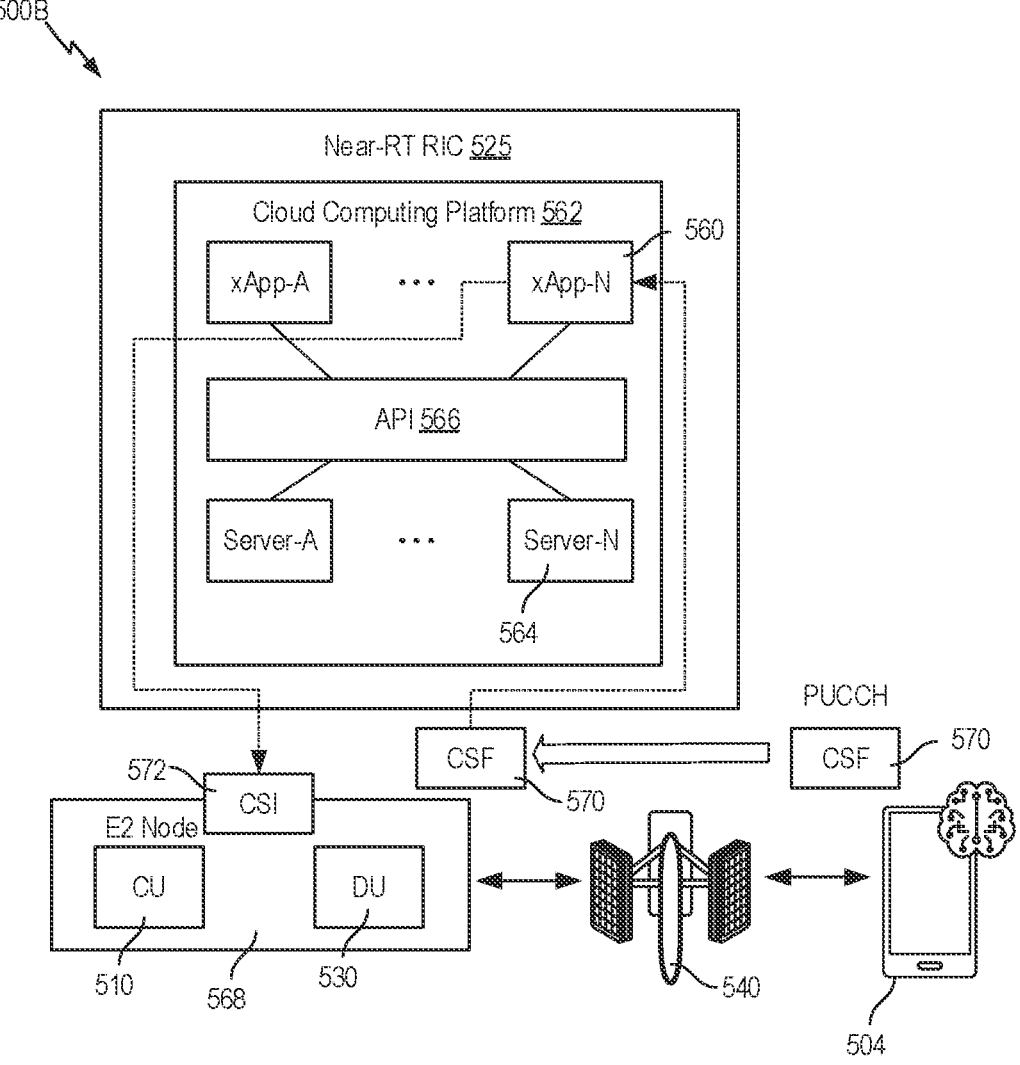

FIGS. 5A and 5B depict example communications flow associated with an example cross-node AI/ML session between a UE and a RAN controller in wireless communications networks 500A, 500B, respectively.

Referring to FIG. 5A, a UE 504 may provide AI/ML input 550 (e.g., CSF) to an xApp (e.g., the xApp 560 in FIG. 5B) running in a cloud platform (e.g., the cloud platform 562 including one or more (virtual) servers 564 in communication with the xApp 560 via an API 566) associated with a Near-RT RIC 525 via a base station 502. The xApp may be or include an application designed to run on the near-RT RIC. Such an application may include one or more microservices and at the point of on-boarding may identify which data the application consumes and which data the application provides. The xApp may be independent of the near-RT RIC and may be provided by any third party. The E2 may enable a direct association between the xApp and the RAN functionality. The xApp may process the AI/ML input 550 (e.g., decoding CSF obtained from the UE 504) and the xApp may output, to the base station 502, a RIC control message 552 (which may indicate AI/ML output and/or control information) based on the processed UE AI/ML input. The base station 502 may output, to the UE 504, an indication of AI/ML control information and/or input 554 (e.g., an updated AI model, communication link configuration, etc.) based on the RIC control message 552.

FIG. 5B illustrates an example where the cross-node AI/ML session facilitates channel state information feedback (CSF) from the UE 504 to a disaggregated base station (e.g., an E2 node 568 including a CU 510 and/or a DU 530). The UE 504 may provide encoded CSF 570 to the xApp 560 via a disaggregated base station (including an RU 540, a DU 530, and a CU 510, for example, as described in FIG. 2). The xApp 560 may decode the CSF to generate reconstructed CSI (e.g., via an AI/ML inference associated with the encoded CSF), and the xApp 560 may output the reconstructed CSI to an E2 node 568 including, for example, the CU 510 and/or the DU 530. The E2 node 568 may determine a configuration associated with the communication link between the UE 504 and the RU 540 based on the reconstructed CSI 572. For example, the E2 node 568 may adjust a modulation and coding scheme (MCS), a code rate (e.g., the proportion of the data-stream that is non-redundant), a number of aggregated component carriers, a number of MIMO layers, a channel bandwidth, a subcarrier spacing, a frequency range (e.g., FR1 or FR2 under 5G NR), a particular beam (e.g., orientation, direction, shape, etc.), etc.

The RAN-side AI/ML operation(s) associated with the cross-node AI/ML session may be performed at the Near-RT RIC 525 via a cloud platform 562 running the xApp 560, which may be or include an AI/ML-specific application. The RAN-side AI/ML operations may be offloaded from the CU 510 and/or DU 530 to the xApp 560 via the cross-node AI/ML session between the UE 504 and the Near-RT RIC 525, allowing the CU 510 and/or the DU 530 to perform other networking operations, such as scheduling and/or managing communication links (e.g., updating communication link settings) with one or more UEs.

In some cases, the cross-node AI/ML session between the UE 504 and the Near-RT RIC 525 may be used to perform AI/ML assisted CSI encoding/decoding, beam management, and/or device positioning. As an example, a CSF decoder may be deployed at the xApp 560 running at the Near-RT RIC 525 and/or the cloud platform 562 associated with the Near-RT RIC 525. The Near-RT RIC 525 and/or the cloud platform 562 may be collocated with the DU 530 and/or CU 510, for example. The xApp 560 may provide decompressed channel state information to the DU 530 and/or CU 510, which may perform scheduling functions, for example, based on the decompressed channel state information. The cross-node AI/ML session may allow secure AI/ML functions or models to be implemented at the encoder/decoder, for example.

In certain aspects, a cloud-based RAN controller (e.g., a Near-RT RIC) and/or E2 node may obtain capability information associated with a UE. The UE capability information may facilitate the RAN controller and/or E2 node to determine a cross-node AI/ML configuration for the UE. For example, the UE capability information may indicate one or more cross-node AI/ML capabilities associated with the UE, including, for example, an AI/ML function name or identifier, a module structure, an AI/ML feature, and/or an AI/ML feature group. The UE may indicate to the RAN which AI/ML features and corresponding models are supported by the UE.

In certain cases, the RAN may manage the UE AI/ML operations at a feature level, such as a CSI feedback feature, a beam management feature, a device positioning feature, etc. In such cases, the UE AI/ML capability information may include a list of one or more AI/ML feature names, for example, ml-CSIFeedback, ml-beamManagement, ml-Positioning, etc.

In some cases, the RAN may manage the AI/ML models associated with a feature (e.g., device positioning) used at a UE. In such cases, the UE AI/ML capability information may include a list of one or more AI/ML feature names, a list of one or more model identifiers supported per AI/ML feature name, and/or one or more indications that one or more specific models are loaded at the UE (e.g., model load state flag(s)).

In certain cases, the RAN may manage the model structure associated with an AI/ML model used at a UE. For example, the RAN may configure a specific model structure (e.g., indicating a model structure (MS) identifier (ID)) and/or a parameter set (PS) for a feature (e.g., beam management) used at the UE for one or more AI/ML models. As an example, the model structure may identify an architecture associated with a particular AI/ML model, such as decision tree, deep neural network, feedforward neural networks, convolutional neural networks, and transformers. In such cases, the UE AI/ML capability information may include a list of one or more AI/ML feature names and a list of one or more MS IDs supported per AI/ML feature name. In certain aspects, the PS values may not be expected to depend on UE capabilities, and thus, PS information may not be part of the UE capability information.

Example xApp Registration Procedure

Figure 6:
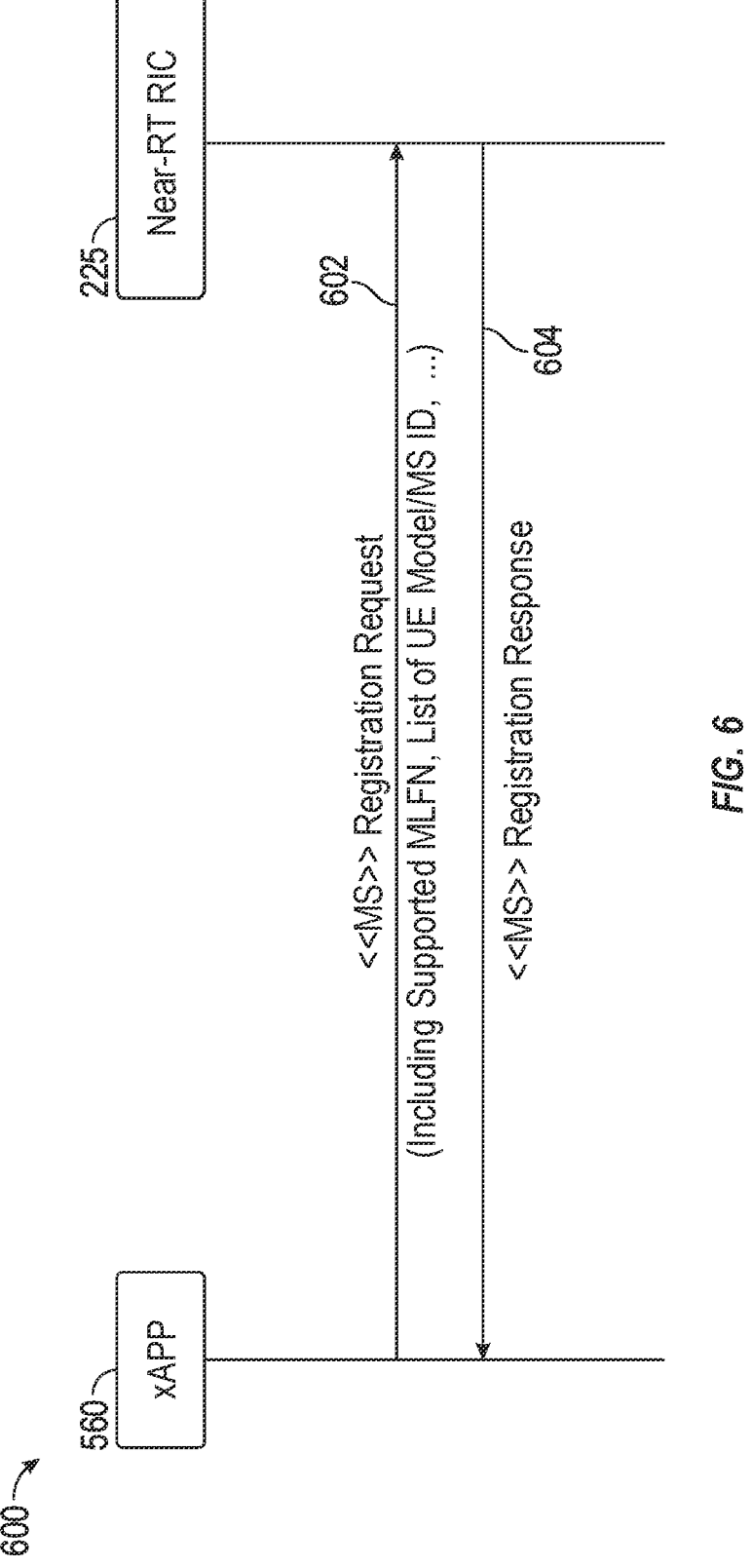
FIG. 6 illustrates a process flow for registering an RAN controller application (xApp) in a cloud-based RAN.

In certain aspects, the xApp may perform a registration procedure with the RIC (e.g., the Near-RT RIC). For example, FIG. 6 illustrates a process flow 600 for registering an xApp in a cloud-based RAN. In some aspects, the xApp 560 and/or the Near-RT RIC 225 may be or include one or more applications running on one or more computational devices, such as one or more (virtual) servers in a cloud platform (e.g., a cloud-based RAN). The communications between the xApp 560 and the Near-RT RIC 225 may represent communications among applications or software via an API, such as the API 566 of FIG. 5.

At 602, the xApp 560 sends a registration request to a RIC, such as the Near-RT RIC 225. During the xApp registration, the xApp may provide cross-node AI/ML information, including, for example, the RIC supported RAN function(s) and one or more decoders for UE-side models. The cross-node AI/ML information may include one or more AI/ML functions (e.g., CSF, beam management, and/or positioning), AI/ML features or feature groups (e.g., certain features associated with a function), AI/ML models (e.g., logical AI/ML models), AI/ML model structures (MSs), etc. supported for a cross-node AI/ML session between a UE and the xApp 560. In some cases, cross-node AIML information may include the machine learning function name(s) (MLFN), feature(s), and/or feature groups associated with the RAN-side AI/ML processing. The UE-side decoders may be indicated via a list of supported UE-side models and/or MS identifiers (IDs).

At 604, the Near-RT RIC 225 may send, to the xApp 560, a registration response to confirm or acknowledge the registration all or some of the features supported by the xApp 560. For xApp configuration updates, an SMO module of the cloud-based RAN may configure the xApp with updated cross-node AI/ML information (e.g., a new MLFN and/or new models or MSs per MLFN).

Example UE Capability Information Procedure

In certain aspects, the RIC may obtain UE capability information. For example, the RIC may determine various features associated with the cross-node AI/ML session based on the UE capability information as further described herein.

Figure 7:
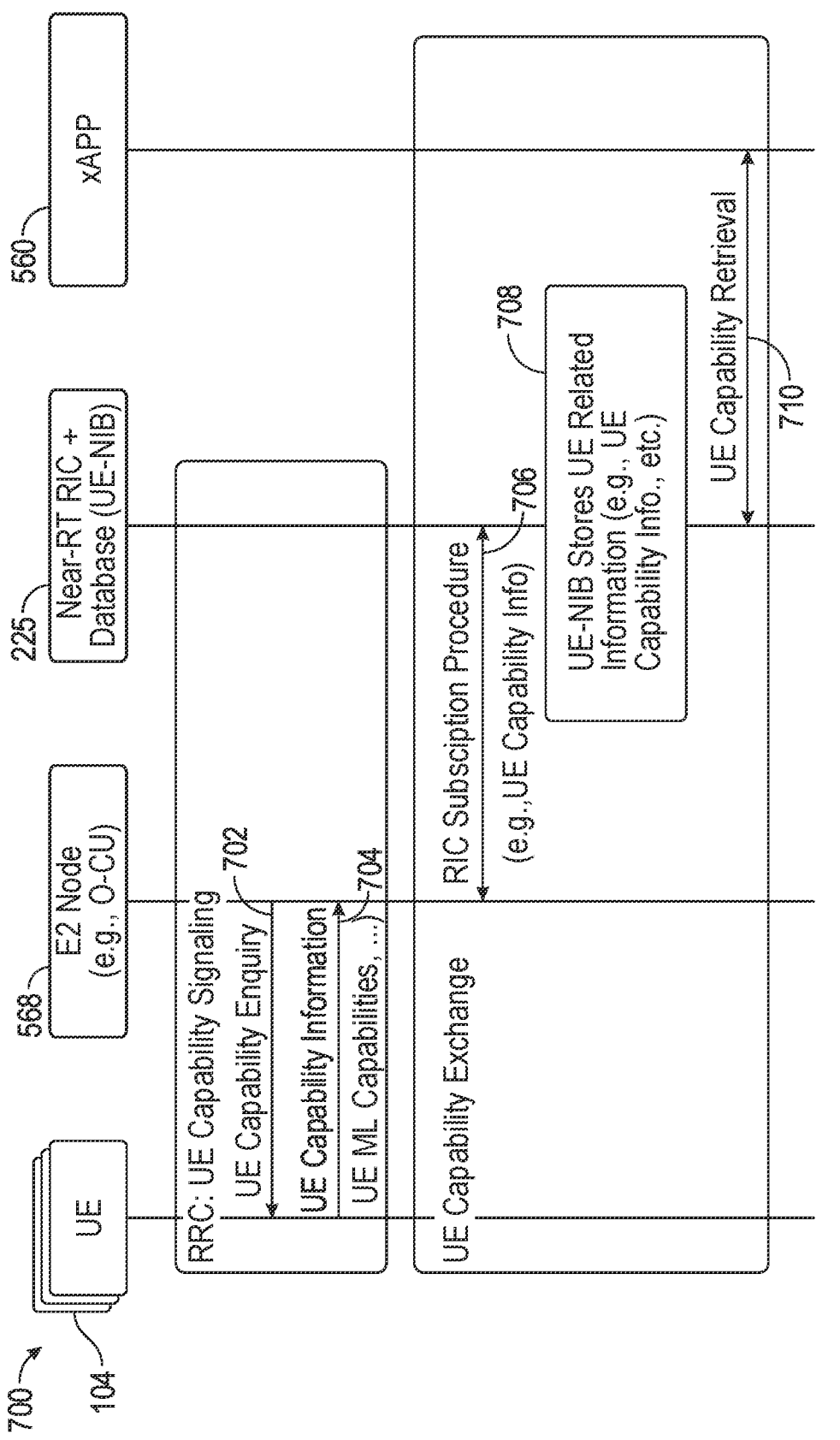
FIG. 7 illustrates a process flow for an RAN controller to obtain UE capability information.

FIG. 7 illustrates a process flow 700 for a RIC to obtain UE capability information. At 702, the E2 node 568 sends, to one or more UEs 104, a request for UE capability information. For example, the E2 node may request the UE capability information via RRC signaling, such as a UE capability enquiry.

At 704, in response to the UE capability enquiry, the UE(s) 104 sends, to the E2 node 568, the corresponding UE capability information. The UE capability information may indicate the AI/ML features or functions that the UE is capable of performing. For example, the UE capability information may include the MLFNs supported by the UE, AI/ML features or feature groups supported by the UE, and/or the MSs supported by the UE.

At 706, the E2 node 568 sends, to the Near-RT RIC 225, the UE capability information associated with a particular UE. For example, the E2 node 568 may provide the UE capability information via a RIC subscription procedure as further described herein with respect to FIG. 8A.

At 708, the Near-RT RIC 225 stores the UE capability information associated with a particular UE in a database, such as a UE network information base (UE-NIB). The UE-NIB may store information in the UE context including, for example, the UE Capability information. In the UE-NIB, the UE capability information for a given UE may be mapped to a UE identifier associated with the UE. The UE-NIB may allow the Near-RT RIC 225 to perform UE-specific control. For example, the Near-RT RIC 225 may provide a UE-specific configuration and/or instructions for cross-node AI/ML session. In some cases, the Near-RT RIC 225 may host the UE-NIB. In certain cases, UE-NIB may be accessible to the Near-RT RIC 225 and/or other entities in the cloud-based RAN, such as an xApp.

At 710, the xApp 560 obtains the UE capability information from the Near-RT RIC 225, for example, via the UE-NIB. In some cases, the xApp 560 may obtain the UE capability information via a fetch data procedure, where the xApp 560 may request data for which the xApp is authorized from the shared data layer (SDL) for local processing.

In certain cases, the xApp 560 may obtain the UE capability information via a subscribe-notify procedure followed by the fetch data procedure. The subscribe-notify procedure may involve the xApp subscribing to the SDL for notification of authorized data changes in the database (e.g., the UE-NIB), such as changes or updates to the UE-NIB. For example, the SDL may notify the xApp of a change to the UE-NIB, and then in response to such a notification, the xApp may perform a fetch data procedure to retrieve the UE capability information indicated as being updated or added to the UE-NIB. In some cases, the xApp 560 may obtain the UE capability information via a subscribe-push procedure, where the xApp 560 may subscribe to the SDL for authorized data changes in the database, and the SDL may send, to the xApp, the type of information changes (e.g., certain meta-data) and, in the same message, the updated data (e.g., UE capability information).

Example Cross-Node AI/ML Support Procedures

Figures 8A, 8B:
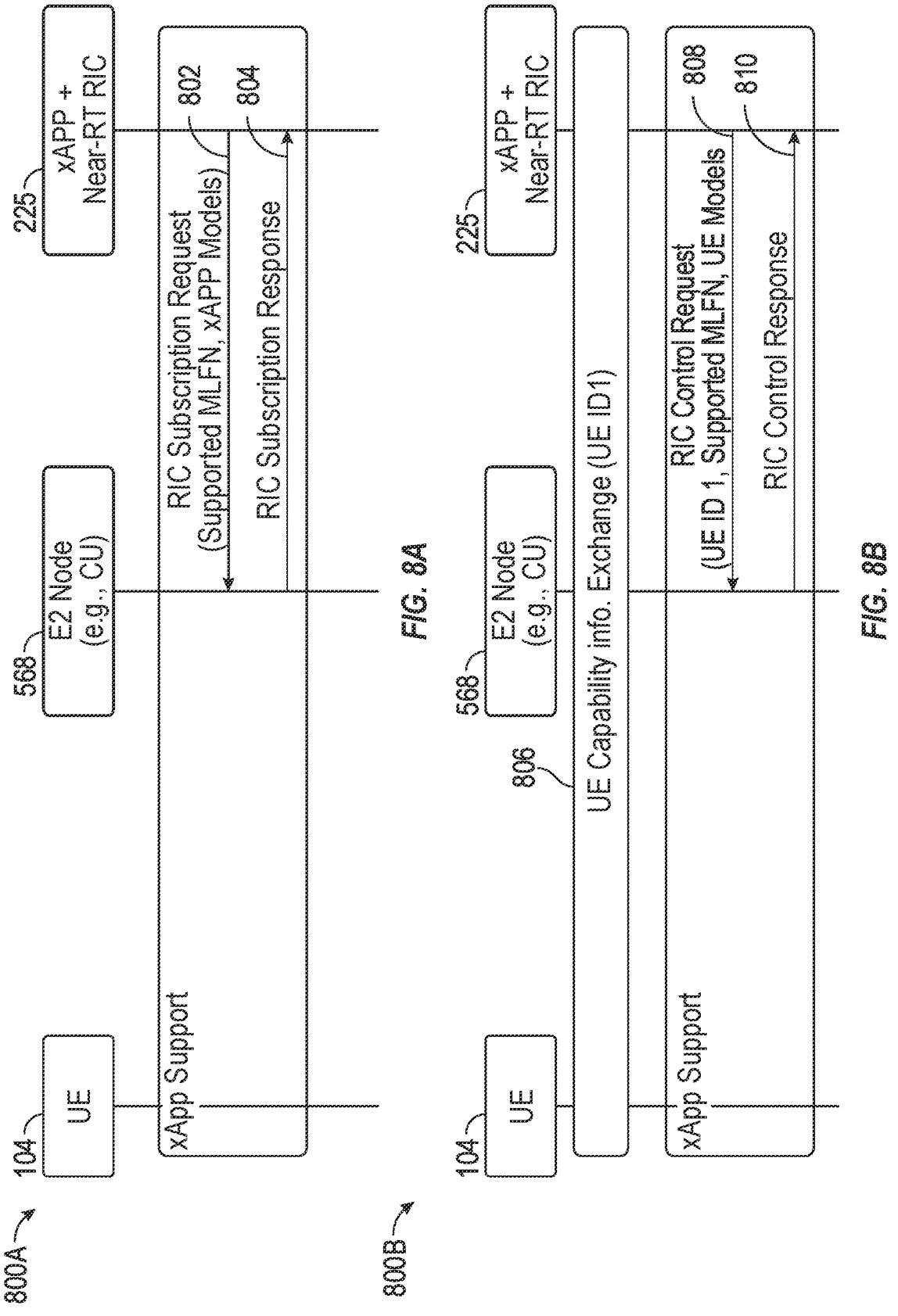
FIG. 8A illustrates a process flow of an example RAN controller subscription procedure for sending certain cross-node AI/ML information to an E2 node.
FIG. 8B illustrates a process flow of an example RAN control procedure for sending certain cross-node AI/ML information to the E2 node.

FIGS. 8A and 8B illustrate example process flows 800A, 800B for providing certain cross-node AI/ML information to one or more network entities associated with a (disaggregated) base station (e.g., an E2 node). The cross-node AI/ML information may enable the E2 node to configure one or more UEs for one or more cross-node AI/ML sessions and/or relay information (e.g., control information, AI/ML feedback, and/or AI/ML training data, AI/ML model data, etc.) associated with cross-node AI/ML session(s) between the RIC to the UE(s) as further described herein.

Regarding FIG. 8A, the process flow 800A depicts an example RIC subscription procedure for sending certain cross-node AI/ML information to the E2 node. In some cases, the RIC subscription procedure may occur before a RIC (e.g., a Near RT RIC) is aware of or has access to (e.g., via the UE-NIB as described herein with respect to FIG. 7) certain UE-specific information including, for example, UE-supported models (e.g., CSF encoder models).

At 802, the Near-RT RIC 225 sends, to the E2 node 568, a RIC subscription request indicating certain RIC-specific information for a cross-node AI/ML session between the UE 104 and the Near-RT RIC 225. The RIC-specific information may indicate or include, for example, cross-node AI/ML support associated with an xApp. The RIC-specific information may indicate or include the MLFNs, AI/ML features, and/or AI/ML feature groups supported at the RIC. The RIC-specific information may include or indicate one or more xApp models, pairing information between UE-side models and xApp-side models, and/or a list of UE-side models supported by the xApp (e.g., available for activating at a UE) and/or currently activated at a UE.

At 804, the E2 node 568 may send, to the Near-RT RIC 225, a RIC subscription response confirming or acknowledging the RIC-specific information received at 802. The information obtained via the RIC subscription request may allow the E2 node to configure a UE for a cross-node AI/ML session between the UE 104 and the Near-RT RIC 225, relay communications between the UE 104 and the Near-RT RIC 225, and/or manage the communication link between the UE and the E2 node 568 based on instructions and/or AI/ML output data (e.g., decoded CSF) from the Near-RT RIC 225.

With respect to FIG. 8B, the process flow 800B illustrates a RIC control procedure for sending certain cross-node AI/ML information to the E2 node. In some cases, the RIC control procedure may be used to convey, to the E2 node, the RIC-specific information as described herein with respect to FIG. 8A. In certain cases, the RIC control procedure may be used to convey, to the E2 node, UE-specific information and/or other RIC-specific information in addition to or instead of the RIC-specific information described herein with respect FIG. 8B.

At 806, the Near-RT RIC 225 obtains UE capability information associated with a particular UE corresponding to a UE identifier (e.g., UE ID1). As an example, the UE capability information may be obtained at the Near-RT RIC 225 as described herein with respect to FIG. 7.

At 808, the Near-RT RIC 225 sends, to the E2 node 568, certain AI/ML information via a RIC control request. For example, the AI/ML information may indicate or include an instruction to configure a UE (by indicating the UE ID) for a cross-node AI/ML session, the MLFN, the AI/ML features, the AI/ML feature groups, and/or the UE-side model(s) for configuration at the UE.

At 810, the E2 node 568 may send, to the Near-RT RIC 225, a RIC control response confirming or acknowledging the AI/ML information obtained at 808. The RIC control response may indicate that the E2 node 568 has configured or will configure the UE 104 based on the configuration obtained at 808.

Example Communication Link for a Cross-Node AI/ML Session

Figure 9:
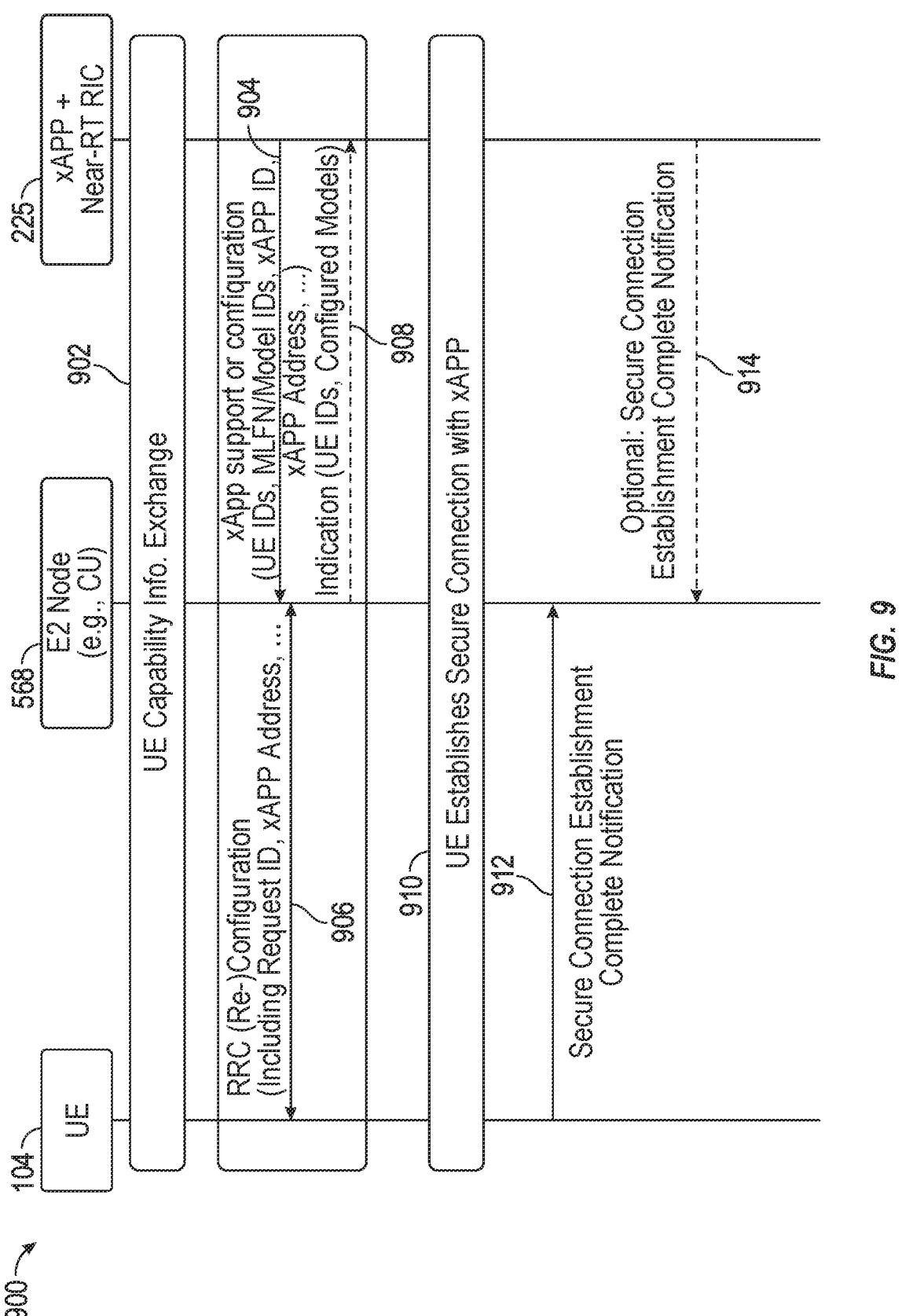
FIG. 9 illustrates an example process flow for certain signaling to establish a communication link for a cross-node AI/ML session between a UE and an xApp.

FIG. 9 illustrates an example process flow 900 for certain signaling to establish a communication link for a cross-node AI/ML session between the UE and the xApp. The communication link between the UE and the xApp may allow for cross-node a AI/ML cross-node session between the UE and the xApp that offload AI/ML processing from the E2 node 568 to the Near-RT RIC 225, for example. The UE may provide AI/ML input data to the xApp via the secure communication link, and the xApp may control the AI/ML operations at the UE via the secure communication link (e.g., a user-plane link or a user-plane tunnel) independent of the E2 node being aware of such control signaling and/or AI/ML feedback. Such a communication link may allow for a modular design of the AI/ML operations between the UE and the xApp independent of the E2 node.

At 902, the Near-RT RIC 225 obtains UE capability information associated with a particular UE. The UE capability information may correspond to a UE identifier (e.g., UE ID1) associated with the UE 104. As an example, the UE capability information may be obtained at the Near-RT RIC 225 as described herein with respect to FIG. 7.

At 904, the Near-RT RIC 225 sends, to the E2 node 568, an indication of certain cross-node AI/ML information including cross-node AI/ML features supported at the Near-RT RIC 225 and/or a configuration for a particular UE, for example, as described herein with respect to FIGS. 8A and 8B. The cross-node AI/ML information may indicate or include a session configuration including, for example, one or more AI/ML functions (e.g., CSF, beam management, and/or positioning), AI/ML features (or feature groups) (e.g., certain features associated with a function), AI/ML models, AI/ML model structures, etc. to use for the cross-node AI/ML session (e.g., via identifier(s) or name(s) associated with such AI/ML settings). In some cases, the session configuration may indicate or include a list of UE features, UE functionalities, and/or model IDs supported at the xApp, an xApp identifier or xApp address (e.g., a domain or internet protocol address associated with the xApp), and a configuration and/or information for establishing a secure connection between the UE and the xApp, in one example. In certain aspects, the session configuration may be addressed to a one or more UEs, xApp(s), Near-RT RIC(s), and/or any other entity associated with the AI/ML session, for example, using an identifier associated with the entity, including a UE ID or address, an xApp ID or address, a Near-RT RIC ID or address, etc.

At 906, the E2 node 568 configures the UE 104 for wireless communications, for example, via Layer 3 signaling (RRC signaling). As an example, the E2 node 568 may send, to the UE 104, an RRC configuration message or an RRC reconfiguration message indicating information to establish the communication link with the xApp, such as an xApp identifier or xApp address.

Optionally, at 908, the E2 node 568 may send, to the Near-RT RIC 225, an indication of the cross-node AI/ML configuration associated with and/or activated at the UE 104. For example, the E2 node 568 may provide an indication of the UE IDs and the AI/ML functions or models activated at the corresponding UEs. The E2 node 568 may provide such an indication where the E2 node selects the UE(s) and/or the configuration(s) for the cross-node AI/ML session between the UE 104 and the Near-RT RIC 225. The E2 node 568 may send the indication to the xApp, if the E2 node selects the UE(s) and corresponding configuration(s), for example, as described herein with respect to FIG. 11.

At 910, the UE 104 establishes a communication link (e.g., a secure user-plane connection) with the xApp. The UE 104 may communicate with the xApp via the communication link, such as a user-plane link between the UE 104 and the xApp. The user-plane link may allow the UE 104 and the xApp to communicate certain cross-node AI/ML information (e.g., AI/ML feedback, ground truth(s), training data, model data, model structures, configuration(s), request(s), response(s), instruction(s), etc.) independent of the E2 node being aware of such information.

As an example, the xApp may send, to the UE 104, one or more pre-trained AI/ML models and/or information representative of the AI/ML model(s) (including, for example, a set of model parameters and/or hyperparameters, a model structure or model architecture, or any other structured or unstructured data describing the model is such a way that it may be implemented on a device) via the secure communication link with the xApp. In some cases, the xApp may send training data to the UE 104 via the communication link, and the UE 104 may use the training data to train or fine-tune an untrained or partially trained AI/ML model, for example, used for generating CSF at the UE 104. In certain cases, the xApp may update or reconfigure an AI/ML function or model used at the UE 104 via the communication link. In some cases, the UE 104 may send, to the xApp, AI/ML input data and/or feedback for the xApp inference or a federated model via the communication link with the xApp.

The communication link may allow a cross-node AI/ML session between the UE 104 and the xApp without the E2 node being aware of the actual model or model structure used at the UE 104 facilitating such a session. The communication link may allow the transfer of AI/ML model(s) to the UE 104 and/or the transfer of AI/ML input data to the Near-RT RIC 225 without the E2 node being aware of the actual AI/ML models or input. The communication link may facilitate a modular design in the cloud-based RAN where the Near-RT RIC 225 may configure and/or service cross-node AI/ML sessions the UE 104 and the Near-RT RIC 225. The communication link may allow for a modular design for the cross-node AI/ML session that offloads certain processing and/or certain communications at the E2 node 568 to the Near-RT RIC 225.

At 912, the UE 104 may send, to the E2 node 568, an indication that the secure connection between the UE 104 and xApp has been established.

Optionally, at 914, the Near-RT RIC 225 may send, to the E2 node 568, an indication that the secure connection between the UE 104 and xApp has been established. Such an indication may enable to the E2 node 568 to be aware of the connection between the UE 104 and xApp. The E2 node 568 may take measures to preserve the connection between the UE 104 and xApp, for example, in response to changes in channel conditions between the UE 104 and the E2 node 568, network resources (e.g., load or capacity), UE mobility, etc.

Example Cross-Node AI/ML Session Request Procedure

In certain aspects, the UE 104 and/or E2 node 568 may initialize the procedure to establish a cross-node AI/ML session between the UE and the Near-RT RIC 225. For example, as the UE 104 may be capable of performing AI/ML operations (e.g., AI-enhanced CSF, AI-enhanced beam management, AI-enhanced positioning, etc.), the UE 104 may request to establish a cross-node AI/ML session with the Near-RT RIC 225, for example, as described herein with respect to FIGS. 5A and 5B.

Figure 10:
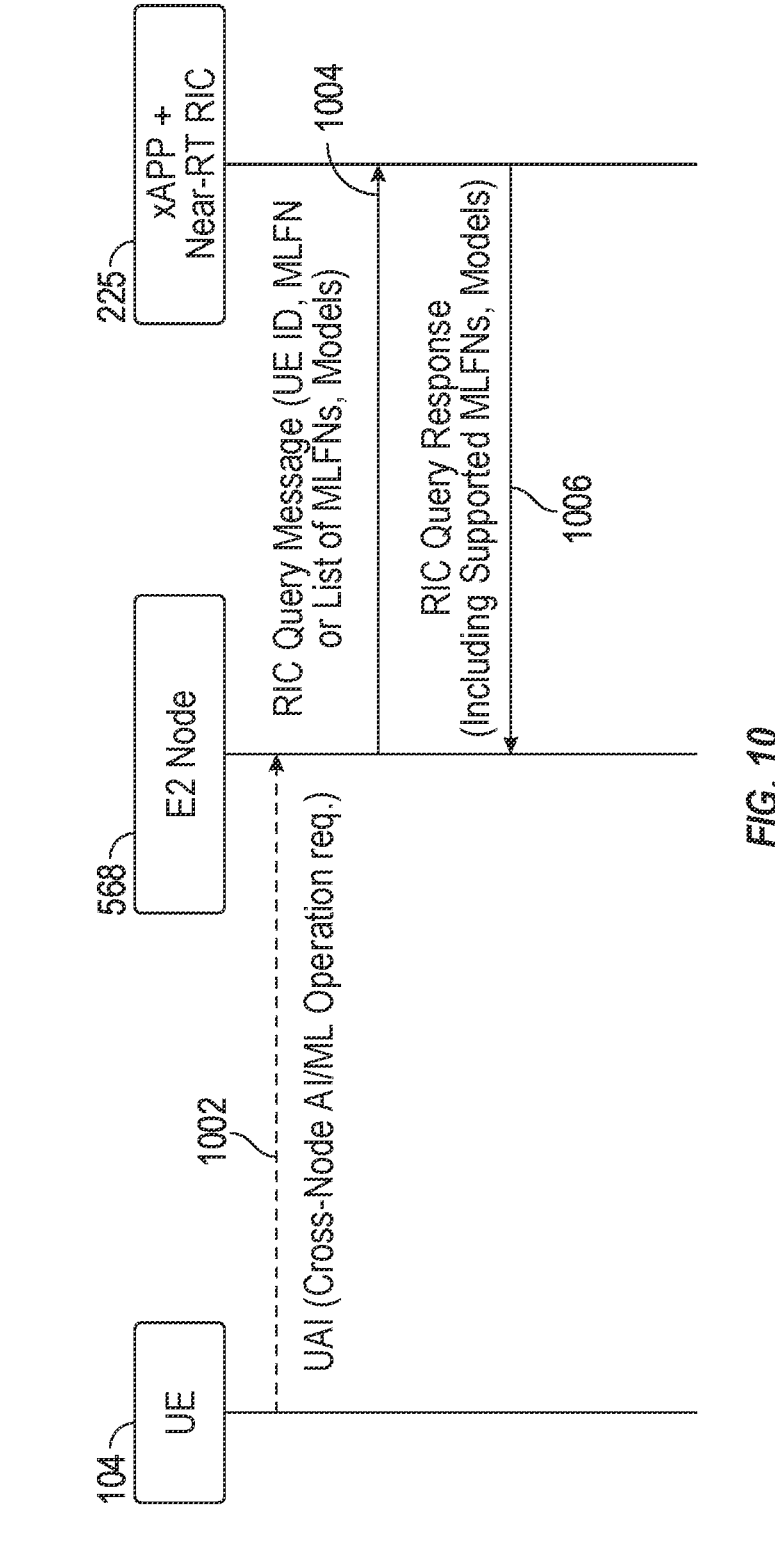
FIG. 10 illustrates an example process flow for certain signaling to initialize a cross-node AI/ML session via a request from a UE and/or an E2 node.

FIG. 10 illustrates an example process flow 1000 for certain signaling to initialize a cross-node AI/ML session via a request from the UE and/or the E2 node.

Optionally, at 1002, the UE 104 may send, to the E2 node 568, a request to establish (or initiate) a cross-node AI/ML session between the UE 104 and the Near-RT RIC 225. As an example, the request may be sent via RRC signaling, such as UE assistance information (UAI). In some cases, the request may indicate or include a certain AI/ML configuration associated with the cross-node AI/ML session. For example, the requested configuration may indicate or include a session configuration to use for the cross-node AI/ML session (e.g., as indicated via identifier(s) or name(s) associated with such AI/ML settings).

At 1004, the E2 node 568 sends, to the Near-RT RIC 225, a request to establish a cross-node AI/ML session between the UE 104 and the Near-RT RIC 225. The request may be sent via a RIC query message including, for example, a RIC indication message and/or a RIC control message. The request may indicate or include a UE identifier (ID) associated with the UE requesting the cross-node AI/ML session (e.g., the UE 104), the UE requested AI/ML configuration, and/or a separate AI/ML configuration determined at the E2 node 568. The E2 node 568 may check if the Near-RT RIC can support the configuration as requested by the UE 104. In some cases, the E2 node may request the Near-RT RIC 225 to provide a cross-node AI/ML configuration and/or cross-node AI/ML features supported at the Near-RT RIC 225.

At 1006, the Near-RT RIC 225 sends, to the E2 node 568, a response to the request. The response may be sent via a RIC query response message including, for example, a RIC indication message and/or a RIC control message. The Near-RT RIC 225 may determine if the xApp can support the UE/E2 node requested configuration. In some cases, the response may indicate or include the list of MLFN, model IDs, configurations, etc. that can be supported by the Near-RT RIC 225 for a cross-node AI/ML session. The response may indicate or include a cross-node AI/ML configuration for the UE 104. For example, the response may indicate or include a session configuration (supported by the Near-RT RIC 225) to use for the cross-node AI/ML session (e.g., via identifier(s) or name(s) associated with such AI/ML settings). The E2 node 568 may configure the UE 104 for the cross-node AI/ML session between the UE 104 and the Near-RT RIC 225, as further described herein.

Example Cross-Node AI/ML Session Configuration Procedure

In certain aspects, the E2 node 568 and/or the Near-RT RIC 225 may configure the UE 104 for a cross-node AI/ML session between the UE 104 and the Near-RT RIC 225, for example, as described herein with respect to FIGS. 5A and 5B. For example, the E2 node 568 and/or the Near-RT RIC 225 may perform the selection of the AI/ML model and/or model structure to be used at the UE 104 and/or the Near-RT RIC 225. In some cases, the Near-RT RIC 225 may request the E2 node 568 to report the UE status and/or cross-node AI/ML configuration implemented at the UE 104.

Figure 11:
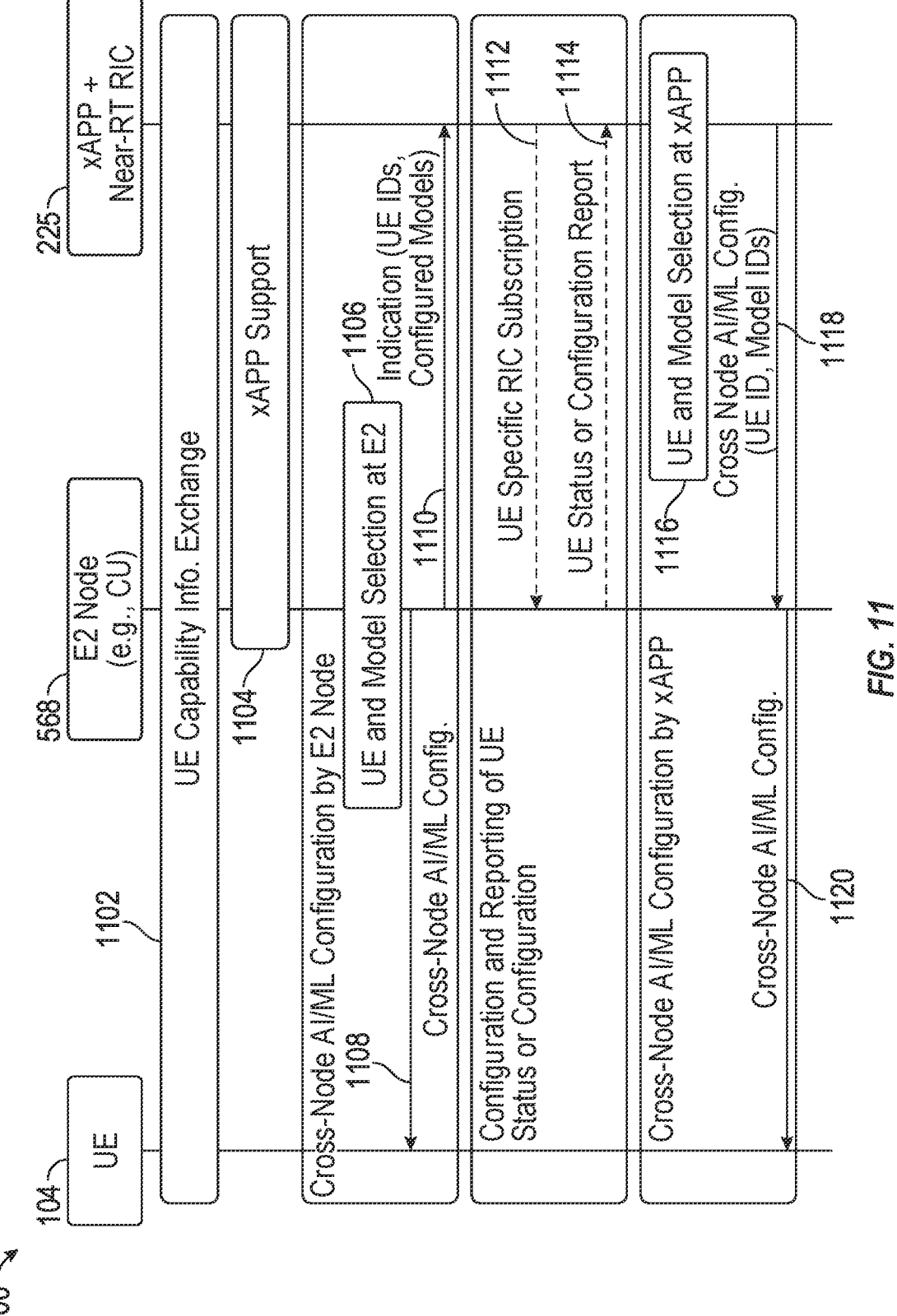
FIG. 11 illustrates an example process flow for certain signaling to configure a cross-node AI/ML session for a UE by an E2 node and/or an xApp.

FIG. 11 illustrates an example process flow 1100 for certain signaling to configure a cross-node AI/ML session for a UE by an E2 node and/or an xApp.

At 1102, the Near-RT RIC 225 obtains UE capability information associated with a particular UE (e.g., UE 104), for example, as described herein with respect to FIG. 7.

At 1104, the Near-RT RIC 225 notifies the E2 node 568 of the cross-node AI/ML features supported at the Near-RT RIC 225, for example, as described herein with respect to FIG. 8A, FIG. 8B, and/or FIG. 9.

Optionally, at 1106, the E2 node 568 may determine the UE configuration (e.g., a session configuration) for the cross-node AI/ML session between the UE 104 and the Near-RT RIC 225. The E2 node 568 may select any of various parameters for the cross-node-AI/ML session, such as one or more parameters for a session configuration to be used at the UE 104. The E2 node 568 may consider or take into account the cross-node AI/ML capabilities associated with the UE 104 and/or the Near-RT RIC 225.

At 1108, the E2 node 568 may send, to the UE 104, an indication of the UE configuration for the cross-node AI/ML session between the UE 104 and the Near-RT RIC 225. The UE configuration may be sent to the UE 104 via control signaling, such as Layer 1 (L1) signaling (e.g., DCI), Layer 2 (L2) signaling (e.g., MAC signaling), Layer 3 (L3) signaling (e.g., RRC signaling), and/or system information.

At 1110, the E2 node 568 may send, to the Near-RT RIC 225, an indication of the UE configuration (selected by the E2 node 568) for the cross-node AI/ML session between the UE 104 and the Near-RT RIC 225. The UE configuration may be sent to the Near-RT RIC 225, for example, via a RIC indication message and/or a RIC control message. The UE configuration may correspond to the UE 104 via a UE identifier associated with the UE 104. The UE configuration may indicate or include the UE identifier to which such configuration corresponds. In some cases, the UE identifier associated with the UE configuration may be implicitly or explicitly indicated.

Optionally, at 1112, the Near-RT RIC 225 may send, to the E2 node 568, a request to report certain information associated with the cross-node AI/ML session, such as the UE configuration for the cross-node AI/ML session, the UE status, and/or certain information associated with the communication link between the UE 104 and the E2 node. The request may be sent via a UE-specific RIC subscription message, an indication message originating from near-RT RIC, and/or a RIC control message. In some cases, the Near-RT RIC 225 may request such information to determine the state of the cross-node AI/ML session, for example, as configured and/or activated by the E2 node 568 at 1108. In certain cases, the Near-RT RIC 225 may request such information to determine the UE configuration for the cross-node, for example, to be configured and/or activated by the Near-RT RIC 225 at 1118.

The UE status may indicate or include whether the cross-node AI/ML session is configured, activated, and/or deactivated at the UE 104. In certain aspects, the UE status may indicate or include the current communication state associated with the UE 104, for example, RRC connected, RRC idle, or RRC inactive. In some cases, the Near-RT RIC 225 request certain information associated with the communication link between the UE 104 and the E2 node 568, such as the frequency range, the frequency band, the component carrier(s) (e.g., carrier aggregation and/or dual connectivity), the modulation and coding scheme (MCS), the code rate (e.g., the proportion of the data-stream that is non-redundant), the number of aggregated component carriers, the number of MIMO layers, the channel bandwidth, the subcarrier spacing, etc., associated with the communication link.

At 1114, the E2 node 568 may send, to the Near-RT RIC 225, the information requested by the Near-RT RIC 225, such as the UE state and/or the UE configuration for the cross-node AI/ML session, at 1112.

Optionally, at 1116, the Near-RT RIC 225 may determine the UE configuration for the cross-node AI/ML session. For example, the Near-RT RIC 225 may determine the UE configuration based on the information obtained at any of activities 1102, 1104, and 1114.

At 1118, the Near-RT RIC 225 may send, to the E2 node 568, an indication of the UE configuration for the cross-node AI/ML session between the UE 104 and the Near-RT RIC 225. For example, the UE configuration may indicate or include a session configuration to be used at the UE 104. The UE configuration may indicate or include the UE identifier to which such configuration corresponds. In some cases, the UE identifier associated with the UE configuration may be implicitly or explicitly indicated by the Near-RT RIC 225.

At 1120, the E2 node 568 may send, to the UE 104, an indication of the UE configuration (selected by the Near-RT RIC 225) for the cross-node AI/ML session between the UE 104 and the Near-RT RIC 225. The UE configuration may be sent to the UE 104 via control signaling, such as RRC signaling, MAC signaling, DCI, and/or system information. As described herein with respect to FIG. 9, the UE configuration may allow the UE 104 to communicate with the Near-RT RIC 225 via a secure connection or communication link (e.g., a user-plane communication link).

Figure 12:
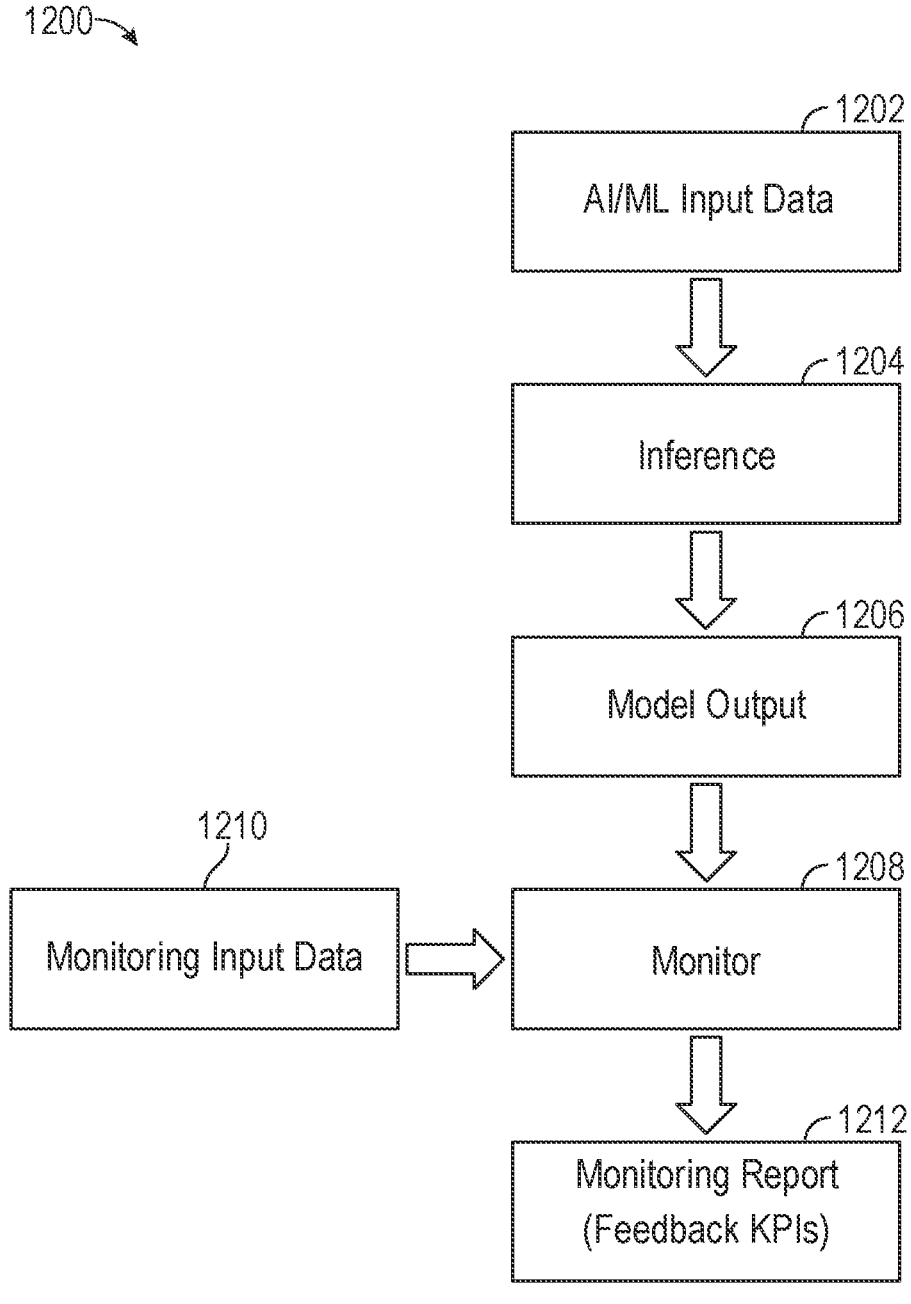
FIG. 12 is a diagram illustrating an example data flow for inference and monitoring operations associated with a cross-node AI/ML session between a UE and a RAN controller in a cloud-based RAN architecture.

Example Cross-Node AI/ML Session Inference and Lifecycle Management Operations FIG. 12 is a diagram illustrating an example data flow 1200 for inference and monitoring operations associated with a cross-node AI/ML session between a UE and a RAN controller in a cloud-based RAN architecture. In this example, AI/ML input data 1202 may be obtained at a network entity (e.g., the near-RT RIC 525 in FIG. 5B) associated with a cross-node AI/ML session. A UE and/or an E2 node may generate the AI/ML input data, and the E2 node may provide or relay the AI/ML input data to the cross-node network entity. At block 1204, the cross-node network entity may perform an AIML inference on the input data 1202 to generate model output 1206 (e.g., reconstructed CSI, beam management instructions/configuration, and/or a device position). An AI/ML inference may refer to the process of running input data into an AI/ML model to determine an output, such as one or more numerical scores, identifications, classifications, or categorizations.

At block 1208, a UE, base station, and/or RAN controller (e.g., the near-RT RIC) may monitor the performance of cross-node AI/ML session based at least in part on the model output 1206 and/or monitoring input data 1210. The monitoring input data 1210 may include any of various performance indicators, such as inference performance indicator(s) and/or system performance indicator(s). An inference performance indicator may track inference performance with respect to ground truth, for example. The inference performance indicator may include an inference threshold (e.g., a minimum mean square error (MMSE)) compared to a ground truth, inference latency, etc. System performance indicator(s) may track system performance when AI/ML inference is in operation. A system performance indicator may include network loading, uplink and/or downlink throughput, round-trip time delay, packet loss, radio link failure rates, etc. In some cases, some of the performance indicators may be referred to as a key performance indicator (KPI). However, the term "key" is not intended to invoke an "extremely or crucially important" or "necessary" meaning on any performance indicator. Rather, "key" in this context merely refers to a particular performance indicator selected for evaluating the cross-node AI/ML performance.

In certain aspects, the UE and/or base station may generate a monitoring report 1212 for the RAN controller to evaluate the cross-node AI/ML performance. The monitoring report 1212 may include certain KPIs for evaluating the cross-node AI/ML performance at the RAN controller. In certain aspects, the monitoring report 1212 may indicate a change in the communication link with the UE. The monitoring report 1212 may be provided to the RAN controller on a periodic basis (e.g., every 500 ms or a configurable periodicity) or in response to detecting a certain (configurable) event (such as a KPI being below a threshold).

The AI/ML performance monitoring may trigger certain lifecycle management tasks, such as model switching, model activation/deactivation, updating a model, etc. A life cycle management task may be performed in response to model or system performance not satisfying a threshold, for example, based on the monitoring report 1212. In some cases, a lifecycle management task may be performed in response to a change in the wireless communication link and/or network, such as settings change (e.g., number of antennas, number of carriers, MCS, MIMO layer(s), channel bandwidth, code rate, etc.), location or environment change (e.g., an indoor versus outdoor, macro cell versus pico cell or femto cell, etc.), a service change (e.g., a network slice, QoS flow, session, etc.), etc.

Example Cross-Node AI/ML Session Processing

In certain aspects, the cloud-based RAN controller (e.g., a near-RT RIC) may perform AI/ML processing (e.g., model inference) based on AI/ML input data (e.g., the AI/ML input data 1202) obtained from a UE and/or an E2 node.

Figure 13:
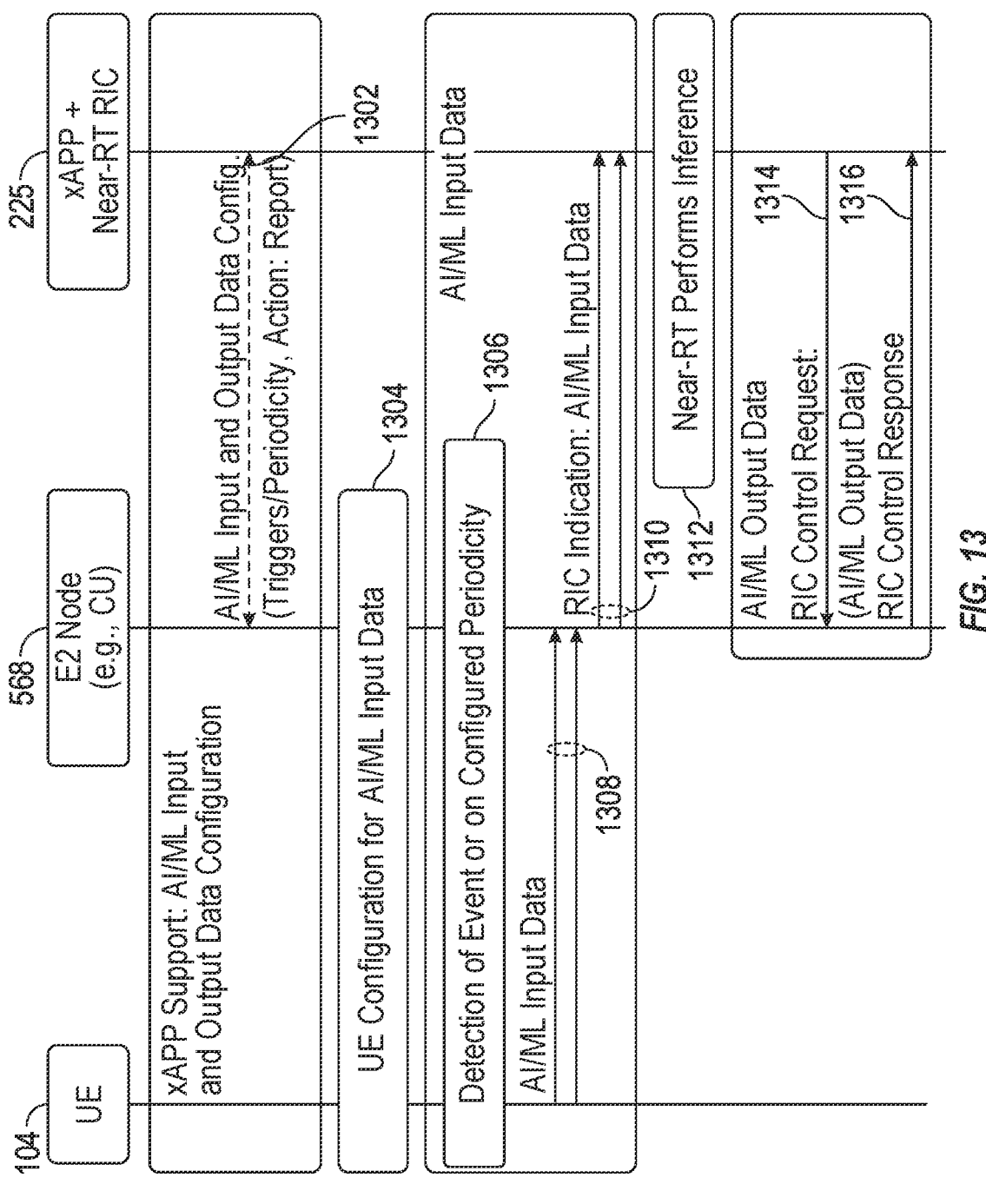
FIG. 13 illustrates an example process flow for providing AI/ML input data to a RAN controller and providing AI/ML output data to an E2 node via generic messaging.

FIG. 13 illustrates an example process flow 1300 for providing AI/ML input data to a RAN controller and providing AI/ML output data to an E2 node via generic messaging. The generic messaging may be used to communicate between a RIC and an E2 node, for example, via an E2 interface and/or an O2 interface.

Optionally, at 1302, the Near-RT RIC 225 may provide, to the E2 node 568, a configuration for communicating AI/ML input data (e.g., the AI/ML input data 1202) to the near-RT RIC 225. For example, the configuration for communicating AI/ML input data may indicate one or more triggering events and/or a periodicity for providing the AI/ML input data, the information to include in the AI/ML input data, and/or the one or more entities to report the AI/ML input data (e.g., a particular UE and/or E2 node). In some cases, the E2 node 568 may provide, to the near-RT RIC 225, a configuration for the AI/ML output data (e.g., the structure of the reconstructed CSI or the parameters expected in the reconstructed CSI). In certain cases, the Near-RT RIC 225 may provide the configuration for communicating AI/ML input data and/or output data via the RIC subscription procedure and/or a RIC control procedure, for example, as described herein with respect to FIG. 8A and/or FIG. 8B.

At 1304, the E2 node 568 may provide, to the UE 104, a configuration for reporting AI/ML input data to the near-RT RIC 225, for example, based on the configuration obtained at 1302. For example, the E2 node 568 may configure the UE 104 via any of various control signaling including, for example, RRC signaling, medium access control (MAC) signaling, downlink control information, and/or system information. A cross-node AI/ML session may be established between the UE 104 and the Near-RT RIC 225 as described herein with respect to FIG. 8A, FIG. 8B, FIG. 9, FIG. 10, and/or FIG. 11.

At 1306, in some cases, the UE 104 and/or the E2 node 568 may detect that an event for reporting AI/ML input data to the RIC is triggered. In certain cases, the UE 104 and/or the E2 node 568 may report the AI/ML input data periodically, for example, according to the configured periodicity.

At 1308, the UE 104 sends, to the E2 node 568, the UE-based AI/ML input data (e.g., compressed CSF, beam management feedback, UE-positioning feedback, etc.) in response to the detected event and/or periodicity. The UE 104 may send the UE-based AI/ML input data to the E2 node via any of various uplink channels, such as the PUCCH and/or PUSCH.

At 1310, the E2 node 568 sends, to the Near-RT RIC 225, AI/ML input data in response to the detected event, periodicity, and/or receiving UE-based AI/ML input data from the UE 104, for example, at 1308. The E2 node 568 may provide the AI/ML input data via generic RIC messaging, such as a RIC indication message. In some cases, the E2 node 568 may send E2 node-based AI/ML input data in addition to or instead of the UE-based AI/ML input data (e.g., the AI/ML input data sent at 1308). The E2 node 568 may send E2 node-based AI/ML input data with information specific to monitoring the communication link between the UE 104 and the E2 node 568 at the E2 node 568. For example, the E2 node-based AI/ML input data may indicate or include UE-specific information and/or RAN-specific information. The UE-specific information may include characteristics associated with the communication link between the UE and the E2 node, such as a channel quality or channel strength, a path loss, a modulation and coding scheme (MCS), a code rate (e.g., the proportion of the data-stream that is non-redundant), a number of aggregated component carriers, a number of MIMO layers, a channel bandwidth, a subcarrier spacing, a frequency range (e.g., FR1 or FR2), etc. The RAN-specific information may include RAN system characteristics, such as RAN load or capacity, channel load or capacity, communication interface load or capacity (e.g., fronthaul, midhaul, and/or backhaul), etc. In certain aspects, the UE-specific information may include information sampled at the UE, whereas the RAN-specific information may include information sampled at the RAN.

At 1312, the Near-RT RIC 225 performs an AI/ML inference based at least in part on the AI/ML input data obtained from the E2 node 568 and/or the UE 104. As an example, the Near-RT RIC 1314 may apply a joint inference shared with the UE 104 to decode compressed CSF generated at the UE 104.

At 1314, the Near-RT RIC 225 sends, to the E2 node 568, AI/ML output data (e.g., decoded CSF) via a generic RIC message, for example, a RIC control request. In some cases, the Near-RT RIC 225 may send an indication of the AI/ML output data, which may be or include an estimation of, a quantization of, and/or (an indirect) correspondence to the output data.

At 1316, the E2 node 568 may send, to the Near-RT RIC 225, response confirming or acknowledging the AI/ML output data obtained at 1314, for example, via a RIC control response.

Figure 14:
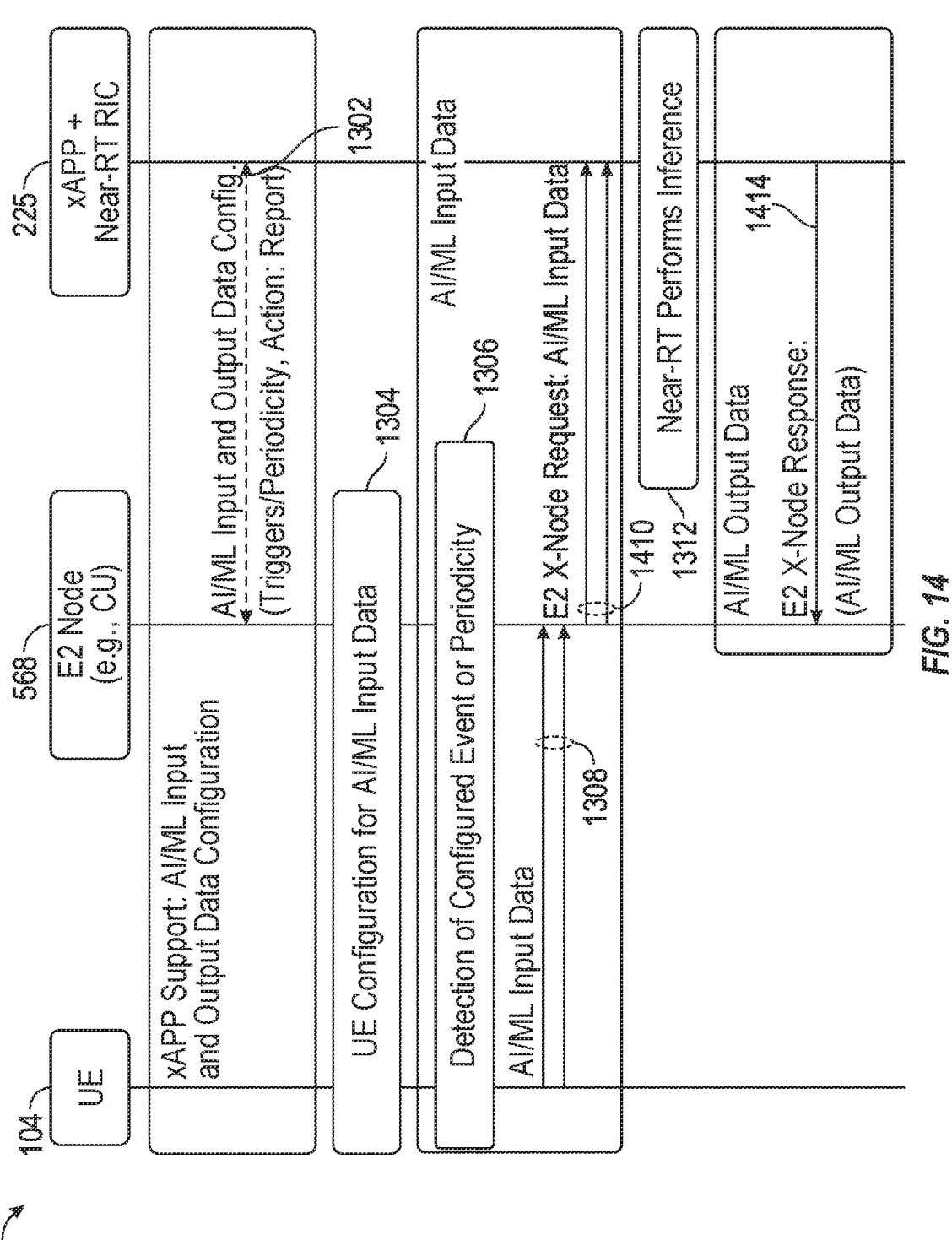
FIG. 14 illustrates an example process flow for providing AI/ML input data to a RAN controller and providing AI/ML output data to an E2 node via cross-node specific messaging.

FIG. 14 illustrates an example process flow 1400 for providing AI/ML input data to a RAN controller and providing AI/ML output data to an E2 node via cross-node specific messaging, which may enable an efficient exchange of AI/ML input/output data between the E2 node 568 and the Near-RT RIC 225. The cross-node specific messaging may be or include a class 1 message for carrying the AI/ML data input and output. When the cross-node specific message as a class 1 message is terminated at the Near-RT RIC, the Near-RT RIC sends an acknowledgment to the E2 node when the cross-node specific message is successfully received at the Near-RT RIC. The cross-node specific messaging may allow for the communication of the AI/ML data input and output to meet a particular latency specification associated with cross-node AI/ML session (e.g., a latency specification associated with the time elapsed from the UE sending input data to the E2 node receiving the output data and/or the time elapsed from the E2 node sending input data to the E2 node receiving the output data). The process flow 1400 may apply 1302-1308 and 1312 as described herein with respect to FIG. 13. A cross-node AI/ML session may be established between the UE 104 and the Near-RT RIC 225 as described herein with respect to FIG. 8A, FIG. 8B, FIG. 9, FIG. 10, and/or FIG. 11.

At 1410, the E2 node 568 sends, to the Near-RT RIC 225, AI/ML input data via a cross-node specific RIC request message, which may be separate or different from a RIC indication message, for example, as depicted in 1310 of FIG. 13. The AI/ML input data may include UE-specific information and/or RAN-specific information, for example, as described herein with respect to FIG. 13.

At 1414, the Near-RT RIC 225 sends, to the E2 node 568, AI/ML output data (e.g., decoded or decompressed CSF) via a cross-node specific RIC response message, which may be separate or different from a RIC control request message, for example, as depicted in 1314 of FIG. 13. The cross-node specific messaging described herein may indicate to the Near-RT RIC 225 to process the AI/ML input data and provide the AI/ML input data according to a particular latency specification and meet such a specification for an efficient cross-node AI/ML session. For example, the Near-RT RIC 225 may provide priority to the cross-node specific RIC request message in terms of processing and providing a response to the E2 node compared to a similar RIC indication message as described herein with respect to FIG. 13. Thus, the cross-node specific messaging may enable an efficient exchange of AI/ML input/output data between the E2 node 568 and the Near-RT RIC 225 that satisfies a latency specification associated with the cross-node AI/ML session. In some cases, the Near-RT RIC 225 may send an indication of the AI/ML output data.

Example Cross-Node AI/ML Session Monitoring and Lifecycle Management Operations

In certain aspects, the UE and/or E2 node may monitor any of various characteristics associated with the cross-node AI/ML session. In some cases, the UE and/or E2 node may send a monitoring report to the RIC (e.g., the Near-RT RIC) to evaluate the cross-node AI/ML performance and perform life cycle management functions in response to the monitoring report. In response to receiving the monitoring report, the RIC may perform certain lifecycle management functions, such as deactivating a function or model or switching to a different function or model used at the UE.

Figure 15:
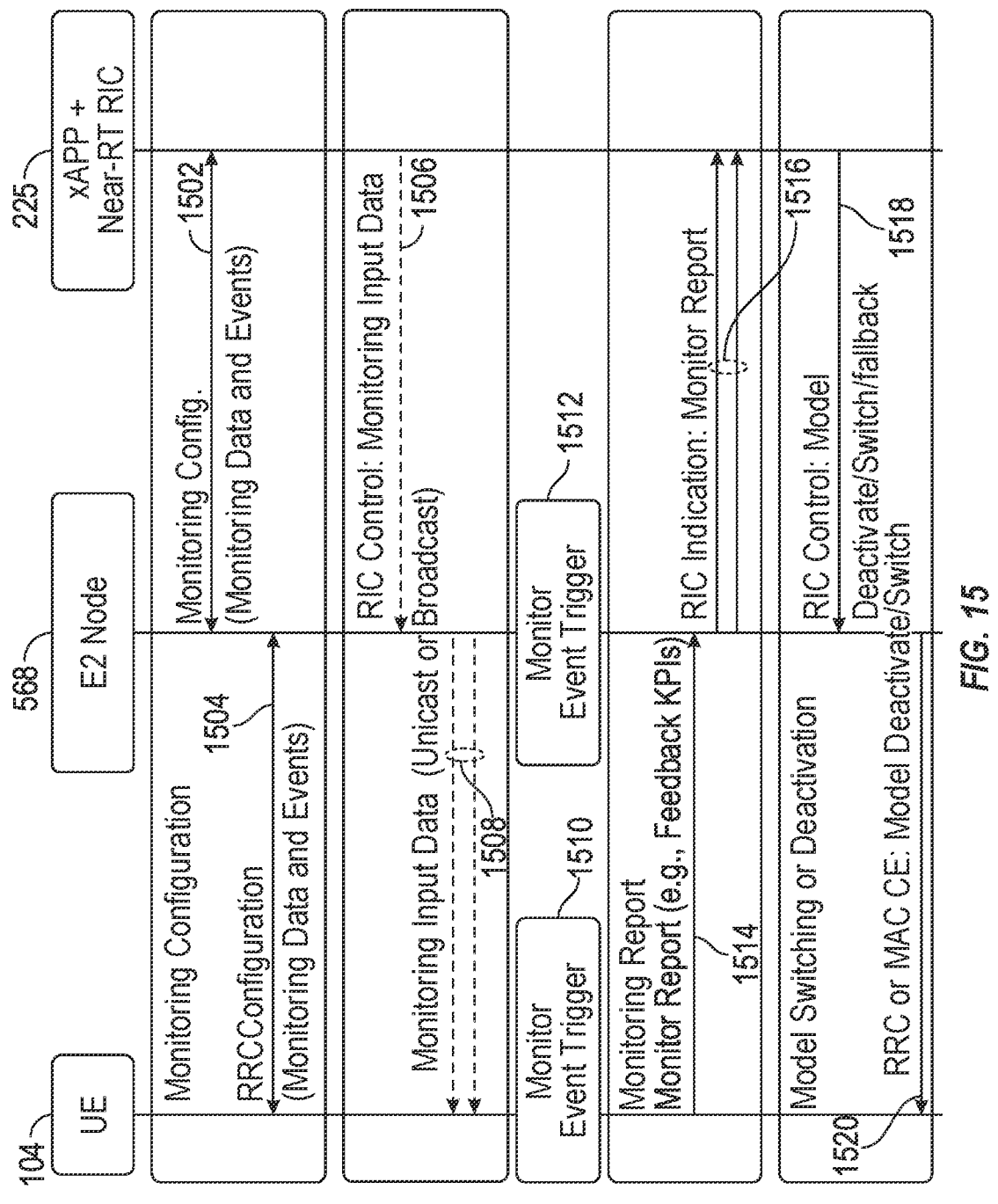
FIG. 15 illustrates an example process flow to configure a UE and/or an E2 node for AI/ML performance monitoring and to provide a monitoring report to a RAN controller.

FIG. 15 illustrates an example process flow 1500 to configure a UE and/or an E2 node for AI/ML performance monitoring and to provide a monitoring report to a RAN controller.

At 1502, the Near-RT RIC 225 sends, to the E2 node 568, a configuration associated with monitoring cross-node AI/ML session at the UE 104 and/or the E2 node 568. The configuration may indicate what information to report and/or when to report such information to the Near-RT RIC 225. For example, the configuration may indicate or include a reporting period associated with periodic reporting, a list of one or more KPIs to be monitored and/or reported, and/or one or more monitoring/reporting events that may trigger a report from the UE 104 and/or the E2 node 568. The monitoring events may include, for example, one or more thresholds for the KPIs, one or more UE specific environment change(s) (e.g., changes to a carrier, beam, frequency range, etc.), and/or a UE configuration change (e.g., changes to MCS, code rate, channel bandwidth, subcarrier spacing, etc.).

At 1504, the E2 node 568 configures the UE 104 with a monitoring configuration associated with the cross-node AI/ML session. As an example, the E2 node 568 may configure the UE 104 via RRC signaling, such as an RRC configuration message and/or an RRC reconfiguration message. The UE monitoring configuration may be based on and/or derived from the configuration obtained at 1502. In some cases, the E2 node 568 may determine the UE monitoring configuration independent of the Near-RT RIC 225. A cross-node AI/ML session may be established between the UE 104 and the Near-RT RIC 225 as described herein with respect to FIG. 8A, FIG. 8B, FIG. 9, FIG. 10, and/or FIG. 11.

Optionally, at 1506, the Near-RT RIC 225 may send, to the E2 node 568, monitoring input data, which may be addressed to the E2 node 568 and/or the UE 104. The monitoring input data may include RIC-based monitoring input data, such as AI/ML function or model performance characteristic. A function or model performance characteristic may include an inference latency and/or a function or model inference error with respect to one or more ground truths (e.g., a predicted channel characteristic with respect to a measured channel characteristic).

Optionally, at 1508, the E2 node 568 may send, to the UE 104, monitoring input data, which may include the RIC-based monitoring input data and/or E2 node-based monitoring input data. The E2 node-based monitoring input data may include a system performance indicator, such as load, capacity, latency, reliability, etc.

At 1510, the UE 104 monitors the cross-node AI/ML performance, for example, based on internal monitoring data (e.g., throughput, reliability, beam failures, etc. observed at the UE 104) and/or the external monitoring input data from the E2 node 568 and/or the Near-RT RIC 225. The UE 104 may monitor the cross-node AI/ML performance based on the monitoring configuration obtained at 1504.

At 1512, the E2 node 568 monitors the cross-node AI/ML performance, for example, based on internal monitoring input data (e.g., throughput, reliability, beam failures, etc. observed at the E2 node 568) and/or the external monitoring input data from the Near-RT RIC 225.

At 1514, the UE 104 sends, to the E2 node 568, a monitoring report periodically and/or in response to detecting one or more reporting events (e.g., an inference error being greater than or equal to a threshold). For example, the UE 104 may detect a reporting event at 1510 while monitoring the performance of the cross-node AI/ML session, and in response to detecting the reporting event, the UE 104 may send the monitoring report to the E2 node 568. In certain aspects, the monitoring report may indicate or include one or more feedback KPIs as described herein with respect to FIG. 12.

At 1516, the E2 node 568 sends, to the Near-RT RIC 225, a monitoring report (i) periodically, (ii) in response to receiving the UE-based monitoring report at 1514, and/or (iii) in response to detecting one or more reporting events (e.g., a throughput or reliability being less than or equal to a threshold). The E2 node 568 may send the monitoring report via a RIC indication message. For example, the E2 node 568 may detect a reporting event at 1512 while monitoring the performance of the cross-node AI/ML session, and in response to detecting the reporting event, the E2 node 568 may send the monitoring report to the Near-RT RIC 225. In certain aspects, the monitoring report may indicate or include the UE-based monitoring report received at 1514 and/or monitoring information observed at the E2 node, such as RAN-level KPIs.

At 1518, the Near-RT RIC 225 sends, to the E2 node 568, control signaling associated with the cross-node AI/ML session in response to the monitoring report received at 1516. The Near-RT RIC 225 may determine to perform a lifecycle management task based on the monitoring report. For example, the Near-RT RIC 225 may obtain one or more ground truths, in the monitoring report, associated with the joint inference used for cross-node AI/ML session. The Near-RT RIC 225 may detect an inference error that exceeds an expected performance for the joint inference based on the ground truth(s), and in response to the detected inference error, the Near-RT RIC 225 may determine to deactivate the functions or models being used at the UE 104 and/or switch to a different function or model at the UE 104. The Near-RT RIC 225 may send the control signaling via a RIC control message (e.g., a RIC control request). The control signaling may indicate or include a command to deactivate one or more AI/ML functions or models being used at the UE 104 and/or switch (or fallback) to one or more AI/ML functions or models at the UE 104, for example.

At 1520, the E2 node 568 sends, to the UE 104, an indication to deactivate a particular function or model or switch to a different function or model, for example, via control signaling. The control signaling may include RRC signaling, MAC signaling, downlink control information, and/or system information.

In certain aspects, the E2 node may monitor the performance of the cross-node AI/ML session. In response to a monitoring trigger event (e.g., performance indicator(s) not satisfying a performance specification or threshold), the E2 node may reconfigure the UE for cross-node AI/ML session (e.g., deactivating a function or model or switching to a different a function or model).

Figure 16:
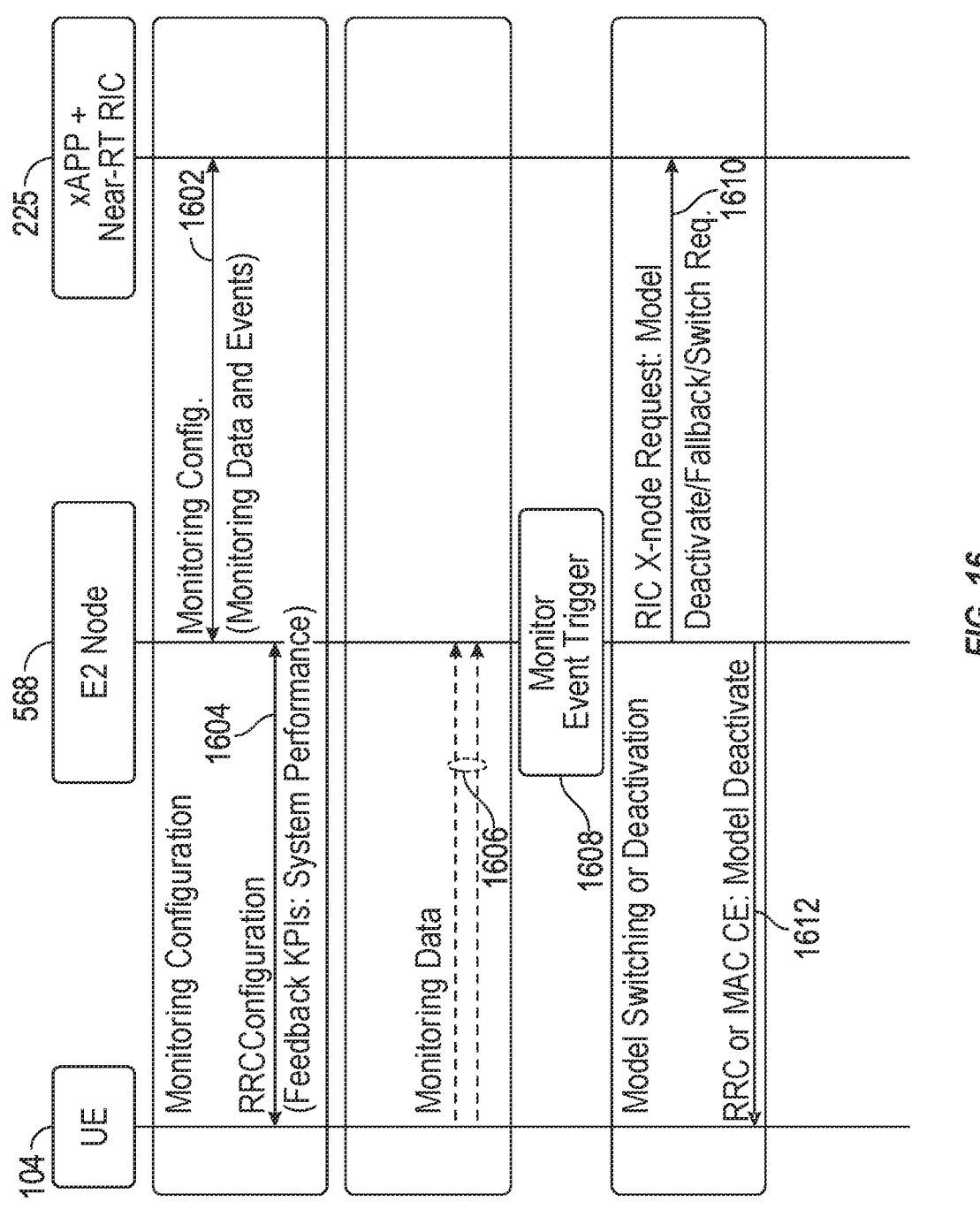
FIG. 16 illustrates an example process flow for certain signaling that facilitate monitoring and/or performing life cycle management tasks at an E2 node.

FIG. 16 illustrates an example process flow 1600 for certain signaling that facilitate monitoring and/or performing life cycle management tasks at an E2 node. In certain aspects, the process flow 1600 may apply certain aspects associated with 1502 and/or 1504, which may correspond to 1602 and 1604, respectively, as described herein with respect to FIG. 15.

At 1602, the Near-RT RIC 225 sends, to the E2 node 568, a configuration associated with reporting at the UE 104 and/or monitoring the cross-node AI/ML session at the E2 node 568. The configuration may indicate what information to report and/or when to report such information to the E2 node 568. For example, the configuration may indicate or include a reporting period, a list of one or more KPIs to be monitored and/or reported, and/or one or more monitoring/reporting events that may trigger a report from the UE 104. The monitoring events may include, for example, one or more thresholds for the KPIs, one or more UE specific environment change(s) (e.g., changes to a carrier, beam, frequency range, etc.), and/or a UE configuration change (e.g., changes to MCS, code rate, channel bandwidth, subcarrier spacing, etc.).

At 1604, the E2 node 568 configures the UE 104 with a reporting configuration associated with the cross-node AI/ML session. As an example, the E2 node 568 may configure the UE 104 via RRC signaling, such as an RRC configuration message and/or an RRC reconfiguration message. The reporting configuration may be based on and/or derived from the configuration obtained at 1602. In some cases, the E2 node 568 may determine the UE reporting configuration independent of the Near-RT RIC 225. A cross-node AI/ML session may be established between the UE 104 and the Near-RT RIC 225 as described herein with respect to FIG. 8A, FIG. 8B, FIG. 9, FIG. 10, and/or FIG. 11.

Optionally, at 1606, the UE 104 may send, to the E2 node 568, monitoring data associated with the cross-node AI/ML session periodically and/or in response to detecting a reporting event.

At 1608, the E2 node 568 monitors the cross-node AI/ML performance, for example, based on internal monitoring input data (e.g., throughput, reliability, beam failures, etc. observed at the E2 node 568) and/or the external monitoring input data from the UE 104. As an example, the E2 node 568 may evaluate the RAN performance and determine whether to perform a lifecycle management task in response to the RAN performance.

At 1610, the E2 node 568 sends, to the Near-RT RIC 225, an indication of the UE function or model being deactivated or switched. In some cases, the E2 node 568 may request the Near-RT RIC 225 to deactivate the UE function or model or switch to a different UE function or model (e.g., fallback to a particular UE function or model). The E2 node 568 may send the indication via a RIC cross-node request, such as a RIC control message.

At 1612, the E2 node 568 sends, to the UE 104, an indication to deactivate a particular function or model or switch to a different function or model, for example, via control signaling. The control signaling may include RRC signaling, MAC signaling, downlink control information, and/or system information.

For certain aspects, the RAN controller (e.g., a Near-RT RIC) may monitor the performance of the cross-node AI/ML session. In response to a monitoring trigger event (e.g., performance indicator(s) not satisfying a performance specification or threshold), the RIC may reconfigure the UE for the cross-node AI/ML session.

Figure 17:
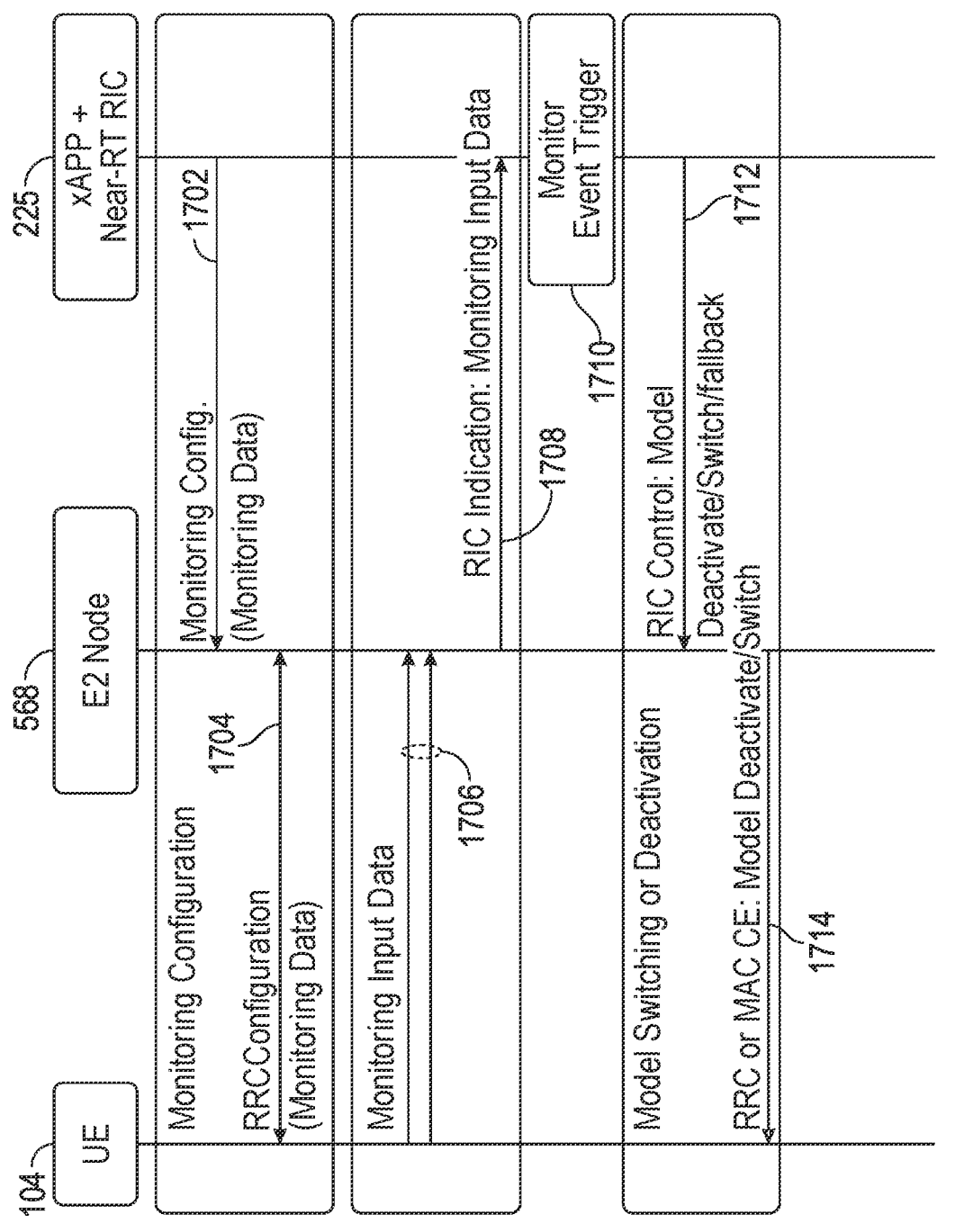
FIG. 17 illustrates an example process flow for certain signaling that facilitate monitoring and performing life cycle management tasks at a RAN controller.

FIG. 17 illustrates an example process flow 1700 for certain signaling that facilitate monitoring and performing life cycle management tasks at a RAN controller.

At 1702, the Near-RT RIC 225 sends, to the E2 node 568, a configuration associated with reporting at the UE 104 and/or the E2 node 568. The configuration may indicate what information to report and/or when to report such information to the Near-RT RIC 225. For example, the configuration may indicate or include a reporting period associated with periodic reporting, a list of one or more KPIs to be reported, a list of one or more ground truths associated with the joint inference to be reported, and/or monitoring/reporting events that trigger reporting data to the Near-RT RIC 225. The ground truths may include, for example, measured channel characteristics to evaluate the accuracy of predicted or inferred channel characteristics generated from a joint inference associated with the cross-node AI/ML session.

At 1704, the E2 node 568 configures the UE 104 with a monitoring/reporting configuration associated with the cross-node AI/ML session. As an example, the E2 node 568 may configure the UE 104 via RRC signaling, such as an RRC configuration message and/or an RRC reconfiguration message. The UE configuration may be based on and/or derived from the configuration obtained at 1702. In some cases, the E2 node 568 may determine the UE configuration independent of the Near-RT RIC 225. A cross-node AI/ML session may be established between the UE 104 and the Near-RT RIC 225 as described herein with respect to FIG. 8A, FIG. 8B, FIG. 9, FIG. 10, and/or FIG. 11.

At 1706, the UE 104 sends, to the E2 node 568, monitoring input data associated with the cross-node AI/ML session periodically and/or in response to detecting a reporting event.

At 1708, the E2 node 568 sends, to the Near-RT RIC 225, monitoring input data (i) periodically, (ii) in response to receiving the UE-based monitoring input data at 1706, and/or (iii) in response to detecting one or more reporting events (e.g., a throughput or reliability being less than or equal to a threshold). The E2 node 568 may send the monitoring input data via a RIC indication message. In certain aspects, the monitoring input data may indicate or include the UE-based monitoring input data received at 1706 and/or monitoring information observed at the E2 node, such as RAN-level information.

At 1710, the Near-RT RIC 225 monitors the cross-node AI/ML performance, for example, based on internal monitoring input data and/or the external monitoring input data (e.g., UE-based monitoring input data and/or E2 node-based monitoring input data). The internal monitoring input data may include, for example, inference performance indicator(s), such as an inference threshold compared to a ground truth, inference latency, etc. As an example, the Near-RT RIC 225 may evaluate the inference performance and determine whether to perform a lifecycle management task in response to the inference performance. The Near-RT RIC 225 may compare the inference output (e.g., inferred or predicted CSF) to certain ground truths (e.g., measured or calculated CSF from the UE 104 and/or E2 node 568), and the Near-RT RIC 225 may determine to perform a lifecycle management task in response to the inference performance not satisfying a performance specification or metric (e.g., the difference between an inference output and the ground truth may exceed a threshold). In some cases, the Near-RT RIC 225 may evaluate other performance indicators (e.g., system performance and/or UE performance) in addition to or instead of the inference performance. The other performance indicators may be obtained or determined from the external monitoring input data.

At 1712, the Near-RT RIC 225 sends, to the E2 node 568, control signaling associated with the cross-node AI/ML session in response to detecting a trigger for the control signaling. The Near-RT RIC 225 may determine to perform a lifecycle management task based on the monitoring input data obtained from the E2 node 568 and/or the monitoring input data observed at the Near-RT RIC 225. For example, the Near-RT RIC 225 may obtain one or more ground truths in the monitoring input data, associated with the joint inference used for cross-node AI/ML session. The Near-RT RIC 225 may detect an inference error that exceeds an expected performance for the joint inference based on the ground truth(s), and in response to the detected inference error, the Near-RT RIC 225 may determine to deactivate the functions or models being used at the UE 104 and/or switch to a different function or model at the UE 104. The Near-RT RIC 225 may send the control signaling via a RIC control message (e.g., a RIC control request). The control signaling may indicate or include a command to deactivate one or more AI/ML functions or models being used at the UE 104 and/or switch (or fallback) to one or more AI/ML functions or models at the UE 104, for example.

At 1714, the E2 node 568 sends, to the UE 104, an indication to deactivate a particular function or model, or switch to a different function or model, for example, via control signaling in response to the RIC control message received at 1712. The control signaling may include RRC signaling, MAC signaling, downlink control information, and/or system information.

While the examples depicted in FIGS. 5A-17 are described herein with respect to a Near-RT RIC communicating with an E2 node to facilitate understanding of certain aspects associated with a cross-node AI/ML session, aspects of the present disclosure may be applied to any other RAN controller (e.g., RIC) in addition to or instead of the Near-RT RIC (e.g., operating control loops in the order of 10 ms-1s), such as a Non-RT RIC (e.g., operating control loops greater than 1 s) or any future RAN controller including an RT RIC (e.g., operating control loops below 10 ms). In certain aspects, the Non-RT RIC, Near-RT RIC, and the RT RIC may represent different tiers of computational capabilities associated with the respective RIC relative to another type of RIC. For example, the Non-RT RIC may be capable of performing certain control loops within a first time window (e.g., greater than 1 s); the Near-RT RIC may be capable of performing certain control loops within a second time window (e.g., in the order of 10 ms-1s) shorter than the first time window; and the RT RIC may be capable performing certain control loops within a third time window (e.g., below 10 ms) shorter than the second time window. Such different tiers of computational capabilities may allow various functionalities (e.g., scheduling, beam management, radio link management, AI/ML processing, CSF processing, transmit power controls, energy conservation, load balancing, etc.) associated a cloud-based RAN to be distributed or assigned to the respective RAN controller based on a performance specification (e.g., latency, throughput, reliability, etc.) associated with the functionality. In some aspects, a cloud-based RAN may use any number of tiers associated with computational or processing resources, networking resources, and/or memory or storage resources for servicing one or more cross-node AI/ML sessions.

With respect to an E2 node, aspects of the present disclosure may be applied to any of the disaggregated network entities, including one or more CUs, one or more DUs, and/or one or more RUs, for example, as described herein with respect to FIG. 2. The communications between any of the RICs and an E2 node may be sent or obtained via an E2 interface and/or an O1 interface as described herein with respect to FIG. 2. Certain operations associated with a cross-node AI/ML session described herein with respect to a Near-RT RIC may be performed via an xApp associated with servicing and/or configuring a cross-node AI/ML session.

Example Operations of an RAN Controller

FIG. 18 shows a method 1800 for wireless communication by a first network entity, such as a Near-RT RIC of FIGS. 2, 5A, and 5B, or any other suitable RAN controller in a cloud-based RAN, such as a V-RAN or O-RAN.

Method 1800 begins at block 1805 with obtaining machine learning input data (e.g., encoded CSF) associated with a UE, for example, as described herein with respect to FIG. 13 and/or FIG. 14. In certain aspects, the UE may send the machine learning input data to the first network entity, for example, via a communication link with the first network entity, as described herein with respect to FIG. 9. The machine learning input data may be or include data used to predict, infer, encode, and/or decode information using a machine learning mode. In some cases, the machine learning input data may be or include training data used to train a machine learning model.

Method 1800 then proceeds to block 1810 with providing, to a second network entity (e.g., the E2 node 568), an indication of machine learning output data (e.g., decoded CSF) generated using the machine learning input data, for example, as described herein with respect to FIG. 13 and/or FIG. 14.

Method 1800 then proceeds to block 1815 with providing, to the second network entity, control signaling for a cross-node machine learning session between the UE and the first network entity (for example, as described herein with respect to FIGS. 5A and 5B) based at least in part on one or more performance indicators associated with the cross-node machine learning session, for example, as described herein with respect to FIG. 17. As an example, the control signaling may indicate to deactivate, update, or reconfigure the cross-node AI/ML session if the performance indicator(s) are not satisfying certain performance threshold(s). The one or more performance indicators may include any of the performance indicators described herein with respect to FIG. 12.

In certain aspects, block 1805 includes obtaining the machine learning input data via a RIC indication message; and providing the machine learning output data comprises providing, to the second network entity, the machine learning output data via a RIC control request, for example, as described herein with respect to FIG. 13.

In certain aspects, block 1805 includes obtaining the machine learning input data via a cross-node specific request message; and providing the machine learning output data comprises providing, to the second network entity, the machine learning output data via a cross-node specific response message, for example, as described herein with respect to FIG. 14.

In certain aspects, method 1800 further includes monitoring the one or more performance indicators associated with the cross-node machine learning session, wherein block 1815 includes providing the control signaling in response to the monitoring of the one or more performance indicators, for example, as described herein with respect to FIG. 17. In certain aspects, method 1800 further includes obtaining a RIC indication message comprising an indication of monitoring information used for the monitoring, wherein monitoring the one or more performance indicators comprises monitoring the one or more performance indicators based at least in part on the monitoring information. As an example, the monitoring information may include ground truths associated with cross-node AI/ML session, characteristics associated with the communication link between the UE and the second network entity (such as throughput, latency, reliability, beam failures, radio link failures, etc.), and/or RAN system characteristics (e.g., network loading, uplink and/or downlink throughput, round-trip time delay, packet loss, radio link failure rates, etc.); and the performance indictor(s) may correspond to or be derived from the monitoring information.

In certain aspects, method 1800 further includes providing an indication of a configuration associated with monitoring the cross-node machine learning session at the UE, for example, as described herein with respect to FIG. 15. In certain aspects, the configuration indicates one or more events that trigger reporting of monitoring information and indicates information to report from the UE as the monitoring information.

In certain aspects, method 1800 further includes providing an indication of a configuration associated with monitoring the cross-node machine learning session at the second network entity, for example, as described herein with respect to FIG. 15.

In certain aspects, the control signaling comprises a RIC control message indicating to deactivate a machine learning function or model (or switch to a different machine learning function or model) used at the UE, for example, as described herein with respect to FIGS. 15-17.

In certain aspects, method 1800 further includes obtaining, from the second network entity, a RIC indication message requesting the first network entity to deactivate the cross-node machine learning session between the UE and the first network entity, wherein block 1815 includes providing, to the second network entity, the control signaling in response to obtaining the RIC indication message, for example, as described herein with respect to FIG. 16.

In certain aspects, the first network entity comprises a RIC, such as a Near-RT RIC, a Non-RT RIC, and/or a RT RIC in a cloud-based RAN; and the second network entity comprises a CU, a DU, and/or an RU in communication with the first network entity via an E2 interface and/or an O1 interface.

Figure 21:
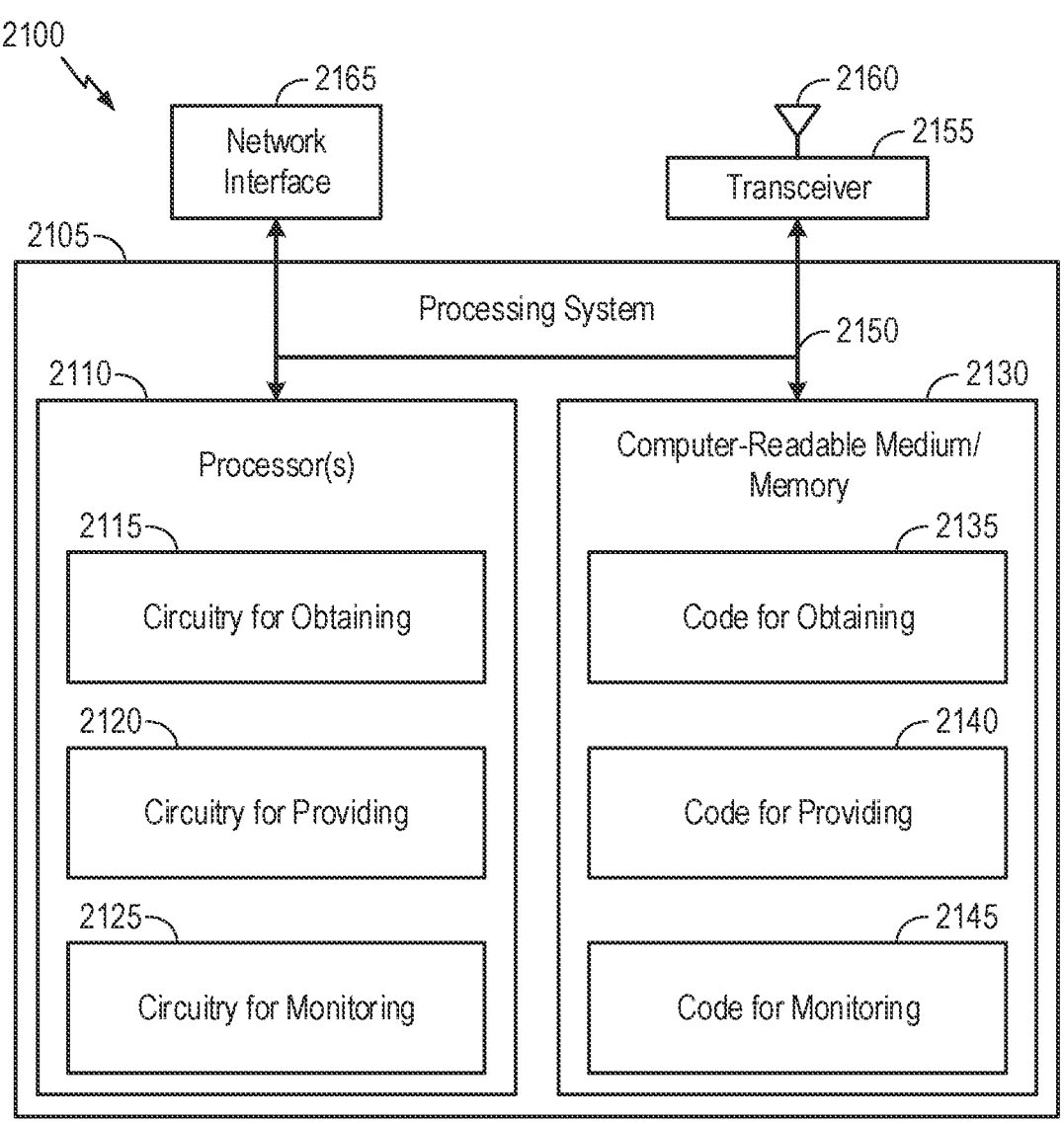
FIG. 21 depicts aspects of an example communications device.

In certain aspects, method 1800, or any aspect related to it, may be performed by an apparatus, such as communications device 2100 of FIG. 21, which includes various components operable, configured, or adapted to perform the method 1800. Communications device 2100 is described below in further detail.

Note that FIG. 18 is just one example of a method, and other methods including fewer, additional, or alternative operations are possible consistent with this disclosure.

Example Operations of an E2 Node

FIG. 19 shows a method 1900 for wireless communication by a first network entity, such as an E2 node of FIGS. 2, 5A, and 5B, or any other suitable disaggregated network entity, such as one or more CUs, one or more DUs, and/or one or more RUs.

Method 1900 begins at block 1905 with providing, to a second network entity (e.g., the Near-RT RIC 225), machine learning input data (e.g., encoded CSF) associated with a cross-node machine learning session between a UE and the second network entity, for example, as described herein with respect to FIG. 13 and/or FIG. 14.

Method 1900 then proceeds to block 1910 with obtaining, from the second network entity, an indication of machine learning output data (e.g., decoded CSF) based at least in part on the machine learning input data, for example, as described herein with respect to FIG. 13 and/or FIG. 14.

Method 1900 then proceeds to block 1915 with communicating with the UE based at least in part on the machine learning output data. The first network entity may adapt a configuration for a communication link between the UE and the first network entity based on the machine learning output data. For example, in response to changing channel conditions indicated by the machine learning output data, the first network may reconfigure the communication link configuration, such as a MCS, code rate, channel bandwidth, subcarrier spacing, etc.

In certain aspects, block 1905 includes providing the machine learning input data via a RIC indication message; and obtaining the machine learning output data comprises obtaining, from the second network entity, the machine learning output data via a RIC control request, for example, as described herein with respect to FIG. 13.

In certain aspects, block 1905 includes providing the machine learning input data via a cross-node specific request message; and obtaining the machine learning output data comprises obtaining, from the second network entity, the machine learning output data via a cross-node specific response message, for example, as described herein with respect to FIG. 14.

In certain aspects, method 1900 further includes monitoring one or more performance indicators associated with the cross-node machine learning session, for example, as described herein with respect to FIG. 15 and/or FIG. 16. In certain aspects, in response to monitoring, method 1900 further includes providing, to the second network entity, a RIC indication message comprising an indication of monitoring information used for monitoring performance of the cross-node machine learning session at the second network entity. In certain aspects, in response to providing the RIC indication message, method 1900 further includes obtaining, from the second network entity, first control signaling (e.g., a lifecycle management command) for the cross-node machine learning session. In certain aspects, method 1900 further includes providing, to the UE, second control signaling (e.g., a lifecycle management command) for the cross-node machine learning session. In certain aspects, the first control signaling comprises a RIC control message indicating to deactivate a machine learning function or model used at the UE for the cross-node machine learning session; and the second control signaling comprises a radio resource control message indicating to deactivate the machine learning function or model.

In certain aspects, method 1900 further includes providing, to the second network entity, a RIC message requesting the second network entity to deactivate the cross-node machine learning session between the UE and the second network entity in response to the monitoring, for example, as described herein with respect to FIG. 16. In certain aspects, method 1900 further includes providing, to the UE, an indication to deactivate the cross-node machine learning session in response to the monitoring.

In certain aspects, method 1900 further includes obtaining an indication of a configuration associated with monitoring the cross-node machine learning session at the first network entity, wherein monitoring comprises monitoring the one or more performance indicators associated with the cross-node machine learning session based at least in part on the configuration, for example, as described herein with respect to FIG. 15 and/or FIG. 16. As an example, the configuration may indicate what information to report to the RAN controller and/or when to report the information to the RAN controller.

In certain aspects, method 1900 further includes providing, to the second network entity, a RIC indication message comprising an indication of monitoring information used for monitoring performance of the cross-node machine learning session at the second network entity, for example, as described herein with respect to FIG. 17.

In certain aspects, method 1900 further includes obtaining an indication of a configuration associated with monitoring the cross-node machine learning session at the UE. In certain aspects, method 1900 further includes providing the configuration to the UE. In certain aspects, method 1900 further includes obtaining, from the UE, monitoring information based on the configuration. In certain aspects, method 1900 further includes providing, to the second network entity, a RIC indication message comprising an indication of the monitoring information used for monitoring performance of the cross-node machine learning session at the second network entity, for example, as described herein with respect to FIG. 15. In certain aspects, the configuration indicates one or more events that trigger reporting of the monitoring information and indicates information to report from the UE as the monitoring information.

In certain aspects, the first network entity comprises a CU, a DU, and/or an RU in communication with the second network entity via an E2 interface and/or an O1 interface; and the second network entity comprises a RIC, such as a Near-RT RIC, a Non-RT RIC, and/or a RT RIC in a cloud-based RAN.

Figure 22:
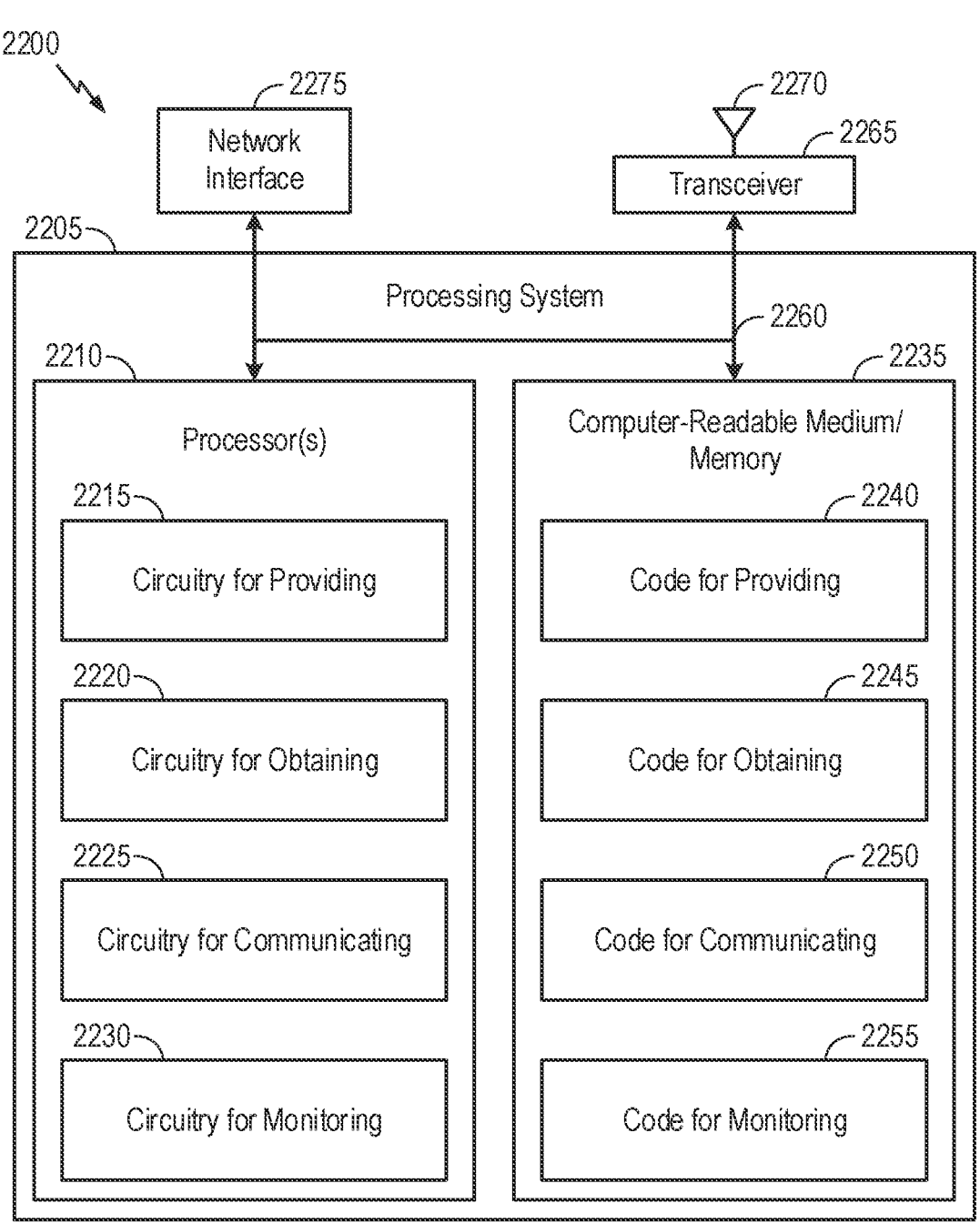
FIG. 22 depicts aspects of an example communications device.

In certain aspects, method 1900, or any aspect related to it, may be performed by an apparatus, such as communications device 2200 of FIG. 22, which includes various components operable, configured, or adapted to perform the method 1900. Communications device 2200 is described below in further detail.

Note that FIG. 19 is just one example of a method, and other methods including fewer, additional, or alternative operations are possible consistent with this disclosure.

Example Operations of a User Equipment

FIG. 20 shows a method 2000 for wireless communications by an apparatus, such as UE 104 of FIGS. 1 and 3.

Method 2000 begins at block 2005 with obtaining, from a first network entity, (e.g., the E2 node 568) an indication to report machine learning input data associated with a cross-node machine learning session between the apparatus and a second network entity, for example, as described herein with respect to FIG. 13 and/or FIG. 14. In certain aspects, obtaining the indication to the report machine learning input data comprises obtaining the indication to the report machine learning input data via one or more of: RRC signaling, MAC signaling, DCI, or system information.

Method 2000 then proceeds to block 2010 with providing, to the first network entity, the machine learning input data, for example, as described herein with respect to FIG. 13 and/or FIG. 14.

Method 2000 then proceeds to block 2015 with communicating with the second network entity in accordance with the cross-node machine learning session. For example, a UE may communicate with the second network entity via a user-plane communication link, for example, as described herein with respect to FIG. 9.

In certain aspects, method 2000 further includes monitoring one or more performance indicators associated with the cross-node machine learning session, for example, as described herein with respect to FIG. 15. In certain aspects, method 2000 further includes, in response to the monitoring, providing, to the first network entity, an indication of monitoring information used for monitoring performance of the cross-node machine learning session, for example, as described herein with respect to FIG. 15.

In certain aspects, method 2000 further includes obtaining, from the first network entity, control signaling for the cross-node machine learning session in response to providing the indication of the monitoring information. In certain aspects, the control signaling indicates to deactivate a machine learning model used at the apparatus for the cross-node machine learning session. In certain aspects, the control signaling indicates to switch from a first machine learning model to a second machine learning model for the cross-node machine learning session.

In certain aspects, method 2000 further includes providing, to the first network entity, an indication of monitoring information used for monitoring performance of the cross-node machine learning session, for example, as described herein with respect to FIG. 16 and/or FIG. 17.

In certain aspects, method 2000 further includes obtaining, from the first network entity, control signaling for the cross-node machine learning session the cross-node machine learning session in response to providing the indication of the monitoring information.

In certain aspects, method 2000 further includes providing, to the second network entity, an indication of monitoring information used for monitoring performance of the cross-node machine learning session, for example, as described herein with respect to FIG. 17. In certain aspects, method 2000 further includes obtaining, from the second network entity, control signaling for the cross-node machine learning session in response to providing the indication of the monitoring information, for example, as described herein with respect to FIG. 17.

In certain aspects, method 2000 further includes obtaining a configuration associated with monitoring the cross-node machine learning session, for example, as described herein with respect to FIG. 15. In certain aspects, method 2000 further includes monitoring one or more performance indicators associated with the cross-node machine learning session based at least in part on the configuration. In certain aspects, obtaining the configuration comprises obtaining the configuration via one or more of: RRC signaling, MAC signaling, DCI, or system information. In certain aspects, the configuration indicates one or more events that trigger reporting of the monitoring information and indicates information to report from the apparatus as the monitoring information.

In certain aspects, method 2000 further includes providing, to the first network entity, an indication of monitoring information used for monitoring performance of the cross-node machine learning session, for example, as described herein with respect to FIG. 16 and/or FIG. 17.

In certain aspects, method 2000 further includes obtaining, from the first network entity, a configuration for a communication link between the apparatus and the first network entity in response to providing the machine learning input data, wherein communicating with the second network entity comprises communicating with the first network entity via the communication link in accordance with the configuration.

In certain aspects, the first network entity comprises a CU, a DU, and/or an RU in communication with the second network entity via an E2 interface and/or an O1 interface; and the second network entity comprises a RIC, such as a Near-RT RIC, a Non-RT RIC, and/or a RT RIC in a cloud-based RAN.

Figure 23:
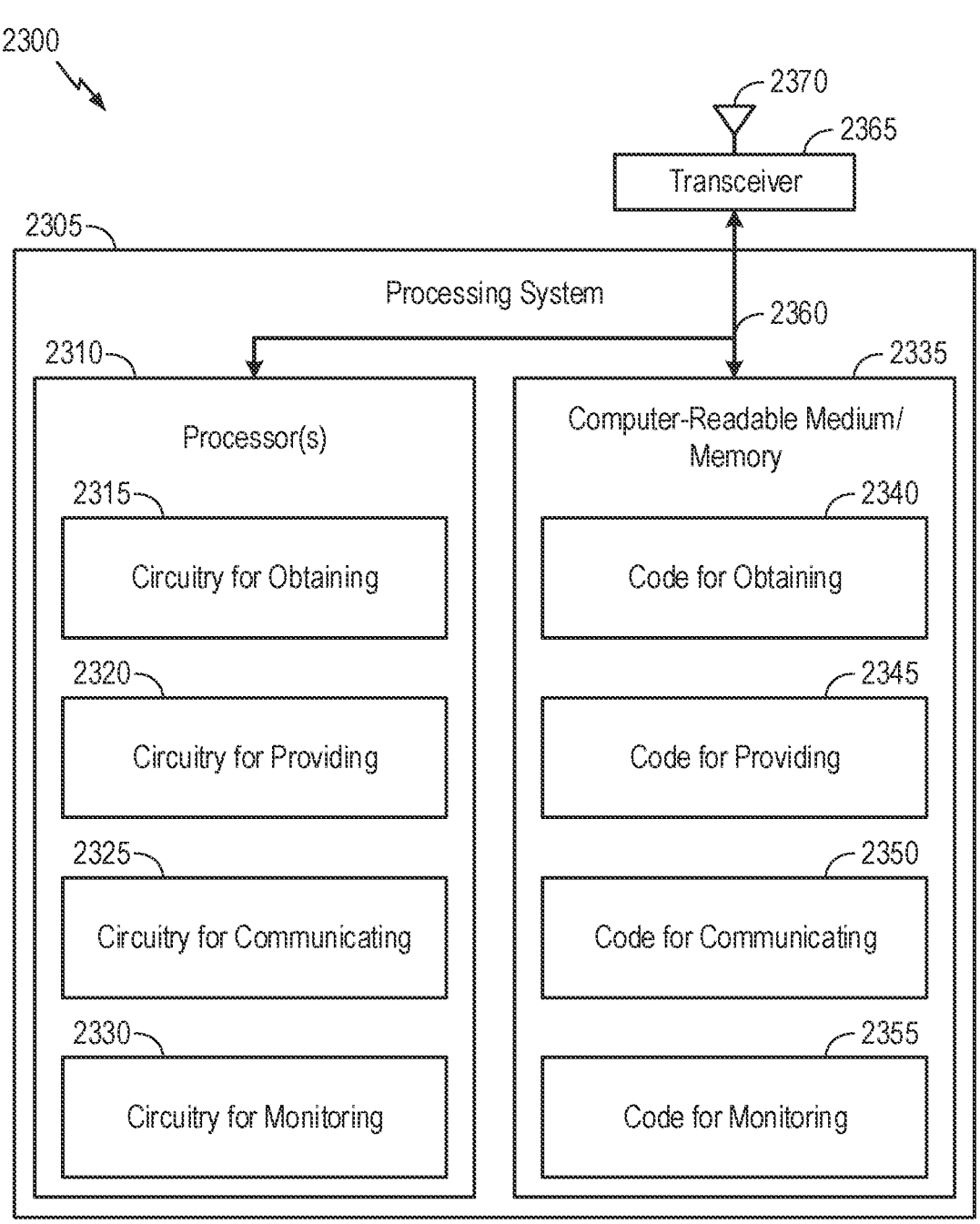
FIG. 23 depicts aspects of an example communications device.

In certain aspects, method 2000, or any aspect related to it, may be performed by an apparatus, such as communications device 2300 of FIG. 23, which includes various components operable, configured, or adapted to perform the method 2000. Communications device 2300 is described below in further detail.

Note that FIG. 20 is just one example of a method, and other methods including fewer, additional, or alternative operations are possible consistent with this disclosure.

Example Communications Devices

FIG. 21 depicts aspects of an example communications device 2100. In some aspects, communications device 2100 is a network entity, such as a Near-RT RIC of FIGS. 2, 5A, and 5B, or any other suitable RAN controller in a cloud-based RAN, such as a V-RAN or O-RAN.

The communications device 2100 includes a processing system 2105 coupled to a transceiver 2155 (e.g., a transmitter and/or a receiver) and/or a network interface 2165. The transceiver 2155 is configured to transmit and receive signals for the communications device 2100 via an antenna 2160, such as the various signals as described herein. The network interface 2165 is configured to obtain and send signals for the communications device 2100 via communications link(s), such as a backhaul link, midhaul link, and/or fronthaul link as described herein, such as with respect to FIG. 2. The processing system 2105 may be configured to perform processing functions for the communications device 2100, including processing signals received and/or to be transmitted by the communications device 2100.

The processing system 2105 includes one or more processors 2110. In various aspects, one or more processors 2110 may be representative of one or more of receive processor 338, transmit processor 320, TX MIMO processor 330, and/or controller/processor 340, as described with respect to FIG. 3. The one or more processors 2110 are coupled to a computer-readable medium/memory 2130 via a bus 2150. In certain aspects, the computer-readable medium/memory 2130 is configured to store instructions (e.g., computer-executable code) that when executed by the one or more processors 2110, enable and cause the one or more processors 2110 to perform the method 1800 described with respect to FIG. 18, or any aspect related to it, including any additional operations described in relation to FIG. 18. Note that reference to a processor of communications device 2100 performing a function may include one or more processors of communications device 2100 performing that function, such as in a distributed fashion.

In the depicted example, the computer-readable medium/memory 2130 stores code for obtaining 2135, code for providing 2140, and code for monitoring 2145. Processing of the code 2135-2145 may enable and cause the communications device 2100 to perform the method 1800 described with respect to FIG. 18, or any aspect related to it.

The one or more processors 2110 include circuitry configured to implement (e.g., execute) the code stored in the computer-readable medium/memory 2130, including circuitry for obtaining 2115, circuitry for providing 2120, and circuitry for monitoring 2125. Processing with circuitry 2115-2125 may enable and cause the communications device 2100 to perform the method 1800 described with respect to FIG. 18, or any aspect related to it.

More generally, means for communicating, transmitting, sending or outputting for transmission may include the transceivers 332, antenna(s) 334, transmit processor 320, TX MIMO processor 330, and/or controller/processor 340 of the BS 102 illustrated in FIG. 3, transceiver 2155 and/or antenna 2160 of the communications device 2100 in FIG. 21, and/or one or more processors 2110 of the communications device 2100 in FIG. 21. Means for communicating, receiving or obtaining may include the transceivers 332, antenna(s) 334, receive processor 338, and/or controller/processor 340 of the BS 102 illustrated in FIG. 3, transceiver 2155 and/or antenna 2160 of the communications device 2100 in FIG. 21, and/or one or more processors 2110 of the communications device 2100 in FIG. 21.

FIG. 22 depicts aspects of an example communications device 2200. In some aspects, communications device 2200 is a network entity, such as an E2 node of FIGS. 2, 5A, and 5B, or any other suitable disaggregated network entity, such as one or more CUs, one or more DUs, and/or one or more RUs.

The communications device 2200 includes a processing system 2205 coupled to a transceiver 2265 (e.g., a transmitter and/or a receiver) and/or a network interface 2275. The transceiver 2265 is configured to transmit and receive signals for the communications device 2200 via an antenna 2270, such as the various signals as described herein. The network interface 2275 is configured to obtain and send signals for the communications device 2200 via communications link(s), such as a backhaul link, midhaul link, and/or fronthaul link as described herein, such as with respect to FIG. 2. The processing system 2205 may be configured to perform processing functions for the communications device 2200, including processing signals received and/or to be transmitted by the communications device 2200.

The processing system 2205 includes one or more processors 2210. In various aspects, one or more processors 2210 may be representative of one or more of receive processor 338, transmit processor 320, TX MIMO processor 330, and/or controller/processor 340, as described with respect to FIG. 3. The one or more processors 2210 are coupled to a computer-readable medium/memory 2235 via a bus 2260. In certain aspects, the computer-readable medium/memory 2235 is configured to store instructions (e.g., computer-executable code) that when executed by the one or more processors 2210, enable and cause the one or more processors 2210 to perform the method 1900 described with respect to FIG. 19, or any aspect related to it, including any additional operations described in relation to FIG. 19. Note that reference to a processor of communications device 2200 performing a function may include one or more processors of communications device 2200 performing that function, such as in a distributed fashion.

In the depicted example, the computer-readable medium/ memory 2235 stores code for providing 2240, code for obtaining 2245, code for communicating 2250, and code for monitoring 2255. Processing of the code 2240-2255 may enable and cause the communications device 2200 to perform the method 1900 described with respect to FIG. 19, or any aspect related to it.

The one or more processors 2210 include circuitry configured to implement (e.g., execute) the code stored in the computer-readable medium/memory 2235, including circuitry for providing 2215, circuitry for obtaining 2220, circuitry for communicating 2225, and circuitry for monitoring 2230. Processing with circuitry 2215-2230 may enable and cause the communications device 2200 to perform the method 1900 described with respect to FIG. 19, or any aspect related to it.

More generally, means for communicating, transmitting, sending or outputting for transmission may include the transceivers 332, antenna(s) 334, transmit processor 320, TX MIMO processor 330, and/or controller/processor 340 of the BS 102 illustrated in FIG. 3, transceiver 2265 and/or antenna 2270 of the communications device 2200 in FIG. 22, and/or one or more processors 2210 of the communications device 2200 in FIG. 22. Means for communicating, receiving or obtaining may include the transceivers 332, antenna(s) 334, receive processor 338, and/or controller/ processor 340 of the BS 102 illustrated in FIG. 3, transceiver 2265 and/or antenna 2270 of the communications device 2200 in FIG. 22, and/or one or more processors 2210 of the communications device 2200 in FIG. 22.

FIG. 23 depicts aspects of an example communications device 2300. In some aspects, communications device 2300 is a user equipment, such as UE 104 described above with respect to FIGS. 1 and 3.

The communications device 2300 includes a processing system 2305 coupled to a transceiver 2365 (e.g., a transmitter and/or a receiver). The transceiver 2365 is configured to transmit and receive signals for the communications device 2300 via an antenna 2370, such as the various signals as described herein. The processing system 2305 may be configured to perform processing functions for the communications device 2300, including processing signals received and/or to be transmitted by the communications device 2300.

The processing system 2305 includes one or more processors 2310. In various aspects, the one or more processors 2310 may be representative of one or more of receive processor 358, transmit processor 364, TX MIMO processor 366, and/or controller/processor 380, as described with respect to FIG. 3. The one or more processors 2310 are coupled to a computer-readable medium/memory 2335 via a bus 2360. In certain aspects, the computer-readable medium/ memory 2335 is configured to store instructions (e.g., computer-executable code) that when executed by the one or more processors 2310, enable and cause the one or more processors 2310 to perform the method 2000 described with respect to FIG. 20, or any aspect related to it, including any additional operations described in relation to FIG. 20. Note that reference to a processor performing a function of communications device 2300 may include one or more processors performing that function of communications device 2300, such as in a distributed fashion.

In the depicted example, computer-readable medium/ memory 2335 stores code for obtaining 2340, code for providing 2345, code for communicating 2350, and code for monitoring 2355. Processing of the code 2340-2355 may enable and cause the communications device 2300 to perform the method 2000 described with respect to FIG. 20, or any aspect related to it.

The one or more processors 2310 include circuitry configured to implement (e.g., execute) the code stored in the computer-readable medium/memory 2335, including circuitry for obtaining 2315, circuitry for providing 2320, circuitry for communicating 2325, and circuitry for monitoring 2330. Processing with circuitry 2315-2330 may enable and cause the communications device 2300 to perform the method 2000 described with respect to FIG. 20, or any aspect related to it.

More generally, means for communicating, transmitting, sending or outputting for transmission may include the transceivers 354, antenna(s) 352, transmit processor 364, TX MIMO processor 366, and/or controller/processor 380 of the UE 104 illustrated in FIG. 3, transceiver 2365 and/or antenna 2370 of the communications device 2300 in FIG. 23, and/or one or more processors 2310 of the communications device 2300 in FIG. 23. Means for communicating, receiving or obtaining may include the transceivers 354, antenna(s) 352, receive processor 358, and/or controller/ processor 380 of the UE 104 illustrated in FIG. 3, transceiver 2365 and/or antenna 2370 of the communications device 2300 in FIG. 23, and/or one or more processors 2310 of the communications device 2300 in FIG. 23.

Example Clauses

Implementation examples are described in the following numbered clauses:

Clause 1: A method for wireless communications by an apparatus, comprising: obtaining machine learning input data associated with a UE; providing, to a network entity, an indication of machine learning output data generated using the machine learning input data; and providing, to the network entity, control signaling for a cross-node machine learning session between the UE and the apparatus based at least in part on one or more performance indicators associated with the cross-node machine learning session.

Clause 2: The method of Clause 1, wherein: obtaining the machine learning input data comprises obtaining the machine learning input data via a RIC indication message; and providing the machine learning output data comprises providing, to the network entity, the machine learning output data via a RIC control request.

Clause 3: The method of any one of Clauses 1-2, wherein: obtaining the machine learning input data comprises obtaining the machine learning input data via a cross-node specific request message; and providing the machine learning output data comprises providing, to the network entity, the machine learning output data via a cross-node specific response message.

Clause 4: The method of any one of Clauses 1-3, further comprising: monitoring the one or more performance indicators associated with the cross-node machine learning session, wherein providing the control signaling comprises providing the control signaling in response to the monitoring of the one or more performance indicators.

Clause 5: The method of Clause 4, further comprising: obtaining a RIC indication message comprising an indication of monitoring information used for the monitoring, wherein monitoring the one or more performance indicators comprises monitoring the one or more performance indicators based at least in part on the monitoring information.

Clause 6: The method of any one of Clauses 1-5, further comprising: providing an indication of a configuration associated with monitoring the cross-node machine learning session at the UE.

Clause 7: The method of Clause 6, wherein the configuration indicates one or more events that trigger reporting of monitoring information and indicates information to report from the UE as the monitoring information.

Clause 8: The method of any one of Clauses 1-7, further comprising: providing an indication of a configuration associated with monitoring the cross-node machine learning session at the network entity.

Clause 9: The method of any one of Clauses 1-8, wherein the control signaling comprises a RIC control message indicating to deactivate a machine learning function or model used at the UE.

Clause 10: The method of any one of Clauses 1-9, further comprising: obtaining, from the network entity, a RIC indication message requesting the apparatus to deactivate the cross-node machine learning session between the UE and the apparatus, wherein providing the control signaling comprises providing, to the network entity, the control signaling in response to obtaining the RIC indication message.

Clause 11: The method of any one of Clauses 1-10, wherein: the apparatus comprises a RIC configured to communicate with the network entity via an E2 interface; and the network entity comprises a CU.

Clause 12: A method for wireless communications by an apparatus, comprising: providing, to a network entity, machine learning input data associated with a cross-node machine learning session between a UE and the network entity; obtaining, from the network entity, an indication of machine learning output data based at least in part on the machine learning input data; and communicating with the UE based at least in part on the machine learning output data.

Clause 13: The method of Clause 12, wherein: providing the machine learning input data comprises providing the machine learning input data via a RIC indication message; and obtaining the machine learning output data comprises obtaining, from the network entity, the machine learning output data via a RIC control request.

Clause 14: The method of any one of Clauses 12-13, wherein: providing the machine learning input data comprises providing the machine learning input data via a cross-node specific request message; and obtaining the machine learning output data comprises obtaining, from the network entity, the machine learning output data via a cross-node specific response message.

Clause 15: The method of any one of Clauses 12-14, further comprising: monitoring one or more performance indicators associated with the cross-node machine learning session.

Clause 16: The method of Clause 15, further comprising: in response to the monitoring, providing, to the network entity, a RIC indication message comprising an indication of monitoring information used for monitoring performance of the cross-node machine learning session at the network entity; in response to providing the RIC indication message, obtaining, from the network entity, first control signaling for the cross-node machine learning session; and providing, to the UE, second control signaling for the cross-node machine learning session.

Clause 17: The method of Clause 16, wherein: the first control signaling comprises a RIC control message indicating to deactivate a machine learning function or model used at the UE for the cross-node machine learning session; and the second control signaling comprises a radio resource control message indicating to deactivate the machine learning function or model.

Clause 18: The method of Clause 15, further comprising: providing, to the network entity, a RIC message requesting the network entity to deactivate the cross-node machine learning session between the UE and the network entity in response to the monitoring; and providing, to the UE, an indication to deactivate the cross-node machine learning session in response to the monitoring.

Clause 19: The method of Clause 15, further comprising: obtaining an indication of a configuration associated with monitoring the cross-node machine learning session at the apparatus, wherein the monitoring comprises monitoring the one or more performance indicators associated with the cross-node machine learning session based at least in part on the configuration; and providing, to the network entity, a RIC indication message comprising an indication of monitoring information used for monitoring performance of the cross-node machine learning session at the network entity.

Clause 20: The method of any one of Clauses 12-19, further comprising: obtaining an indication of a configuration associated with monitoring the cross-node machine learning session at the UE; providing the configuration to the UE; obtaining, from the UE, monitoring information based on the configuration; and providing, to the network entity, a RIC indication message comprising an indication of the monitoring information used for monitoring performance of the cross-node machine learning session at the network entity.

Clause 21: The method of Clause 20, wherein the configuration indicates one or more events that trigger reporting of the monitoring information and indicates information to report from the UE as the monitoring information.

Clause 22: The method of any one of Clauses 12-21, wherein: the apparatus comprises a CU configured to communicate with the network entity via an E2 interface; and the network entity comprises a RIC.

Clause 23: A method of wireless communications by an apparatus, comprising: obtaining, from a first network entity, an indication to report machine learning input data associated with a cross-node machine learning session between the apparatus and a second network entity; providing, to the first network entity, the machine learning input data; and communicating with the second network entity in accordance with the cross-node machine learning session.

Clause 24: The method of Clause 23, wherein obtaining the indication to the report machine learning input data comprises obtaining the indication to the report machine learning input data via one or more of: RRC signaling, MAC signaling, DCI, or system information.

Clause 25: The method of any one of Clauses 23-24, further comprising: monitoring one or more performance indicators associated with the cross-node machine learning session.

Clause 26: The method of Clause 25, further comprising: in response to the monitoring, providing, to the first network entity, an indication of monitoring information used for monitoring performance of the cross-node machine learning session.

Clause 27: The method of Clause 26, further comprising: obtaining, from the first network entity, control signaling for the cross-node machine learning session in response to providing the indication of the monitoring information.

Clause 28: The method of Clause 27, wherein: the control signaling indicates to deactivate a machine learning model used at the apparatus for the cross-node machine learning session.

Clause 29: The method of Clause 27, wherein: the control signaling indicates to switch from a first machine learning model to a second machine learning model for the cross-node machine learning session.

Clause 30: The method of any one of Clauses 23-29, further comprising: providing, to the first network entity, an indication of monitoring information used for monitoring performance of the cross-node machine learning session.

Clause 31: The method of Clause 30, further comprising: obtaining, from the first network entity, control signaling for the cross-node machine learning session the cross-node machine learning session in response to providing the indication of the monitoring information.

Clause 32: The method of any one of Clauses 23-31, further comprising: providing, to the second network entity, an indication of monitoring information used for monitoring performance of the cross-node machine learning session.

Clause 33: The method of Clause 32, further comprising: obtaining, from the second network entity, control signaling for the cross-node machine learning session in response to providing the indication of the monitoring information.

Clause 34: The method of any one of Clauses 23-33, further comprising: obtaining a configuration associated with monitoring the cross-node machine learning session; monitoring one or more performance indicators associated with the cross-node machine learning session based at least in part on the configuration; and providing, to the first network entity, an indication of monitoring information used for monitoring performance of the cross-node machine learning session.

Clause 35: The method of Clause 34, wherein obtaining the configuration comprises obtaining the configuration via one or more of: RRC signaling, MAC signaling, DCI, or system information.

Clause 36: The method of Clause 34, wherein the configuration indicates one or more events that trigger reporting of the monitoring information and indicates information to report from the apparatus as the monitoring information.

Clause 37: The method of Clause 34, further comprising: obtaining, from the first network entity, a configuration for a communication link between the apparatus and the first network entity in response to providing the machine learning input data, wherein communicating with the second network entity comprises communicating with the second network entity via the communication link in accordance with the configuration.

Clause 38: The method of any one of Clauses 23-37, wherein: the first network entity comprises a CU in communication with the second network entity via an E2 interface; and the second network entity comprises a RIC.

Clause 39: One or more apparatuses, comprising: one or more memories comprising executable instructions; and one or more processors configured to execute the executable instructions and cause the one or more apparatuses to perform a method in accordance with any one of clauses 1-38.

Clause 40: One or more apparatuses, comprising means for performing a method in accordance with any one of clauses 1-38.

Clause 41: One or more non-transitory computer-readable media comprising executable instructions that, when executed by one or more processors of one or more apparatuses, cause the one or more apparatuses to perform a method in accordance with any one of clauses 1-38.

Clause 42: One or more computer program products embodied on one or more computer-readable storage media comprising code for performing a method in accordance with any one of clauses 1-38.

Additional Considerations

The preceding description is provided to enable any person skilled in the art to practice the various aspects described herein. The examples discussed herein are not limiting of the scope, applicability, or aspects set forth in the claims. Various modifications to these aspects will be readily apparent to those skilled in the art, and the general principles defined herein may be applied to other aspects. For example, changes may be made in the function and arrangement of elements discussed without departing from the scope of the disclosure. Various examples may omit, substitute, or add various procedures or components as appropriate. For instance, the methods described may be performed in an order different from that described, and various actions may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

The various illustrative logical blocks, modules and circuits described in connection with the present disclosure may be implemented or performed with a general purpose processor, an AI processor, a digital signal processor (DSP), an ASIC, a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, a system on a chip (SoC), or any other such configuration.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

As used herein, "coupled to" and "coupled with" generally encompass direct coupling and indirect coupling (e.g., including intermediary coupled aspects) unless stated otherwise. For example, stating that a processor is coupled to a memory allows for a direct coupling or a coupling via an intermediary aspect, such as a bus.

The methods disclosed herein comprise one or more actions for achieving the methods. The method actions may be interchanged with one another without departing from the scope of the claims. In other words, unless a specific order of actions is specified, the order and/or use of specific actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor.

The following claims are not intended to be limited to the aspects shown herein, but are to be accorded the full scope consistent with the language of the claims. Reference to an element in the singular is not intended to mean only one unless specifically so stated, but rather "one or more." The subsequent use of a definite article (e.g., "the" or "said") with an element (e.g., "the processor") is not intended to invoke a singular meaning (e.g., "only one") on the element unless otherwise specifically stated. For example, reference to an element (e.g., "a processor," "a controller," "a memory," "a transceiver," "an antenna," "the processor," "the controller," "the memory," "the transceiver," "the antenna," etc.), unless otherwise specifically stated, should be understood to refer to one or more elements (e.g., "one or more processors," "one or more controllers," "one or more memories," "one more transceivers," etc.). The terms "set" and "group" are intended to include one or more elements, and may be used interchangeably with "one or more." Where reference is made to one or more elements performing functions (e.g., steps of a method), one element may perform all functions, or more than one element may collectively perform the functions. When more than one element collectively performs the functions, each function need not be performed by each of those elements (e.g., different functions may be performed by different elements) and/or each function need not be performed in whole by only one element (e.g., different elements may perform different sub-functions of a function). Similarly, where reference is made to one or more elements configured to cause another element (e.g., an apparatus) to perform functions, one element may be configured to cause the other element to perform all functions, or more than one element may collectively be configured to cause the other element to perform the functions. Unless specifically stated otherwise, the term "some" refers to one or more. All structural and functional equivalents to the elements of the various aspects described throughout this disclosure that are known or later come to be known to those of ordinary skill in the art are intended to be encompassed by the claims. Moreover, nothing disclosed herein is intended to be dedicated to the public regardless of whether such disclosure is explicitly recited in the claims.

What is claimed is:

1. An apparatus configured for wireless communications, comprising one or more processors coupled to one or more memories, the one or more processors being configured to cause the apparatus to:

obtain machine learning input data associated with a user equipment (UE);

provide, to a network entity, an indication of machine learning output data generated using the machine learning input data; and provide, to the network entity, control signaling for a cross-node machine learning session between the UE and the apparatus based at least in part on one or more performance indicators associated with the cross-node machine learning session, wherein the one or more processors are configured to cause the apparatus to provide an indication of a configuration associated with monitoring the cross-node machine learning session at the UE or at the network entity.

2. The apparatus of claim 1, wherein:

(i) to obtain the machine learning input data, the one or more processors are configured to cause the apparatus to obtain the machine learning input data via a radio access network intelligent controller (RIC) indication message; and to provide the machine learning output data, the one or more processors are configured to cause the apparatus to provide, to the network entity, the machine learning output data via a RIC control request; or (ii) to obtain the machine learning input data, the one or more processors are configured to cause the apparatus to obtain the machine learning input data via a cross-node specific request message; and to provide the machine learning output data, the one or more processors are configured to cause the apparatus to provide, to the network entity, the machine learning output data via a cross-node specific response message.

3. The apparatus of claim 1, wherein:

the one or more processors are configured to cause the apparatus to monitor the one or more performance indicators associated with the cross-node machine learning session; and to provide the control signaling, the one or more processors are configured to cause the apparatus to provide the control signaling in response to the monitoring of the one or more performance indicators.

4. The apparatus of claim 3, wherein:

the one or more processors are configured to cause the apparatus to obtain a RIC indication message comprising an indication of monitoring information used for the monitoring; and to monitor the one or more performance indicators, the one or more processors are configured to cause the apparatus to monitor the one or more performance indicators based at least in part on the monitoring information.

5. The apparatus of claim 1, wherein the indication of the configuration is associated with monitoring the cross-node machine learning session at the UE.

6. The apparatus of claim 5, wherein the configuration indicates one or more events that trigger reporting of monitoring information and indicates information to report from the UE as the monitoring information.

7. The apparatus of claim 1, wherein the indication of the configuration is associated with monitoring the cross-node machine learning session at the network entity.

8. The apparatus of claim 1, wherein:

the apparatus comprises a radio access network (RAN) intelligent controller (RIC) configured to communicate with the network entity via an E2 interface; and the network entity comprises a central unit (CU).

9. An apparatus configured for wireless communications, comprising one or more processors coupled to one or more memories, the one or more processors being configured to cause the apparatus to:

obtain machine learning input data associated with a user equipment (UE);

provide, to a network entity, an indication of machine learning output data generated using the machine learning input data; and provide, to the network entity, control signaling for a cross-node machine learning session between the UE and the apparatus based at least in part on one or more performance indicators associated with the cross-node machine learning session, wherein:

the control signaling comprises a RIC control message indicating to deactivate a machine learning function or model used at the UE; or the one or more processors are configured to cause the apparatus to: obtain, from the network entity, a RIC indication message requesting the apparatus to deactivate the cross-node machine learning session between the UE and the apparatus; and to provide the control signaling, the one or more processors are configured to cause the apparatus to provide, to the network entity, the control signaling in response to obtaining the RIC indication message.

10. The apparatus of claim 9, wherein the control signaling comprises the RIC control message indicating to deactivate the machine learning function or model used at the UE.

11. The apparatus of claim 9, wherein:

the one or more processors are configured to cause the apparatus to: obtain, from the network entity, the RIC indication message requesting the apparatus to deactivate the cross-node machine learning session between the UE and the apparatus; and to provide the control signaling, the one or more processors are configured to cause the apparatus to provide, to the network entity, the control signaling in response to obtaining the RIC indication message.

12. A method for wireless communications, comprising:

obtaining machine learning input data associated with a user equipment (UE);

providing, to a network entity, an indication of machine learning output data generated using the machine learning input data; and providing, to the network entity, control signaling for a cross-node machine learning session between the UE and the apparatus based at least in part on one or more performance indicators associated with the cross-node machine learning session, wherein the method further comprises providing an indication of a configuration associated with monitoring the cross-node machine learning session at the UE or at the network entity.

13. The method of claim 12, wherein:

(i) obtaining the machine learning input data comprises obtaining the machine learning input data via a radio access network intelligent controller (RIC) indication message; and providing the machine learning output data comprises providing, to the network entity, the machine learning output data via a RIC control request; or (ii) obtaining the machine learning input data comprises obtaining the machine learning input data via a cross-node specific request message; and providing the machine learning output data comprises providing, to the network entity, the machine learning output data via a cross-node specific response message.

14. The method of claim 12, wherein:

the method comprises monitoring the one or more performance indicators associated with the cross-node machine learning session; and providing the control signaling comprises providing the control signaling in response to the monitoring of the one or more performance indicators.

15. The method of claim 14, wherein:

the method comprises obtaining a RIC indication message comprising an indication of monitoring information used for the monitoring; and monitoring the one or more performance indicators comprises monitoring the one or more performance indicators based at least in part on the monitoring information.

16. The method of claim 12, wherein the indication of the configuration is associated with monitoring the cross-node machine learning session at the UE.

17. The method of claim 16, wherein the configuration indicates one or more events that trigger reporting of monitoring information and indicates information to report from the UE as the monitoring information.

18. The method of claim 12, wherein the indication of the configuration is associated with monitoring the cross-node machine learning session at the network entity.

19. The method of claim 12, wherein:

the method is performed by an apparatus that comprises a radio access network (RAN) intelligent controller (RIC) configured to communicate with the network entity via an E2 interface; and the network entity comprises a central unit (CU).

20. A method for wireless communications, comprising:

obtaining machine learning input data associated with a user equipment (UE);

providing, to a network entity, an indication of machine learning output data generated using the machine learning input data; and providing, to the network entity, control signaling for a cross-node machine learning session between the UE and the apparatus based at least in part on one or more performance indicators associated with the cross-node machine learning session, wherein:

the control signaling comprises a RIC control message indicating to deactivate a machine learning function or model used at the UE; or the method comprises: obtaining, from the network entity, a RIC indication message requesting the apparatus to deactivate the cross-node machine learning session between the UE and the apparatus; and providing the control signaling by providing, to the network entity, the control signaling in response to obtaining the RIC indication message.

21. The method of claim 20, wherein the control signaling comprises the RIC control message indicating to deactivate the machine learning function or model used at the UE.

22. The method of claim 20, wherein:

the method comprises obtaining, from the network entity, the RIC indication message requesting the apparatus to deactivate the cross-node machine learning session between the UE and the apparatus; and providing the control signaling comprises providing, to the network entity, the control signaling in response to obtaining the RIC indication message.

* * * * *